(12) United States Patent
King et al.

(10) Patent No.: US 11,989,069 B2
(45) Date of Patent: May 21, 2024

(54) POWER DISTRIBUTION MANAGEMENT BASED ON DISTRIBUTED NETWORKING PROTOCOL ANALYTICS

(71) Applicant: DMK Nano LLC, Sudbury, MA (US)

(72) Inventors: David Michael King, Sudbury, MA (US); Robert Dean King, Sudbury, MA (US)

(73) Assignee: DMK Nano LLC, Sudbury, MA (US)

( * ) Notice: Subject to any disclaimer, the term of this patent is extended or adjusted under 35 U.S.C. 154(b) by 484 days.

(21) Appl. No.: 17/424,848

(22) PCT Filed: Jan. 21, 2020

(86) PCT No.: PCT/US2020/014474
§ 371 (c)(1),
(2) Date: Jul. 21, 2021

(87) PCT Pub. No.: WO2020/154326
PCT Pub. Date: Jul. 30, 2020

(65) Prior Publication Data
US 2022/0121260 A1    Apr. 21, 2022

Related U.S. Application Data

(60) Provisional application No. 62/795,399, filed on Jan. 22, 2019.

(51) Int. Cl.
*G06F 1/26* (2006.01)
*G06F 1/28* (2006.01)
(Continued)

(52) U.S. Cl.
CPC ............... *G06F 1/28* (2013.01); *G06F 1/305* (2013.01); *H02J 3/007* (2020.01); *H02J 3/381* (2013.01)

(58) Field of Classification Search
CPC .. G06F 1/28; G06F 1/305; H02J 3/381; H02J 3/007
See application file for complete search history.

(56) References Cited

U.S. PATENT DOCUMENTS 11,231,733 B2 * 1/2022 Veda ............... H02J 13/00034
2006/0071554 A1    4/2006 McNamara et al.
(Continued)

OTHER PUBLICATIONS

International Search Report and Written Opinion dated Apr. 14, 2020, for PCT/US2020/014474.
(Continued)

*Primary Examiner* — Jared Fureman
*Assistant Examiner* — Esayas G Yeshaw
(74) *Attorney, Agent, or Firm* — Foley & Lardner LLP

(57) ABSTRACT

Systems and methods for managing the distribution of electrical power are disclosed. The system can maintain a status of each account of a plurality of accounts. Each account can correspond to an electrical power generation device, an electrical power consumption device, and an electrical power transmission device. The system can generate a first record object in response to the generation of a unit of power. The system can identify a first path identifying a source device and a destination device to transmit the unit of power. The system can generate a control signal to route the unit of power from the source device to the destination device. The system can update an event tracker to indicate the routing of the unit of power. The system can generate a second record object corresponding to the destination device. The system can update a second account to include the second record object.

32 Claims, 20 Drawing Sheets

(51) Int. Cl.
     *G06F 1/30*        (2006.01)
     *H02J 3/00*        (2006.01)
     *H02J 3/38*        (2006.01)

(56) References Cited

U.S. PATENT DOCUMENTS

| | | |
|---|---|---|
| 2009/0187284 A1 | 7/2009 | Kreiss et al. |
| 2013/0217409 A1* | 8/2013 | Bridges .................. H02J 3/381 |
| | | 455/456.1 |
| 2014/0039699 A1 | 2/2014 | Forbes, Jr. |
| 2014/0281645 A1 | 9/2014 | Sen et al. |
| 2015/0012146 A1 | 1/2015 | Cherian et al. |
| 2016/0200202 A1* | 7/2016 | She .................... B60L 50/51 |
| | | 307/10.1 |
| 2017/0155253 A1 | 6/2017 | Veda et al. |
| 2023/0307906 A1* | 9/2023 | Hanaoka ................ H02J 7/342 |

OTHER PUBLICATIONS

Foreign Action other than Search Report on PCT PCT/US2020/014474 dated Aug. 5, 2021.
Foreign Search Report on EP Application No. 20745958.7 dated Feb. 2, 2023.

\* cited by examiner

POWER DISTRIBUTION MANAGEMENT BASED ON DISTRIBUTED NETWORKING PROTOCOL ANALYTICS

CROSS-REFERENCE TO RELATED APPLICATIONS

This application claims the benefit of and priority to U.S. Provisional Application No. 62/795,399, filed Jan. 22, 2019, which is incorporated herein by reference in its entirety.

BACKGROUND

The current centralized electrical power grid has become increasingly stressed due to the increasing penetration of Distributed Energy Resources (DERs) on the supply-side, and an evolution in smart electronic devices/systems such as LEDs, electric vehicles and demand-response technologies on the demand side. The current centralized power grid is underequipped to effectively manage such an ever-changing landscape that adversely affects power quality and load profiles.

SUMMARY

The present disclosure relates to systems and methods for managing the distribution of electrical power. The method can include maintaining, by a controller comprising one or more processors and a memory, in one or more data structures, a status of each account of a plurality of accounts. Each account of the plurality of accounts can correspond to a respective device. The respective devices can include an electrical power generation device, an electrical power consumption device, an electrical power storage device, and an electrical transmission device. The account can include one or more record objects corresponding to a respective unit of power. The method can include generating, by the controller, a first record object responsive to the electrical power generation device generating a first unit of power. The first record object can identify an identifier of the electrical power generation device, a first value corresponding to a voltage associated with the first unit of power, and a second value corresponding to a current associated with the first unit of power.

The method can include updating, by the controller, a first account of the plurality of accounts corresponding to the electrical power generation device by associating the first record object to the first account. The method can include identifying, by the controller, from a plurality of paths, a first path along which to transmit the first unit of power. Each path of the plurality of paths can identify the electrical power generation device as a source device and a respective one of the electrical power consumption device, the electrical power storage device, or the electrical transmission device as a destination device. The first path can be identified based on the status of a respective account of the plurality of accounts corresponding to the one of the electrical power consumption device, the electrical power storage device, or the electrical transmission device. The method can include generating, by the controller, a control signal to route the first unit of power from the source device to the destination device of the first path.

The method can include updating, by the controller, an event tracker maintained by the one or more processors responsive to routing the first unit of power by including an event indicating the routing of the first unit of power from the source device to the destination device. The method can include generating, by the controller, a second record object corresponding to the first unit of power routed to the destination device, the second record object identifying a second identifier of the destination device. The method can include updating, by the controller, a second account of the plurality of accounts to include the second record object based on routing the first unit of power to the destination device, the second account corresponding to the destination device. In some implementations of the method, the method can include determining, by the controller, that the destination device of the first path is the electrical power consumption device. In some implementations of the method, the method can include assigning, by the controller, a value to the first record object associated with the first account indicating that the first unit of power corresponding to the first record object is consumed.

In some implementations of the method, the event tracker is a first event tracker. In some implementations of the method, the event is a first event. In some implementations of the method, the method can include transmitting, by the controller, to at least one second controller, a request to confirm the routing of the first unit of power from the source device to the destination device. The at least one second controller can be configured to append to a second event tracker maintained by the at least one second controller, a second event indicating the routing of the first unit of power from the source device to the destination device. In some implementations of the method, the method can include receiving, by the controller, an indication of confirmation from the at least one second controller. In some implementations of the method, the method can include, responsive to receiving the indication of confirmation from the at least one second controller, updating, by the controller, the first event tracker to include the first event indicating the routing of the first unit of power from the source device to the destination device. In some implementations of the method, the method can include determining, by the controller, a type of the electrical power generation device. In some implementations of the method, the method can include identifying, by the controller, the first path along which to transmit the first unit of power based on the type of the electrical power generation device.

In some implementations of the method, the method can include determining, by the controller, an objective function for each path of the plurality of paths, each objective function representing a loss of electrical power associated with the corresponding path. In some implementations of the method, the method can include identifying, by the controller, the first path along which to transmit the first unit of power based on the objective functions corresponding to each path of the plurality of paths. In some implementations of the method, the method can include measuring, by the controller, the voltage and the current of an output of the electrical power generation device. In some implementations of the method, the method can include determining, by the controller, that the voltage and the current measured from the output of the electrical power generation device satisfies a threshold corresponding to a function based at least on the voltage and the current. In some implementations of the method, the method can include generating, by the controller, the first record object responsive to the determination that the voltage and the current satisfy the threshold.

In some implementations of the method, the method can include transmitting, by the controller, to at least one second controller, a request to confirm the generation of the first unit of power by the electrical power generation device, the at least one second controller configured to append to a second event tracker maintained by the at least one second controller, a second event indicating the generation of the first unit of power by the electrical power generation device. In some implementations of the method, the method can include receiving, by the controller, an indication of confirmation from the at least one second controller. In some implementations of the method, the method can include, responsive to the receipt of the indication of confirmation from the at least one second controller, updating, by the controller, the first account of the plurality of accounts corresponding to the electrical power generation device.

Another aspect of the present disclosure relates to a system configured for managing the distribution of generated electrical power. The system can include one or more processors in communication with an electrical power generation device, an electrical power consumption device, an electrical power storage device, and an electrical transmission device. The one or more processors can be coupled to memory and be configured to execute computer-readable instructions. The one or more processors can be configured to maintain, in one or more data structures, a status of each account of a plurality of accounts, each account of the plurality of accounts corresponding to a respective device of the electrical power generation device, the electrical power consumption device, the electrical power storage device, and the electrical transmission device, the account including one or more record objects corresponding to a respective unit of power.

The one or more processors can be configured to generate a first record object responsive to the electrical power generation device generating a first unit of power, the first record object identifying an identifier of the electrical power generation device and a first value corresponding to a voltage associated with the first unit of power and a second value corresponding to a current associated with the first unit of power. The one or more processors can be configured to update a first account of the plurality of accounts corresponding to the electrical power generation device by associating the first record object to the first account. The one or more processors can be configured to identify, from a plurality of paths, a first path along which to transmit the first unit of power, each path of the plurality of paths identifying the electrical power generation device as a source device and a respective one of the electrical power consumption device, the electrical power storage device, or the electrical transmission device as a destination device, the first path identified based on the status of a respective account of the plurality of accounts corresponding to the one of the electrical power consumption device, the electrical power storage device, or the electrical transmission device.

The one or more processors can be configured to generate a control signal to route the first unit of power from the source device to the destination device of the first path. The one or more processors can be configured to update an event tracker maintained by the one or more processors responsive to routing the first unit of power by including an event indicating the routing of the first unit of power from the source device to the destination device. The one or more processors can be configured to generate a second record object corresponding to the first unit of power routed to the destination device, the second record object identifying a second identifier of the destination device. The one or more processors can be can be configured to: update a second account of the plurality of accounts to include the second record object based on routing the first unit of power to the destination device, the second account corresponding to the destination device.

In some implementations of the system, the one or more processors can be further configured to determine that the destination device of the first path is the electrical power consumption device. In some implementations of the system, the one or more processors can be further configured to assign a value to the first record object associated with the first account indicating that the first unit of power corresponding to the first record object is consumed. In some implementations of the system, the event tracker is a first event tracker. In some implementations of the system, the event is a first event. In some implementations of the system, the one or more processors can be further configured to transmit to at least one second controller, a request to confirm the routing of the first unit of power from the source device to the destination device, the at least one second controller configured to append to a second event tracker maintained by the at least one second controller, a second event indicating the routing of the first unit of power from the source device to the destination device. In some implementations of the system, the one or more processors can be further configured to receive an indication of confirmation from the at least one second controller. In some implementations of the system, the one or more processors can be further configured to, responsive to the receipt of the indication of confirmation from the at least one second controller, update the first event tracker to include the first event indicating the routing of the first unit of power from the source device to the destination device.

In some implementations of the system, the one or more processors can be further configured to determine a type of the electrical power generation device. In some implementations of the system, the one or more processors can be further configured to identify the first path along which to transmit the first unit of power based on the type of the electrical power generation device. In some implementations of the system, the one or more processors can be further configured to determine an objective function for each path of the plurality of paths, each objective function representing a loss of electrical power associated with the corresponding path. In some implementations of the system, the one or more processors can be further configured to identify the first path along which to transmit the first unit of power based on the objective functions corresponding to each of the plurality of paths. In some implementations of the system, the one or more processors can be further configured to measure the voltage and the current of an output of the electrical power generation device. In some implementations of the system, the one or more processors can be further configured to determine that the voltage and the current measured from the output of the electrical power generation device satisfies a threshold corresponding to a function based at least on the voltage and the current. In some implementations of the system, the one or more processors can be further configured to generate the first record object responsive to the determination that the voltage and the current satisfy the threshold In some implementations of the system, the one or more processors can be further configured to transmit to at least one second controller, a request to confirm the generation of the first unit of power by the electrical power generation device, the at least one second controller configured to append to a second event tracker maintained by the at least one second controller, a second event indicating the generation of the first unit of power by the electrical power generation device. In some implementations of the system, the one or more processors can be further configured to receive an indication of confirmation from the at least one second controller. In some implementations of the system, the one or more processors can be further configured to, responsive to the receipt of the indication of confirmation from the at least one second controller, update the first account of the plurality of accounts corresponding to the electrical power generation device.

At least one other aspect of the present disclosure relates to a non-transitory computer-readable medium having instructions embodied thereon, the instructions being executable by one or more processors. The instructions can be configured to cause the one or more processors to maintain, in one or more data structures, a status of each account of a plurality of accounts, each account of the plurality of accounts corresponding to a respective device of the electrical power generation device, the electrical power consumption device, the electrical power storage device, and the electrical transmission device, the account including one or more record objects corresponding to a respective unit of power. The instructions can be configured to cause the one or more processors to generate a first record object responsive to the electrical power generation device generating a first unit of power, the first record object identifying an identifier of the electrical power generation device and a first value corresponding to a voltage associated with the first unit of power and a second value corresponding to a current associated with the first unit of power.

The instructions can be configured to cause the one or more processors to update a first account of the plurality of accounts corresponding to the electrical power generation device by associating the first record object to the first account. The instructions can be configured to cause the one or more processors to identify, from a plurality of paths, a first path along which to transmit the first unit of power, each path of the plurality of paths identifying the electrical power generation device as a source device and a respective one of the electrical power consumption device, the electrical power storage device, or the electrical transmission device as a destination device, the first path identified based on the status of a respective account of the plurality of accounts corresponding to the one of the electrical power consumption device, the electrical power storage device, or the electrical transmission device. The instructions can be configured to cause the one or more processors to generate a control signal to route the first unit of power from the source device to the destination device of the first path.

The instructions can be configured to cause the one or more processors to update an event tracker maintained by the one or more processors responsive to routing the first unit of power by including an event indicating the routing of the first unit of power from the source device to the destination device. The instructions can be configured to cause the one or more processors to generate a second record object corresponding to the first unit of power routed to the destination device, the second record object identifying a second identifier of the destination device. The instructions can be configured to cause the one or more processors to update a second account of the plurality of accounts to include the second record object based on routing the first unit of power to the destination device, the second account corresponding to the destination device.

In some implementations, the instructions can be further configured to cause the one or more processors to determine that the destination device of the first path is the electrical power consumption device. In some implementations, the instructions can be further configured to cause the one or more processors to assign a value to the first record object associated with the first account indicating that the first unit of power corresponding to the first record object is consumed. In some implementations, the instructions can be further configured such that the event tracker is a first event tracker. In some implementations, the instructions can be further configured such that the event is a first event. In some implementations, the instructions can be further configured to cause the one or more processors to transmit to at least one second controller, a request to confirm the routing of the first unit of power from the source device to the destination device, the at least one second controller configured to append to a second event tracker maintained by the at least one second controller, a second event indicating the routing of the first unit of power from the source device to the destination device.

In some implementations, the instructions can be further configured to cause the one or more processors to receive an indication of confirmation from the at least one second controller. In some implementations, the instructions can be further configured to cause the one or more processors to, responsive to the receipt of the indication of confirmation from the at least one second controller, update the first event tracker to include the first event indicating the routing of the first unit of power from the source device to the destination device. In some implementations, the instructions can be further configured to cause the one or more processors to determine a type of the electrical power generation device. In some implementations, the instructions can be further configured to cause the one or more processors to identify the first path along which to transmit the first unit of power based on the type of the electrical power generation device. In some implementations, the one or more processors can be further configured to cause the one or more processors to determine an objective function for each path of the plurality of paths, each objective function representing a loss of electrical power associated with the corresponding path. In some implementations, the one or more processors can be further configured to cause the one or more processors to identify the first path along which to transmit the first unit of power based on the objective functions corresponding to each of the plurality of paths.

In some implementations, the instructions can be further configured to cause the one or more processors to measure the voltage and the current of an output of the electrical power generation device. In some implementations, the instructions can be further configured to cause the one or more processors to determine that the voltage and the current measured from the output of the electrical power generation device satisfies a threshold corresponding to a function based at least on the voltage and the current. In some implementations, the instructions can be further configured to cause the one or more processors to generate the first record object responsive to the determination that the voltage and the current satisfy the threshold. In some implementations, the instructions can be configured such that the event tracker is a first event tracker. In some implementations, the instructions can be configured such that the event is a first event.

In some implementations, the instructions can be further configured to cause the one or more processors to transmit to at least one second controller, a request to confirm the generation of the first unit of power by the electrical power generation device, the at least one second controller configured to append to a second event tracker maintained by the at least one second controller, a second event indicating the generation of the first unit of power by the electrical power generation device. In some implementations, the instructions can be further configured to cause the one or more processors to receive an indication of confirmation from the at least one second controller. In some implementations, the instructions can be further configured to, responsive to the receipt of the indication of confirmation from the at least one second controller, update the first account of the plurality of accounts corresponding to the electrical power generation device.

At least one other aspect of the present disclosure is related to a system for managing the distribution of generated electrical power. The system can include one or more processors in communication with an electrical power generation device, an electrical power consumption device, an electrical power storage device, and an electrical transmission node. The one or more processors can be coupled to a memory. The one or more processors can maintain, in one or more data structures, a status of each account of a plurality of accounts, each account of the plurality of accounts corresponding to a respective device of the electrical power generation device, the electrical power consumption device, the electrical power storage device, and the electrical transmission device, the account including one or more record objects corresponding to a respective unit of power. The one or more processors can identify, from a plurality of paths, a first path along which to transmit a first unit of power, each path of the plurality of paths identifying one of the electrical power generation device, the electrical power storage device, or the electrical transmission device as a source device and a respective one of the electrical power consumption device, the electrical power storage device, or the electrical transmission device as a destination device, the first path identified based on the status of a respective account of the plurality of accounts corresponding to the one of the electrical power consumption device, the electrical power storage device, or the electrical transmission device.

The one or more processors can generate a control signal to route the first unit of power from the source device to the destination device of the first path. The one or more processors can update an event tracker maintained by the one or more processors responsive to routing the first unit of power by including an event indicating the routing of the first unit of power from the source device to the destination device. The one or more processors can generate a record object corresponding to the first unit of power routed to the destination device, the record object identifying an identifier of the destination device. The one or more processors can update a first account of the plurality of accounts corresponding to the source device based on routing the first unit of power from the source device. The one or more processors can update a second account of the plurality of accounts to include the record object based on routing the first unit of power to the destination device, the second account corresponding to the destination device.

In some implementations of the system, the one or more processors can be further configured to determine that the destination device of the first path is the electrical power consumption device. In some implementations of the system, the one or more processors can be further configured to assign a value to the record object indicating that the first unit of power corresponding to the record object is consumed. In some implementations of the system, the one or more processors can be further configured to transmit to at least one second controller, a request to confirm the routing of the first unit of power from the source device to the destination device, the at least one second controller configured to append to a second event tracker maintained by the at least one second controller, a second event indicating the routing of the first unit of power from the source device to the destination device. In some implementations of the system, the one or more processors can be further configured to receive an indication of confirmation from the at least one second controller. In some implementations of the system, the one or more processors can be further configured to, responsive to the receipt of the indication of confirmation from the at least one second controller, update the first event tracker to include the first event indicating the routing of the first unit of power from the source device to the destination device.

In some implementations of the system, the one or more processors can be further configured to determine a type of the electrical power generation device. In some implementations of the system, the one or more processors can be further configured to identify the first path along which to transmit the first unit of power based on the type of the electrical power generation device. In some implementations of the system, the one or more processors can be further configured to determine an objective function for each path of the plurality of paths, each objective function representing a loss of electrical power associated with the corresponding path. In some implementations of the system, the one or more processors can be further configured to identify the first path along which to transmit the first unit of power based on the objective functions corresponding to each of the plurality of paths.

In some implementations of the system, the one or more processors can be further configured to measure a voltage and a current of an output of the electrical power generation device. In some implementations of the system, the one or more processors can be further configured to determine that the voltage and the current measured from the output of the electrical power generation device satisfies a threshold corresponding to a function based at least on the voltage and the current. In some implementations of the system, the one or more processors can be further configured to measure a voltage and a current of an output of the electrical power generation device. In some implementations of the system, the one or more processors can be further configured to generate the record object responsive to the determination that the voltage and the current satisfy the threshold.

In some implementations of the system, the one or more processors can be further configured to transmit to at least one second controller, a request to confirm the generation of the first unit of power, the at least one second controller configured to append to a second event tracker maintained by the at least one second controller, a second event indicating the generation of the first unit of power. In some implementations, the one or more processors can be further configured to receive an indication of confirmation from the at least one second controller. In some implementations of the system, the one or more processors can be further configured to, responsive to the receipt of the indication of confirmation from the at least one second controller, update the first account of the plurality of accounts corresponding to the source device.

At least one other aspect of the present disclosure is directed to a system, comprising one or more processors coupled to memory and configured to receive information pertaining to an electrical network. The electrical network can include a first electrical energy source, a second electrical energy source, and a plurality of electrical energy destinations. The one or more processors can be coupled to memory and configured to maintain, in one or more data structures, a first account for the first electrical energy source. The first account can include one or more record objects corresponding to a respective unit of power or energy. Each of the one or more record objects can identify one of an energy generation event, an energy transfer event, or an energy storage event and a corresponding timestamp.

The one or more processors can maintain, in one or more data structures, a second account for the second electrical energy source. The second account can maintain, for each time period of a plurality of time periods, a respective record of an estimated amount of available electrical energy for transmission to the plurality of electrical destinations. The one or more processors can determine, for a first time period after the plurality of time periods, a first routing configuration between the first electrical energy source and a first electrical energy destination of the plurality of electrical energy destinations based on the first account and the second account and the first time period. The one or more processors can establish, for the first time period, a first electrical connection to cause the first electrical energy source to transfer energy to the first electrical energy destination based on the first routing configuration. The one or more processors can determine, for a second time period after the plurality of time periods, a second routing configuration between the second electrical energy source and the first electrical energy destination of the plurality of electrical energy destinations based on the first account and the second account and the second time period. The one or more processors can establish, for the second time period, a second electrical connection to cause the second electrical energy source to transfer energy to the first electrical energy destination based on the second routing configuration.

In some implementations, the first electrical energy source is associated with a first location, and the one or more processors are further configured to determine a predicted amount of electrical energy generated at the first time period based on the first location. In some implementations, the one or more processors are further configured to maintain, for each second time period of a plurality of second time periods after the first plurality of time periods, a predicted amount of transferable energy for the first electrical energy source. In some implementations, the second time period is a respective second time period of the plurality of second time periods, and wherein to determine, for the second time period, the second routing configuration, the one or more processors are further configured to determine the second routing configuration using the predicted amount of transferable electrical energy for the first energy source for the second time period.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

For purposes of reading the description of the various implementations below, the following descriptions of the sections of the specification and their respective contents may be helpful:

Section A describes an energy distribution system based on distributed networking protocol analytics. One or more of the systems, or aspects thereof, may be implemented with one or more implementations described herein.

Section B describes a transactional energy distribution system including power conversion technology, in accordance with one or more example implementations.

Section C describes an energy distribution system based on a layered grid topology. One or more of the systems, or aspects thereof, may be implemented with one or more implementations described herein.

Section D describes a generic computer system, which may be used to implement one or more of the systems, of aspects thereof, described herein.

A. Energy Distribution Based on Distributed Networking Protocol Analytics

Figure 1A:
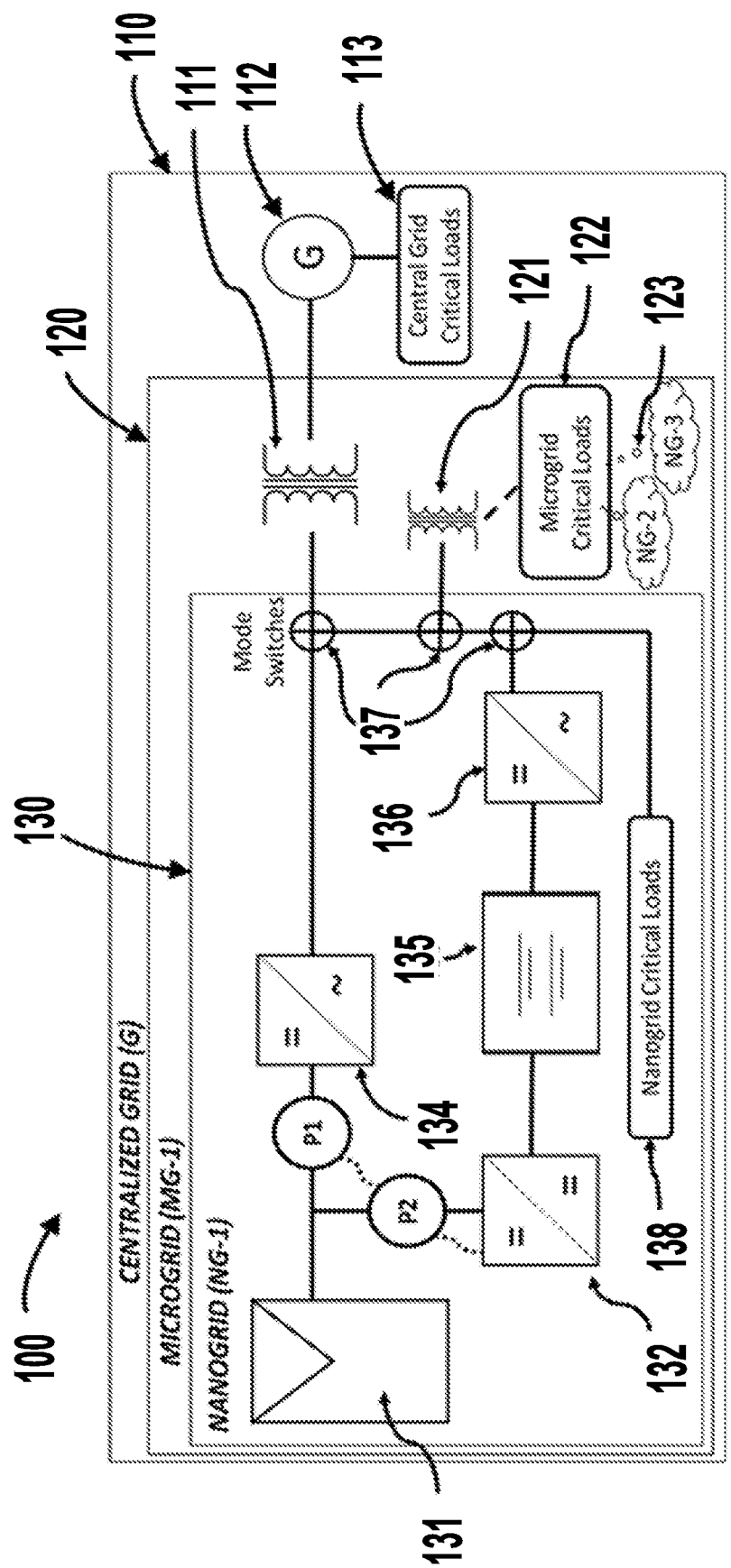
FIG. 1A illustrates an example implementation of a system for the flexible distribution of electrical power between a generation source, a storage module, various inverters and converters.

FIG. 1A illustrates an implementation of a flexible distributed energy resource architecture 100 having at least one controller (e.g. the controller 205, the controller 42, etc.), at least one storage module 135 (e.g., the energy storage device 230, etc.), various inverters and converters, and the ability to use a DC-coupled architecture or an AC-coupled architecture to power critical loads at various scales, for example in a nanogrid 130, a microgrid 120, or a centralized grid layer 110. The architecture 100 can include at least one converter 132, at least one inverter 134, at least one second inverter 136, and at least one mode switch 137. The architecture 100 can include at least one microgrid transformer 121, at least one microgrid load 122, and at least one other nanogrid 123. The other nanogrid 123, can be, for example, another instance of the nanogrid 130 electrically coupled to the microgrid 120 such that power may be transferred between nanogrids 130 and the other nanogrid 123 using only the infrastructure established by the microgrid 120. In some implementations, the components of the nanogrid 130 can transmit power to the other nanogrid 123 via the centralized grid 110. The architecture 100 can include at least one centralized grid transformer 111, at least one centralized power transmission grid 112, and at least one centralized grid load 113.

The nanogrid 130 can correspond, for example, to the system 300, which is described in detail herein below in conjunction with FIG. 3. The microgrid 130 can correspond, for example, to the system 200 described herein below in conjunction with FIG. 2. The centralized grid layer 110 may correspond, for example, to either the transmission system operator ("TSO") or distribution system operator ("DSO") layers described herein below in conjunction with FIG. 16; the microgrid layer 120 may correspond the microgrid system operator ("MSO") described herein below in conjunction with FIG. 16, and the nanogrid layer 130 may correspond to nanogrid 1 described herein below in conjunction with FIG. 16.

The energy generation device 131 can correspond, for example, to the generation device 220 described herein below in conjunction with FIG. 2. The energy generation device 131 can include any time of device capable of generating electrical charge or electrical energy, and can generate an electrical current and an electrical voltage to power the nanogrid 130, the microgrid 120, or the centralized grid 110. The energy generation device 131 can include one or more photovoltaic arrays, wind turbines, uninterruptable power supplies, or other electricity generation means that has a DC or AC output. The energy generation device 131 can include one or more temporary energy storage devices, to temporarily store the energy generated by the energy generation device 131 before the energy is routed throughout the architecture 100.

The converter 132 can be a DC-DC converter, which can be a closed-loop power voltage modification converter with the ability to select how much power from generation system 131 is allowed to flow along Flow Path P1, versus how much power remaining from the generation system 131 is allowed to flow along Flow Path P2. The converter 132 can be a smart converter with machine learning and blockchain communication capabilities, and can be communicatively coupled with a controller (e.g., the controller 205 or the controller 42, etc.). The converter 132 can be, for example, any type of DC-DC converter, such as a buck converter, flywheel converter, boost converter, buck-boost converter, among others, or any combination thereof. The converter can be electrically coupled to and receive control signals from a controller. In some implementations, in response to a control signal from a controller, the converter 132 can route electrical power between Flow Path P1 and Flow Path P2. The converter 132 can step-up, step-down, regulate, smooth, or shape the DC or AC current entering the converter 132 to create an output signal current or output signal voltage. The output signal voltage or output signal current can correspond, for example to the current or voltage requirements of the Flow Path P1, the Flow Path P2, the nanogrid 130, the microgrid 120, the centralized grid 110, the energy storage device 135, or any other path or component of architecture 100. The converter 132 may be configured to transmit discretized amounts of electrical power, for example one or more units of power. As such, the converter 132 may be coupled to one or more voltage or current sensors capable of providing feedback signals about the amount of transmitted power to the converter 132 or the controller.

The transmitted electrical power that flows along Flow Path P1 can travel through the inverter 134. The inverter 134 can take an input of DC electrical power, having a first voltage and a first current, and output one or more AC current signals having a second AC voltage and a second AC current. The inverter 134 may take as input, for example, a particular electrical phase, output type value, power factor value, or other type of value to shape the one or more electrical outputs of the inverter 134. It should be appreciated that, while the nanogrid 130 of architecture 100 is depicted including at least two inverters (e.g., the inverter 134 and the second inverter 136), that the nanogrid 130 can be implemented with a single hybrid inverter. In such implementations, the hybrid inverter can take, as inputs, the output of the energy storage device 135 and the output Flow Path P1, and providing as output the appropriate current, voltage, phase, and power factor signals to the mode switches 137. The inverter 134 and the inverter 136 can create an AC voltage or an AC current of any type of signal pattern, including a square wave, sawtooth wave, or other type of electrical signal current. The inverter 134 and the second inverter 136 can be coupled to and receive control signals from the controller 205. The control signals can include specific output information that may be requested by the nanogrid 130, the microgrid 120, or the centralized grid 110.

Power that flows along Flow Path P1 can travel through inverter 134, which can have an output of alternating current. Power that flows along Flow Path P2 travels from converter 132 to energy storage module 135, which may then be transferred through inverter 136 and to or through one or more mode switches 137. The controller (e.g., the controller 205 shown in FIG. 2, the controller 42 shown in FIG. 5A, etc.) can detect voltage and current values from each of the Flow Path P1, the Flow Path P2, or any other path or component of the architecture 100 using one or more voltage sensors and one or more current sensors. The controller can measure, for example, the energy generated by the energy generation device 131 to determine when a unit of energy has been generated. A unit of energy can be any predetermined amount of power, charge, current, or voltage provided by the energy generation device 131. The controller can monitor and receive signals that correspond to energy transfer events between the components of the architecture 100. When an energy transfer event occurs, the controller can update one or more distributed data structures to indicate a "transaction," or a record of an energy transfer event. As such, the energy that is transferred between the components of the architecture 100 can be monitored, tokenized (e.g., one or more record objects can be created), and analyzed to determine the optimal paths to route energy for maximum efficiency, which is a significant technical improvement to energy distribution systems and tokenized distributed energy systems.

When a specific quantity of tokenized energy (e.g., one or more record objects generated to represent the generated energy) is transferred from energy storage module 135 to inverter 136, a transaction occurs in which a commensurate number of first record objects (or First Tokens) from a first distributed data structure (e.g., a first blockchain, a ledger, or other type of distributed data structure, etc.) is purchased by the consuming entity, while the operator or the controller of nanogrid 130 receives compensation at a first market rate. Stated in another way, the first tokens are assigned a value corresponding to an amount based on an established rate. The controller can store an association between each record object corresponding to a respective first token and the value corresponding to the amount. Power that is generated by generation system 131 may also be tokenized (e.g., a record object generated) within a second data structure (e.g., a second block chain, a second distributed data structure, or other type of distributed transactional ledger structure, etc.) by the controller, wherein a specific quantity of second record objects are generated commensurate with the amount of energy that is generated. Depending on the market rate, the operator or the controller of nanogrid 130 may determine to replenish the first record objects, and corresponding energy value, into storage module 135, by diverting power and Second Tokens (e.g., second record objects of the second data structure) via Flow Path P2 and through converter 132. The process of generating record objects and transferring them between devices, paths, and other data structures is described herein below with respect to FIG. 3.

The mode switches 137 can actuated by the controller to control the power flow across layers (e.g., from nanogrid 130 to microgrid 120, nanogrid 130 to centralized grid 110, or vice-versa, etc.). The mode switches may be switching modules, power converters, one or more transistor arrays, one or more transistors, metal-oxide semiconductor field effect transistors (MOSFETs), bipolar junction transistors (BJTs), relays, circuit breakers, or any other type of electrical or electronic switch configured to receive and transmit power. In some implementations, one or more mode switches can be actuated such that some or all power remains within the nanogrid 130 to support nanogrid critical loads 138. The nanogrid critical loads 138 can be proximate to the nanogrid 138, for example a home, a building, or another type of load whose expected amount of power consumption may be less than that of the microgrid loads 122 or the central grid critical loads 113. In some implementations, one or more mode switches 137 can be actuated by the controller such that some or all power is diverted to support microgrid critical loads 122 through transformer 121. The transformer 121 can be an electrical transformer that may step-up, step-down, maintain, or otherwise transmit power between the nanogrid 130 and the microgrid 120.

The microgrid critical loads 122 can be, for example, one or more other nanogrids 123. The microgrid critical loads 122 can be additional microgrid 120 infrastructure components used to facilitate the transfer of power between components in the microgrid 120. The microgrid critical loads 122 can be additional components that require power from one or more nanogrids 130 or other nanogrids 123. In some implementations, one or more mode switches 137 can be actuated by the controller such that some or all power can be diverted to support the centralized grid 112 through transformer 111 to support the central grid critical loads 113. The transformer 111 can be a transformer configured to step-up, step-down, maintain, or otherwise transmit electrical current and voltage between the nanogrid 130 and the components of the centralized grid 110. The central grid critical loads 113 can include other microgrids, other nanogrids, or any other electrical component or system. From there, central grid critical loads 113 can then be receiving power from one or more MSOs as described herein below in conjunction with FIG. 16.

Figure 1B:
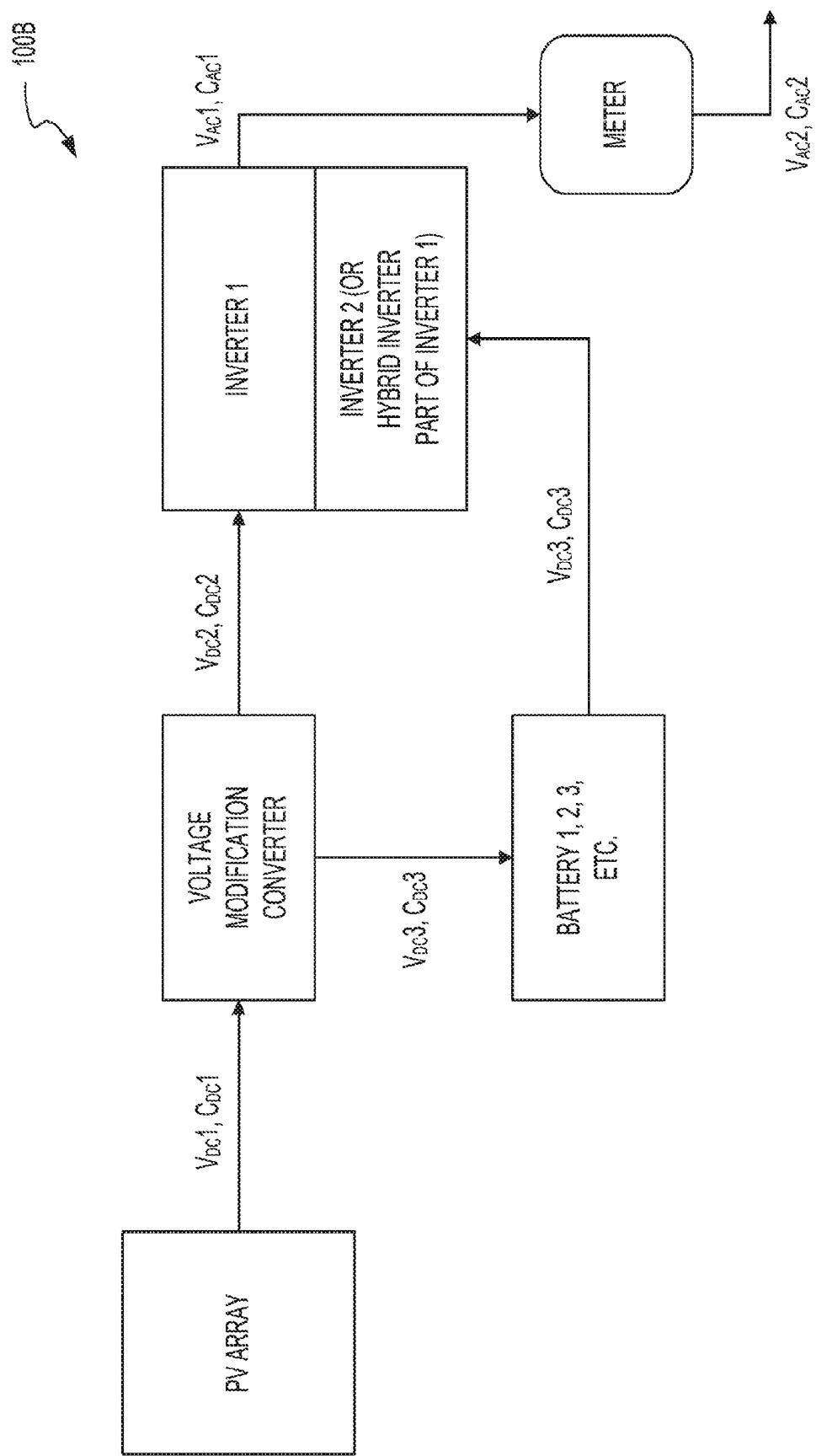
FIG. 1B illustrates an example implementation of a system for the flexible distribution of electrical power between a generation source, a storage module, and at least one hybrid inverter.

Referring now to FIG. 1B, depicted is an example system 100B similar to that of the system 100, including a hybrid inverter instead of a first inverter 134 and a second inverter 136. The system 100B can include, for example, any and all components of system 100 described herein above in conjunction with FIG. 1A. The hybrid inverter of system 100B can function as a two inverters housed within the same apparatus. As such, the hybrid inverter can receive one or more electrical DC inputs having a DC voltage and a DC current, and provide one or more AC outputs having an AC voltage and an AC current. Each of the inputs and outputs of the hybrid inverter can provide different voltage and current levels. Accordingly, the hybrid inverter can effectively provide the functionality of both the first inverter 134 and the second inverter 136, while being a single device or apparatus. Due to the decreased number of devices, implementations including a hybrid inverter versus two separate inverters provide an overall improvement to the electrical losses experienced by the system 100B, which is a significant technical improvement to electrical distribution power systems.

Figure 2:
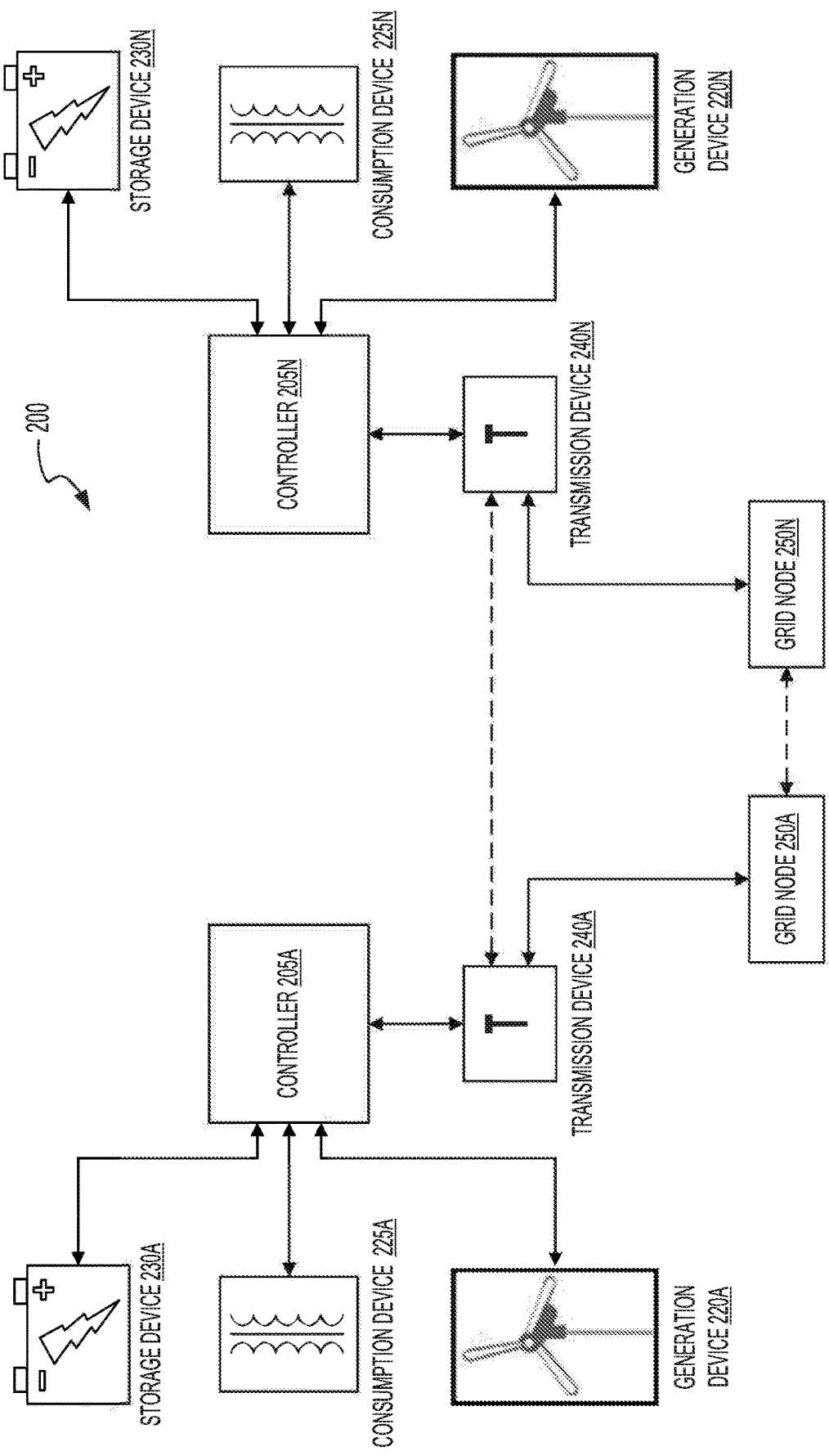
FIG. 2 illustrates an example implementation of an energy distribution system based on network protocol analysis and transmissions.

Referring now to FIG. 2, depicted is an example system 200 of an energy distribution system based on networking protocol analysis and transmissions. The system 200 can include at least one controller 205A-N (herein sometimes generally referred to as controller 205), at least one energy storage device 230A-N (herein sometimes generally referred to as energy storage device 230), at least one energy consumption device 225A-N (herein sometimes generally referred to as energy consumption device 225), and at least one generation device 220A-N (herein sometimes generally referred to as generation device 220). The system 200 can include at least one transmission device 240A-N (herein sometimes generally referred to as transmission device 240) and at least one grid node 250A-N (herein sometimes generally referred to as grid node 250). Although not explicitly pictured in FIG. 2, it should be understood that any of the components of architecture 100 may be included in the system 200, in accordance with some implementations.

Figure 5A:
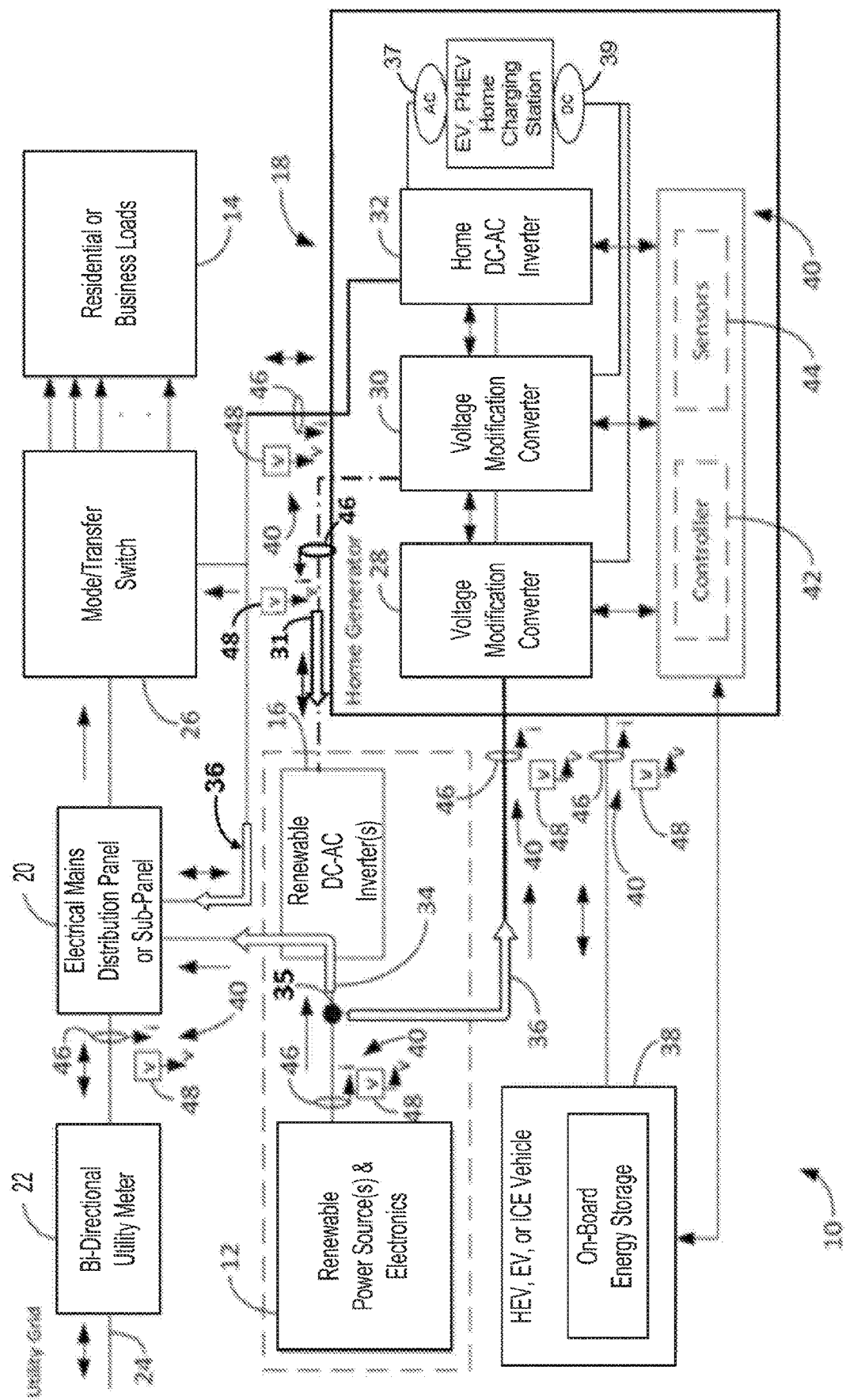
FIG. 5A illustrates an example schematic diagram of a system for energy generation, storage, and consumption in accordance with an example implementation.
Figure 7:
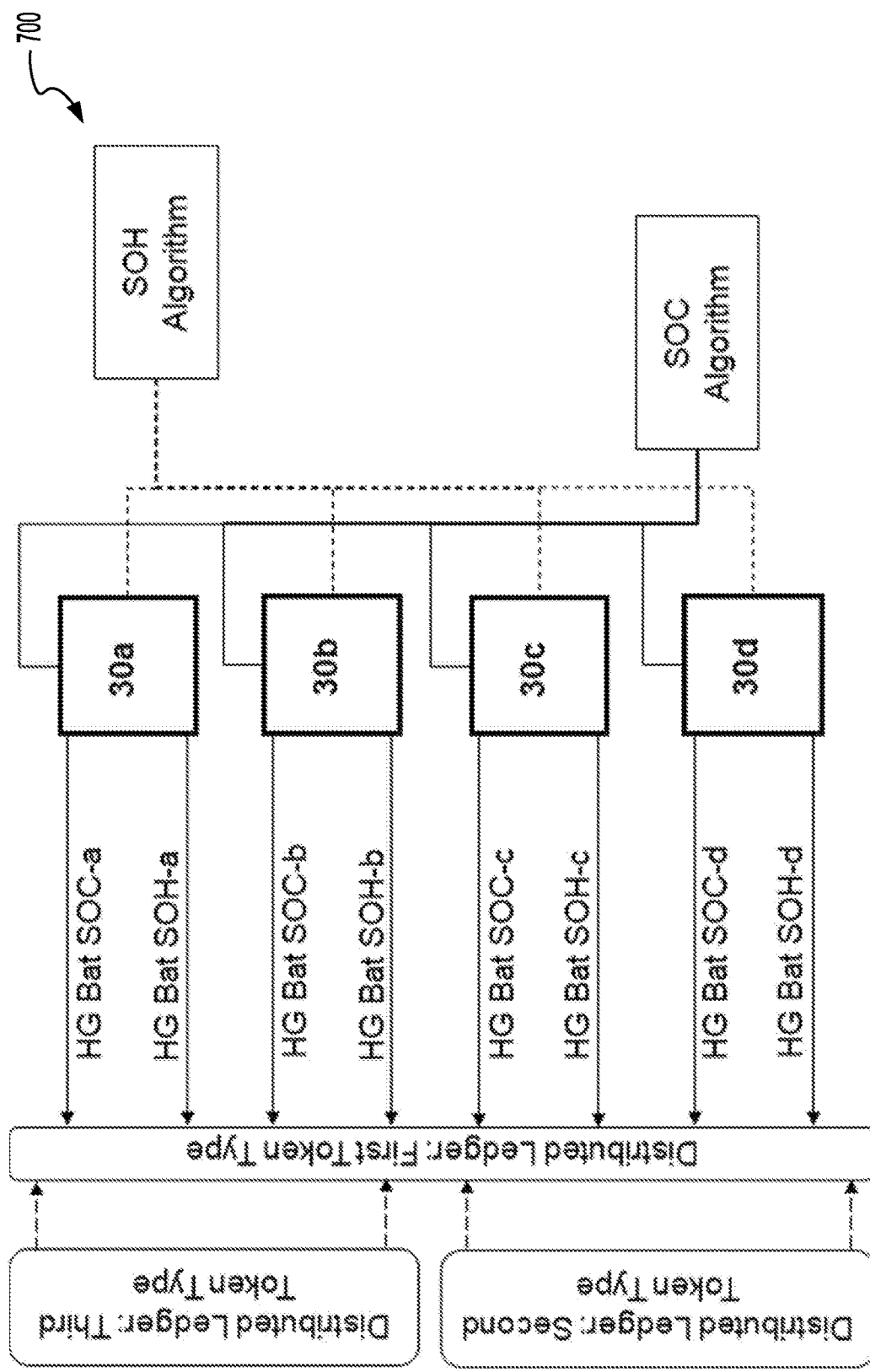
FIG. 7 illustrates an example schematic diagram of a system for balancing an array of energy storage devices based on state of charge and state of health, and storing charge information in one or more data structures.
Figure 17:
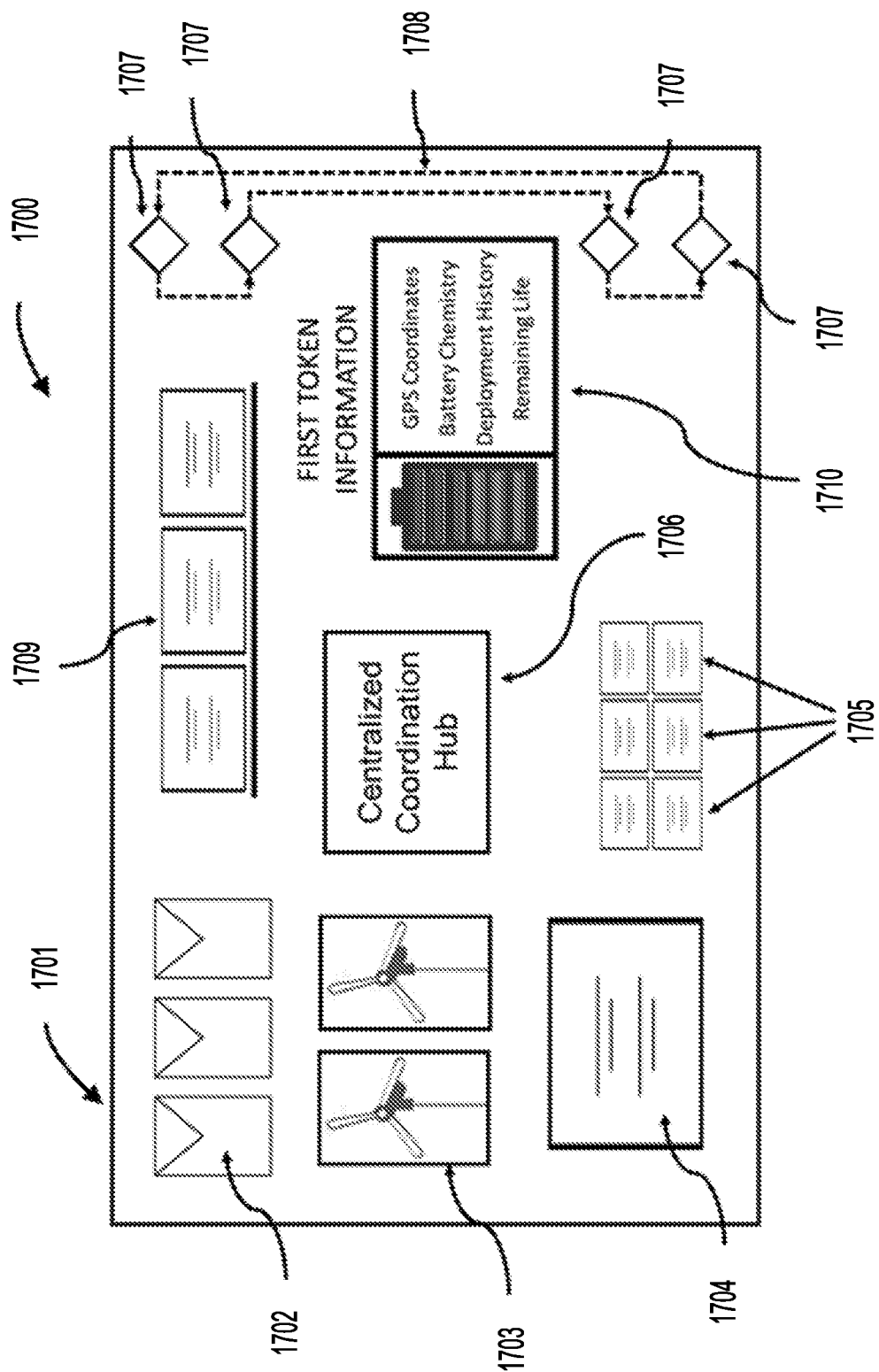
FIG. 17 illustrates an example system for monitoring distribution of energy based on distributed data structures, including large front-of-the-meter energy generation and storage assets, behind-the-meter storage assets, mobile and portable energy storage assets, and one or more networks of sensors.

The energy storage device 230 can be, for example, any of the electrical storage devices described herein, including the storage device 135, the home battery and disconnects 30 shown in FIG. 5A, the storage devices 30*a-d* shown in FIG. 7, or the storage device 1704 shown in FIG. 17, in accordance with one or more implementations. The energy storage device 230 can be configured to store electrical energy for later distribution throughout one or more systems described herein. The energy storage device 230 can include one or more batteries, for example one or more lithium-ion batteries, lead acid batteries, lithium polymer batteries, nickel-metal hydride batteries, nickel-cadmium batteries, any other type of battery, or one or more battery arrays in series or parallel. The energy storage device 230 can include one or more capacitors, for example one or more electrolytic capacitors, super capacitors, nano-capacitors, ceramic capacitors, or any other type of high charge density capacitor. The energy storage device 230 can include one or more electrochemical cells configured to store electrical energy or power. Although the energy storage device 230 is depicted as a single entity, it should be understood that the energy storage device 230 can be configured to comprise any number of energy storage components. The energy storage components can be electrically coupled in a series configuration, a parallel configuration, or a combination series-parallel configuration to create the energy storage device 230. In some implementations, the energy storage device 230 is comprises of several discrete (e.g., not electrically coupled to each other) energy storage components described herein. The energy storage device 230 can have a predetermined capacity, current charge level, determined rate of charge, discharge rate, or charge rate. The energy storage device 230 can be electrically coupled to the controller 205.

The energy consumption device 225 can be, for example, any of the loads related to one or more nanogrid critical loads 138, any other electrical load described herein, or any type of device that can consume electrical power. The energy consumption device 225 can be one or more of any type of device that can consume electrical power, for example utility appliances, water heaters, electromagnetic components, or any component required to facilitate the transmission of power amongst the components of the systems described herein. In some implementations, the energy consumption device 225 can represent the energy requirements of one or more homes or buildings, and each of its associated electrical components. In some implementations, the energy consumption device 225 can consume power by converting electrical energy into a form of energy that cannot be readily converted back into electrical energy. One can assume that once energy is transmitted to and consumed by the energy consumption device 225, the electrical power cannot be converted back to electrical power and used by any of the other components of the systems described herein. The energy consumption device 225 can be electrically coupled to the controller 205.

Figure 5B:
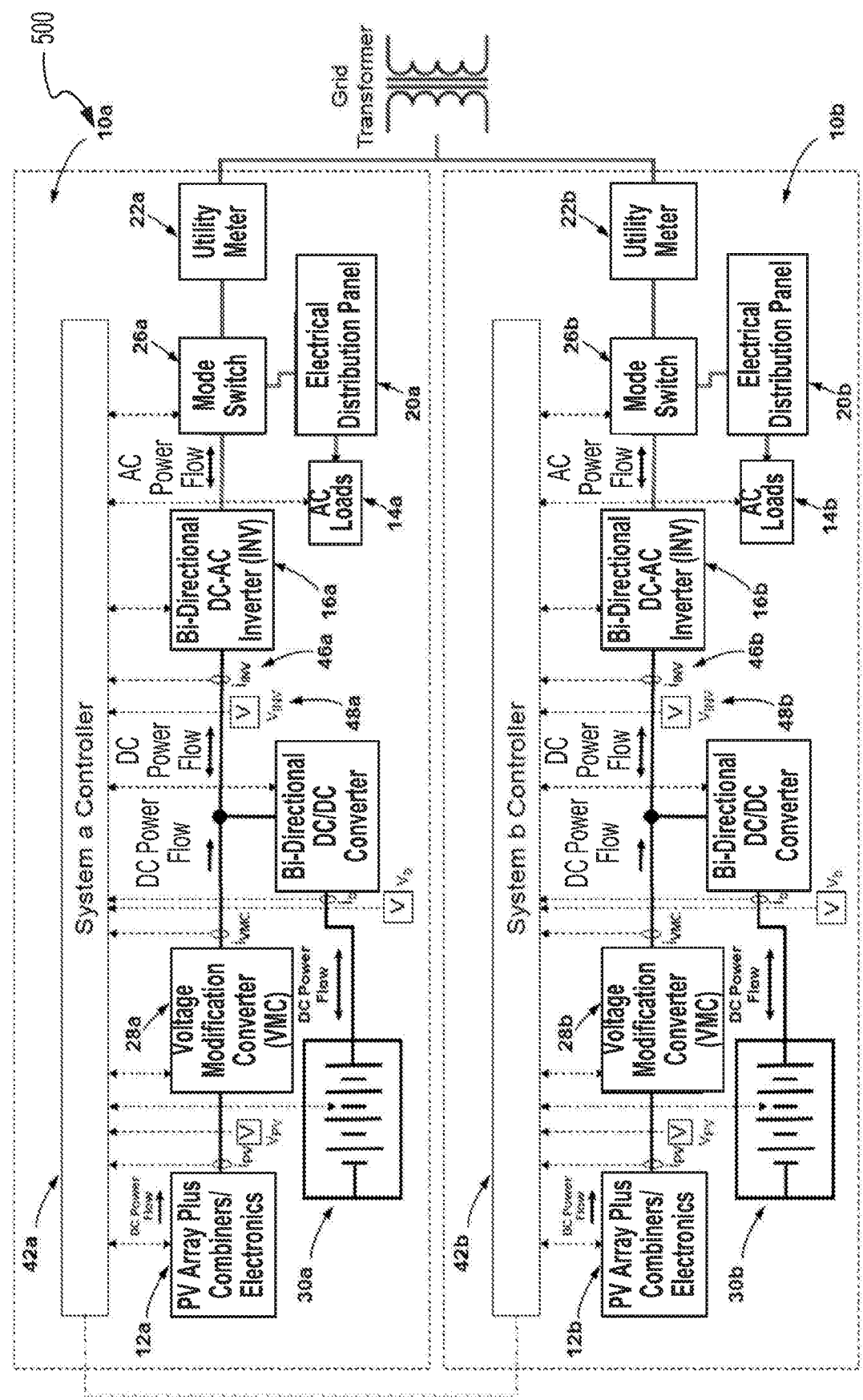
FIG. 5B illustrates an example schematic diagram of a system for generating energy across parallel energy nanogrids.

The generation device 220 can be, for example, any of the electrical generation devices described herein, including the electrical generation device 131, the renewable power sources 12 shown in FIG. 5A, the PV array 12*a-b* shown in FIG. 5B, the photovoltaic modules 1702 shown in FIG. 17, the wind turbines 1703 shown in FIG. 17, or any other device capable of generating electrical power. The generation device 220 can include one or more renewable sources of energy, for example photovoltaic arrays, wind turbines, hydroelectric power generators, geothermal electric power generators, or any combination thereof. The generation device 220 can be capable of generating electrical power with a voltage and a current. The electrical power may be generated constantly, or tied to the presence of a particular physical phenomenon (e.g., direct sunlight, wind blowing, etc.). The generation device 220 can include an output interface, capable of transmitting electrical power to one or more components of systems described herein (e.g., the architecture 100, the system 200, the system 300, etc.). In some implementations, the generation device 220 can include one or more power generation devices in a series configuration, a parallel configuration, or a combination series-parallel configuration. The generation device 220 can include one or more sensors configured to provide the controller 205 with an accurate reading of the current output, the voltage output, the power output, operating conditions (e.g., temperature, uptime, etc.), and other generation information.

The transmission device 240 can be any type of switch, for example the mode switch 137, any other type of switch, or an electrical node that is capable of receiving, routing, and transmitting power between components in the system 200. The transmission device can be communicatively coupled with the controller 205 as well as electrically coupled with the controller 205. The communications interface of the transmission device 240 can be configured such that the electrical output from any of the components of the system 200 do not interfere with any communication messages provided from or to the controller 205. The transmission device 240 can be configured to transmit power between one or more additional controller configurations (e.g., nanogrids 130). The transmission device 240, in addition to transmitting power throughout the system, can provide power requests from other components in the system 200 to the controller 205. The transmission device can be electrically coupled with an electric grid system (e.g., the centralized grid 110, the centralized grid 112, etc.). The electric grid system may provide transmission device 240 with one or more power requests, which may subsequently be transmitted to the controller 205.

The transmission device 240 can include or be connected to computer networks such as the Internet, local, wide, metro or other area networks, intranets, satellite networks, other computer networks such as voice or data mobile phone communication networks, and combinations thereof. The controller 205 of the system 200 or the system 300 can communicate via the network 110, for instance with at least one other controller 205N, at least one other transmission device 240N, and at least one grid node 250. The transmission node 240 can be coupled to a network that may be any form of computer network that relays information between the components of the system 200, the components of the system 300, the controller 205, and one or more web servers, among others. The transmission device 240 can be communicatively coupled with the Internet and/or other types of data networks, such as a local area network (LAN), a wide area network (WAN), a cellular network, a satellite network, or other types of data networks. The transmission device 240 may also include any number of computing devices (e.g., computers, servers, routers, network switches, etc.) that are configured to receive and/or transmit data to other components of the system 200, the components of the system 300, or any other computing device or component described herein. The transmission node 240 may further include any number of hardwired and/or wireless connections. In some implementations, the controller 205 may communicate wirelessly (e.g., via WiFi, cellular, radio, etc.) with a transceiver that is hardwired (e.g., via a fiber optic cable, a CAT5 cable, etc.) to other computing devices in the transmission node 240. The transmission node 240 can include one or more transformers or one or more electrical interfaces configured to transmit electrical power between the components of the system 200, the components of the system 300, or any other components described herein. The transmission node 240 can be electrically coupled to one or more grid nodes 250A-N, and one or more controllers 205A-N.

The grid node 250 can be any type of node capable of transmitting power between additional grid nodes 250 or transmission nodes 240. The grid node 250 can include, for example, one or more transformers that correspond to one or more of the transformer 121 or the centralized grid transformer 111. The grid node can facilitate the transfer of power between the components of the system 200, the components of the system 300, or any other components described herein by efficiently converting and transmitting power throughout the system. For example, the grid node 250 may step-up voltage, and step-down current, thereby maintaining a similar amount of electrical power, to transmit over long distances, increasing the transmission efficiency of the system by reducing lost power. If transmitting power over short distances, the grid node 250 may step down the voltage, and step-up the current, thereby maintaining a similar amount of electrical current, while increasing the safety of the system by reducing high voltage risks. The grid node 250 may be coupled to one or more centralized grid loads, for example the centralized grid node load 113.

Figure 3:
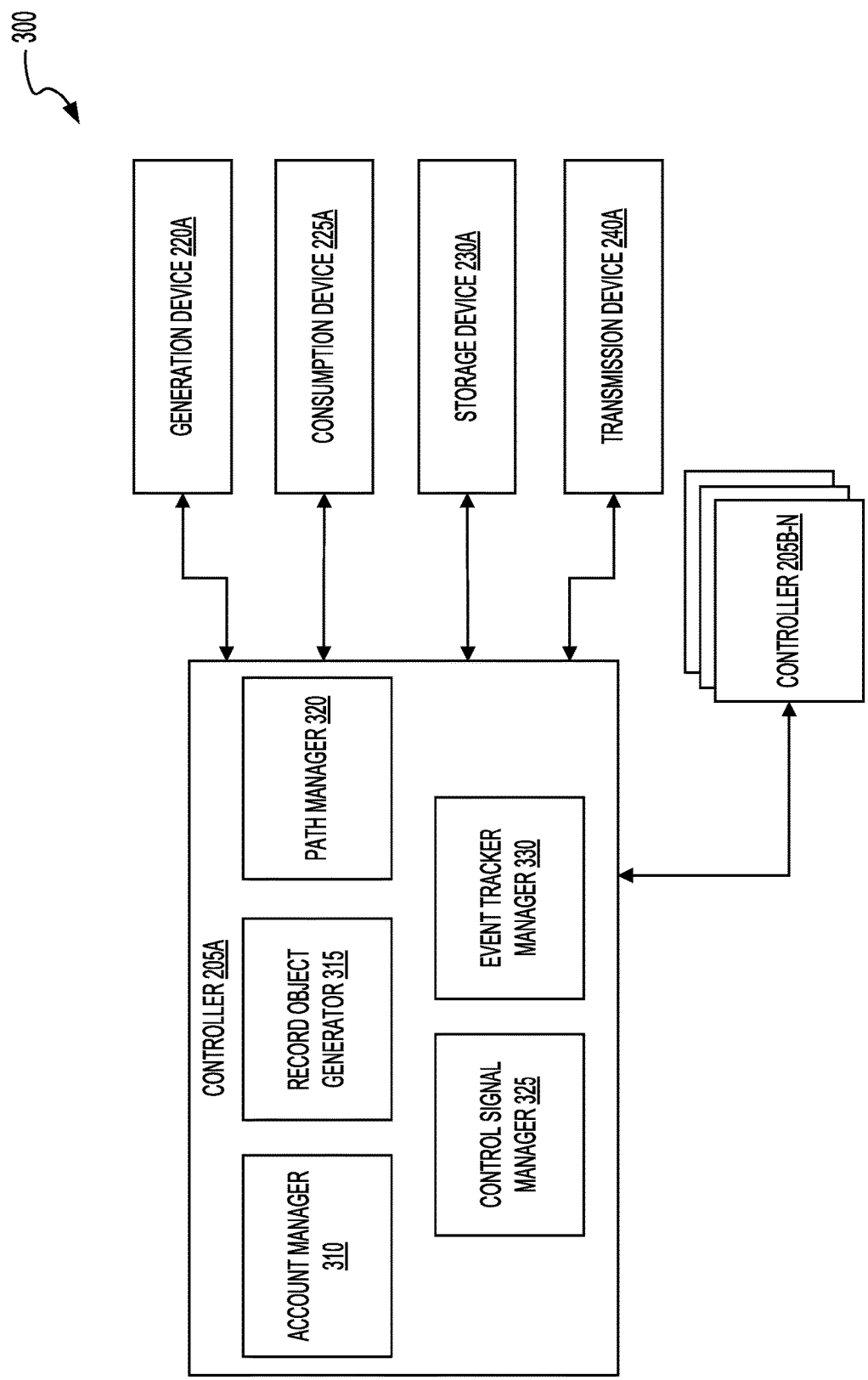
FIG. 3 illustrates an example implementation of a system including a controller capable of distributing power amongst the components of the system.

The controller 205, described herein in greater detail in conjunction with FIG. 3, can be electrically coupled to teach of the energy storage device 230, the energy consumption device 225, the generation device 220, and the transmission device 240. The controller can select one or more paths to route electrical power between each of the components of the system 200. Using the transmission node or a network interface, the controller 205 can receive information from an electrical grid, represented in here as grid node 250A-N. The controller 205 can receive information pertaining to an electrical network, including the device status (e.g., state of charge, current load demand, current device health, whether a device is operating properly, operating conditions, temperature values, current demand, total amount of load, amount of input current, amount of input voltage, amount of output current, amount of output voltage, amount of input power, amount of output power, amount of generated power, amount of consumed power, amount of consumed energy, amount of generated energy, etc.) of any device in any of the system 200 or the system 300. The electrical network can include any of the devices in the system 200 or the system 300. The controller 205 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The controller 205 can include one or more computing devices or servers that can perform the various functions described herein.

Referring now to FIG. 300, and describing the controller 205 in greater detail, depicted is a system 300 for the distribution of electrical power between components based on networking analytics. The system 300 can include at least one controller 205A-N (sometimes generally referred to as controller 205), at least one generation device 220A (sometimes generally referred to as generation device 220), at least one energy consumption device 225A (sometimes generally referred to as energy consumption device 225), at least one energy storage device 230A (sometimes generally referred to as energy storage device 230), and at least one transmission device 240A (sometimes generally referred to as transmission device 240). The system 300 can further include other controllers 230B-N, which can be communicatively coupled with the controller 205. Although not explicitly depicted in FIG. 3, it should be understood that any of the components of the architecture 100 or the system 200 can be included in the system 300, in accordance with one or more implementations.

The controller 205 can include at least one account manager 310, at least one record object generator 315, at least one path manager 320, at least one control signal manager 325, and at one event tracker manager 330. Each of the components (e.g., the controller 310, the record object generator 315, the path manager 320, the control signal manager 325, the event tracker manager 330, the controller 205, etc.) of the system 300 can be implemented in hardware or software. For example, each of the components of the system 300 can be implemented using the hardware components or a combination of software with the hardware components of the server system 3000 or the client computing system 3014 detailed herein in conjunction with FIG. 18. For example, the controller can include servers or other computing devices. Each of the components of the controller 205 can perform the functionalities detailed herein.

The account manager 310 can maintain, in one or more data structures, a plurality of accounts. In some implementations, the account manager 310 can maintain, in one or more data structures, a status of each account of a plurality of accounts. Each of the plurality of accounts can correspond to one of the generation device 220, the energy consumption device 225, the energy storage device 230, and the transmission device 240. One or more of the accounts can include one or more record objects that correspond to a respective unit of power or energy. The unit of energy can correspond to a unit of power generated over a particular time constant, or during a predetermined or dynamically determined time period. The time period or time constant can be determined, for example, by analyzing the data of the gathered from the sensors of each component of the system 200 or the system 300. Such data can be used to determine thresholds that define the units of power and the units of energy that are generated, transferred, stored, and consumed in any of the systems described herein. Each account can include one or more data structures maintained in the memory of the controller 205. For example, the account can include information related to the status of the corresponding device, such as the state of the device, the level of charge of the device, uptime of the device, and degradation of the device, among others. The accounts can be maintained to track one or more units of energy as they travel amongst the components of the system 300. The accounts can include one or more records of energy transmissions, token identifiers, device identifiers, or other identifying information about each device (e.g., the generation device 220, the energy consumption device 225, the energy storage device 230, the transmission device 240, the controller 205, etc.), or the paths taken by each unit of energy. Each account can include information related to the losses or electrical inefficiencies of each of the corresponding components of system 300. Each account can maintain one or more record objects associated with generated or requested units of power that have entered or have been produced by the system 300.

The record object generator 315 can generate a record object responsive to the generation device 220 generating a unit of power or a unit of energy (e.g., the unit of power over a predetermined or dynamically determined time constant, etc.). The record object can identify an identifier of the generation device 220 and a value corresponding to a voltage associated with the generated unit of power or energy and a value corresponding to the current of a generated unit of power or energy. Each record object can include a record object identifier (e.g., a hash, a unique number value, or another type of identifying value or data structure, etc.). The record objects can be generated, for example, by performing one or more generation functions using the identifier of the generation device 220. The record object can include one or more timestamps corresponding to the time the unit of power or energy was generated. The record object can be any of the first, second, or third tokens as described herein below. The record object can include one or more power values that indicate the amount of power corresponding to the record object. The record object can include one or more tokens, tags, labels, or other identifiers that identify a status of the record object. The status of the record object can include, for example, generated, stored, transmitted, received, requested, consumed, to be transmitted, to be stored, or any other type of status identifier described herein. The record object can include information about the type of electrical power generated (e.g., DC, AC, signal type, etc.).

Depicted below in Table 1 is an example representation of a record object created in response to a unit of power or energy being generated by a generation device 220 named 'generation_device0'.

TABLE 1

| Record Object Unique Identifier | Label | Token | Amount | Timestamp | Tag | Status |
|---|---|---|---|---|---|---|
| 0x . . . ABCD0123 | generation_device0 | Generated Power | 1 kWh | 20 Jan. 2020, 14:30 pm EST | Energy type = wind | Generated, unrouted |

The record object generator 315 can obtain the voltage and the current of an output of the generation device 220. The record object generator 315 can poll, request, or otherwise communicate with one or more sensors at the output interface of the generator device 220. The sensors can include temperature sensors, voltage sensors, current sensors, power factor sensors, timers, clocks, or other types of sensors. The record object generator 315 can communicate with these sensors to retrieve generated power information from the generator device 220. The record object generator 315 can store, in one or more data structures in the memory of the controller 205, the measured values obtained from the sensors in association with one or more measurement timestamps. The record object generator 315 can poll, request, or otherwise communicate with the sensors to measure the voltage and the current periodically, continuously, or in response to one or more signals received from the other components of the system 200, the components of the system 300, or any other components or modules described herein. For example, the record object generator 315 can receive an indication from the generation device 220 indicating that power is being generated. In response to the indication, the record object generator 315 can poll the sensors at the output of the generation device 220 to determine the amount of power (e.g. the voltage and the current), that is being generated by the generation device 220.

The record object generator 315 can determine that the measured voltage and the measured current satisfy a threshold corresponding to a function based at least on the voltage and the current. In some implementations, the threshold can be a predetermined value stored in the memory of the controller 205. In some implementations, the threshold may be determined dynamically based on the status of each account of the plurality of accounts maintained by the account manager 310. For example, the function can be an amount of power generated by the generation device 220, represented by a product of the voltage and current measured from the sensors of the generation device 220. The function can be an amount of energy generated by the generation device 220 over a given period of time, for example a product of the voltage, the current, and a predetermined, calculated, or received time period. The function can be a specific voltage or current characteristic, which can be dependent on the individual values of voltage and current exceeding one or more predetermined or dynamically determined thresholds. In some implementations, the record object generator 315 can compare the values of the current and the voltage to predetermined values stored in the memory of the controller 205. If the values of one or more of the current and voltage exceed the one or more thresholds, the record object generator 315 can determine that that measured voltage and the measured current satisfy the threshold corresponding to the function. In some implementations, there may be more than one function, where each function corresponds to one of the current, the voltage, the type of generation device 220, or a period of time. The record object generator 315 can generate the record object in response to determining that the voltage and the current satisfy the threshold. For example, upon detecting that the threshold has been exceeded, the record object generator 315 can determine that a predetermined unit of power or energy has been generated, and generate a record object to correspond to that generated unit of power or unit of energy. The generated record object can include information about the functions used define the one or more thresholds.

The account manager 310 can update an account of the plurality of accounts corresponding to the generation device 220 by associating the record object with the account. The account manager 310 can access the account corresponding to the generation device 220 by accessing one or more data structures in the memory of the controller 205. The account manager 310 can insert the record object into the account by copying the data associated with the record object into the data structure corresponding to the account. In some implementations, the account manager 310 can insert, write, or otherwise associate a pointer to the location in memory of the record object into the account associated with the generation device 220. For example, the account manager 310 can insert the pointer to the record object, a time stamp corresponding to the generation of the unit of power or energy, and other information about the record object in the account. In some implementations, the account manager 310 may modify the record object to include one or more account identifiers corresponding to the account associated with the generation device 220, thereby indicating in the record object itself that it is associated with the generation device 220.

The account manager 310 can transmit, to at least one second controller 205B-N, a request to confirm the generation of the unit of power or energy by the generation device 220. The second controller 205B-N can be configured to append an event to a second event tracker maintained by the at least one second controller 205B-N. The event appended to the second event tracker can indicate the generation of the unit of power or energy by the generation device 220. To confirm the generation of the unit of power or energy and include a record of the generation in a distributed data structure ledger (e.g., a blockchain, or other type of data structure that is difficult to modify, etc.), the account manager 310 can generate and transmit a request to confirm the generation of the unit of power or energy by indicating that a corresponding record object has been generated by the record object generator 315. The request can include any of the information in the record object, a hash of the record object, additional data about the generation device, a hash of the account of the generation device, an identifier of the generation device, a timestamp corresponding to the generation of the unit of power or energy, or any other information generated, received, accessed, or measured by the controller 205 or its components. Upon receiving the request, the one or more second controllers 205B-N can perform one or more mathematical computations to determine a next block in the distributed data structure ledger. Upon determining the next block, the one or more second controllers 205B-N can append, to the distributed data structure ledger, an event message indicating that the respective unit of power or energy has been generated by the generation device 220, and is indicated by the record object generated by the record object generator 315. The one or more second controllers 205B-N can transmit the appended distributed data structure ledger to every controller 205A-N in the system 200, the system 300, or any other system described herein, thereby indicating to each of the controllers that a unit of energy has been generated by the generation device 220.

An example implementation of a distributed data structure ledger is included below in Table 2, indicating additional energy transactions between one or more energy devices in the system 300.

TABLE 2

| Block ID | Source Device ID | Destination Device ID | Record Object ID | Timestamp | Confirmation ID |
|---|---|---|---|---|---|
| ... | ... | ... | ... | ... | ... |
| | ... | ... | ... | ... | ... |
| 2 | generation_device0 | storage_device0 | 0x ... ABCD0123 | 20 Jan. 2020, 15:33 pm EST | controller004 |
| | generation_device2 | storage_device1 | 0x ... 3210DCBA | 20 Jan. 2020, 15:35 pm EST | controller004 |
| 3 | storage_device0 | consumption_device5 | 0x ... ABCD0123 | 20 Jan. 2020, 16:00 pm EST | controller006 |
| | storage_device1 | consumption_device2 | | 20 Jan. 2020, 15:45 pm EST | controller006 |
| ... | ... | ... | ... | ... | ... |
| | ... | ... | ... | ... | ... |

The account manager 310 can receive an indication from the at least one second controller 205B-N. The indication can include a confirmation message. The confirmation message can include the next block in the distributed data structure ledger (e.g., the block with the next greatest block ID, etc.), which can include the confirmation that the unit of power or energy was generated by the generation device 220. The confirmation can include a time stamp indicating the time of confirmation, and may include additional confirmations of additional energy transactions conducted throughout the system 200, the system 300, or any other system described herein. The confirmation message can include a value corresponding to the confirmation by the one or more second controllers 205B-N. Responsive to receiving the indication including the confirmation message, the account manager 310 can update the account of the plurality of accounts corresponding to the generation device 220. The account manager 310 can access the account to include the confirmation message or one or more values contained therein. In addition to the confirmation message, the account manager 310 can insert, include, or otherwise indicate in the account corresponding to the generation device 220 that the record object associated with the generated unit of power or energy has been confirmed by the one or more second controllers 205.

The path manager 320 can identify, from a plurality of paths, a path along which to transmit the unit of power or energy generated by the generation device 220. The identified path can identify the generation device 220 as a source device. Section B describes how in some implementations, the path manager 320 can identify the path based on a status, account information, or device information associated with each of the energy storage device 230, the energy consumption device 225, or the transmission device 240. In some implementations, the identified path can identify any of the generation device 220, the energy storage device 230, or the transmission device 240 as the source device. The identified path can identify a respective one of the energy consumption device 225, the energy storage device 230, or the transmission device 240 as a destination device. The path manager 320 can identify the path based on the status of a respective account of the plurality of accounts corresponding to one of the energy consumption device 225, the energy storage device 230, or the transmission device 240. Each path can represent a path that electrical energy can follow to be transmitted from one or more source component of the system 300 to one or more destination component of the system 300. The path manager 320 can identify the path based on a status of each of the devices (e.g., the generation device 220, the energy storage device 230, the energy consumption device 225, and the transmission device 240). In some implementations, the path can be identified by assessing the amount of electrical need at each of the devices. For example, if the path manager 320 determines that one of the devices has an increased load and requires more power, the path manager 320 can identify the path associated with the device as the identified path. In some implementations, the path manager can identify the path in response to a condition of the energy storage device 230 (e.g., needs to be charged, should not be overcharged, etc.). In some implementations, the path manager can identify the path in response to a signal received from the transmission device 240 indicating a request for electrical power. In some implementations, the path identified by the path manager 320 can be dependent on the type of generation device 220.

The account manager 310 can analyze the events catalogued by the event tracker (e.g., the distributed data ledger described above with respect to Table 2, etc.) to determine a device status of each of the devices associated with the plurality of accounts maintained by the account manager 310. Each of the accounts for a particular device can include information describing electrical characteristics (e.g., rated voltage, rated current, etc.), electrical operating conditions (e.g., maximum charge, ideal level of charge, optimal charge/discharge rate, etc.) of the respective device. Based on information in the distributed ledger (e.g., the amount of energy transmitted in each record object, the net flow of electricity between any two devices, etc.), the account manager 310 can update a status or condition of the device. For example, the account manager can determine an overall level of charge of a storage device 230 relative to its overall charge capacity. Based on the charge characteristics of storage device 230 stored in its respective account, the account manager 310 can determine the level of charge of the storage device 230, and whether additional electrical power can/should be stored by the storage device 230. The path manager 320 can access this account information to determine whether to route energy to any particular component in the system 300, in this example whether to continue charging the energy storage device 230, or distribute any generated electrical power to the other loads (e.g., the energy consumption device 225, the transmission device 240, etc.) of the system 300.

The account manager 310 can further access the distributed data ledger to generate and maintain one or more power profiles of each device (e.g., the energy generation device 220, the energy consumption device 225, the storage device 230, the transmission device 240, etc.) in the system 300. The power profiles can include historical data that indicates an amount of energy generated by, transmitted to, stored in, or transmitted from each device. Based on the electrical characteristics present in each of the accounts corresponding to each device, the account manager 310 can maintain, in each power profile associated with each device, a historical power map representing the overall patterns of power distribution to and from each respective device. The power map can include an overview of power distribution associated with the respective device based on one or more seasonalities. The seasonalities can include, for example, a period of time such as daily patterns, weekly patterns, monthly patterns, seasonal patterns, and other energy distribution patterns over similar periods of time. Due to their increased duration, the account manager 310 may continuously or periodically build the power profiles for each device in the system 300 over the lifetime of each device, or in response to one or more triggers received from a network (e.g., the Internet coupled to the transmission device 240). The account manager 310 may publish the power maps, for example, by creating and modifying a webpage to display the power distribution data on one or more client devices.

The path manager 320 can identify the path along which to transmit the generated unit of power or energy, or any other unit of power or energy transmittable throughout the system 300, based on the seasonality information of the power profiles included each respective account. Accordingly, the power profiles generated and maintained by the account manager 310 can work in tandem with the power path selection systems of the path manager 320, to determine optimal paths for generated power based on historical device needs. For example, if, at night, it is determined that almost no energy is generated by the energy generation device 230 (e.g., it is a solar panel, etc.), the path manager 320 may identify the path to transmit the unit of power or energy such that the storage device 230 can maintain a charge throughout the night. This determination may also take into account the overall capacity, discharge rate, and historical electrical demands of the transmission device 240 and the consumption device 225. Accordingly, the path manager 320 can predict the overall energy requirements of the system 300 and route, store, request, and generate energy to maintain the operating power requirements of the system 300 and the loads therein (e.g., the transmission node 240, the consumption device 225, etc.).

Further, the path manager 320 can determine the type of generation device 220. The path manager 320 can access one or more data structures (e.g., the account, other identifying information, etc.) stored in the memory of the controller 205 and associated with the generation device 220. For example, the path manager 320 can access the identifier of the generation device 220 and compare it to a look-up table of known generation devices. If the path manager 320 determines that there is a match, the path manager 320 can extract the generation device 220 information from the lookup table to determine the type of generation device 220.

The path manager 320 can identify the path along which to transmit the generated unit of power or energy based on the type of the generation device 220. Each type of generation device 220 can generate a different type of power. In order for the generated electricity to be usable by the components of the system 300, the electrical energy generated by the generation device 220 can be converted, regulated, or otherwise modified to be in a usable form. For example, the voltage generated by a photovoltaic cell may need to pass through a DC-DC converter before it can be used to charge battery. Likewise, before being transmitted to the grid, electrical power can be transmitted through one or more inverters to convert the DC current into AC current. As such, the identified path can correspond to the type of electrical power generated by the generation device 220, and therefore based on the type generation device 220. Each path can be associated with one or more identifiers of a source device and one or more identifiers of a destination device. In some implementations, the path manager 320 can identify the path along with to transmit the generated unit of power or energy based on the type of each possible destination of the plurality of paths.

The path manager 320 can determine an objective function for each path of the plurality of paths. Each objective function can represent a loss of electrical power associated with the corresponding path. Because each destination may have additional requirements as to the conversion or regulation of the electrical power produced or stored by the system, each possible path of electrical power is associated with a particular loss function. For example, a particular path may be associated with a certain amount of resistive loss. The resistive loss can be affected by, for example, the temperature, transmission distance, overall path current, overall path voltage, and the number of devices/conversions that are present in the path, among others. The path manager 320 can gather data from one or more sensors associated with each path to measure and calculate the total resistive loss of each path. For example, the path manager 320 can determine the amount of resistive loss using one or more ohm sensors, voltage drop sensors, or other type of power loss sensors. If a path is associated with a particular type of power conversion (e.g., DC-DC conversion, DC-AC conversion, AC-DC conversion, AC-AC conversion, etc.), the path manager 320 may access information about the energy conversion on the path to determine the overall efficiency loss from the conversion operation. For example, the path manager 320 may access one or more data structures in the memory of the controller 205 to determine a loss function for each type of power conversion. The function may take as an input, for example, the input power, the input voltage, the input current, the output power factor, the output voltage, the output current, information identifying the type of power converters, and other information.

The path manager 320 can identify the path along which to transmit the generated unit of power or energy based on the objective functions corresponding to each of the plurality of paths. Using the functions associated with each of the paths, the path manager can access the power information (e.g., the voltage sensor information, the current sensors information, type of generation device, etc.) to determine the inputs to each function associated with each path. Upon determining the inputs, the path manager 320 can use each function, and the inputs of that function, to determine an overall power loss associated with that path. The path manager 320 can gather additional path information from each device status stored in the accounts maintained by the account manager 310. The path manager 320 can access one or more device status values (e.g., state of charge, state of health, overall uptime, device charge profiles, device discharge profiles, maximum power limitations, optimal power settings, optimal current settings, optimal voltage settings, etc.) to determine one or more objective functions that correspond to a minimized loss value for each device along each path. In some implementations, the path manager 320 can determine that the lifespan of certain components (e.g., the energy storage device 230) may be extended by operating each component within certain electrical limitations. For example, the storage device 230 may operate with a maximum lifespan if it never drops below 20% charge. In accordance with this example limitation, the path manager 320 may identify the path based on the current charge state of the storage device 230, such that the overall charge of the storage device 230 never falls below 20%. The path manager 320 can then select, for example, the path that corresponds to the least amount of electrical power lost by the system. Accordingly, the path manager 320 can identify, enumerate, and compare the values of each path, along with additional considerations (e.g., requests for power, status of each device, storage requirements, status of other controllers, status of the grid node 250, etc.), to determine the optimal path to transmit power, which is a significant improvement to power distribution systems.

The control signal manager 325 can generate a control signal to route the generated unit of power or energy from the identified source device and the identified destination device. The control signal manager 325 can be electrically coupled, for example, with one or more switches used to route power throughout the system 300 (e.g., the mode switches 137, etc.). Each switch can include one or more transistors, relays, electrical switches, or other type of device used to receive and transmit power to a particular destination. The control signal generator 325 can access one or more lookup tables using the identifiers of the one or more source devices of the identified path to determine the one or more switches to actuate or control. The control signal generator 325 can access one or more lookup tables using the identifiers of the one or more destination devices of the identified path to determine the one or more switches to actuate or control. In response to determining which switches to actuate or control, the control signal manager 325 can generate one or more control signals that correspond to each switch. In some implementations, the control signal manager 325 may generate signals to block one or more switches or paths present in the system 300. For example, in order to protect certain components of the system from damage from high voltage or high current, the control signal manager 325 can generate one or more control signals to electrically isolate the protected component.

The event tracker manager 330 can update an event tracker maintained by the controller in response to routing the generated unit of power or energy. The event tracker manager 330 can include in the event tracker an event indicating the routing of the generated unit of power or energy from the source device to the destination device. The event tracker manager 330 can determine that a generation event has occurred based on the generated record object. The event can include an identifier of the account associated with the source device, an identifier of the account associated with the destination device, a public key associated with the source device, a public key associated with the destination device, a timestamp associated with the routing of the power, an amount of power routed, the record object corresponding to the routed power, an indication of a transaction between the source device and the destination device, the type of generation device, the type of record object, controller 205 metadata, the voltage and current associated with the energy transfer, the type of destination device, the type of source device, and any other information associated with the energy transfer between the source device and the destination device of the identified path.

The event tracker can be a distributed data structure, a copy of which can be maintained in the memory of the controller 205. In some implementations, the event tracker may be local to the components coupled to the controller 205 (e.g., a first event tracker), and maintain each of the events that correspond to energy transmission or generation amongst the components of the system 300. In some implementations, a copy of the event tracker is maintained by each of the second controllers 205B-N. Updating the event tracker can include appending, to the event tracker, the transmission event. The event tracker can be one or more blockchain data structures, or other types of distributed data structures that are impossible to modify after it has been confirmed by the computing devices maintaining the data structure. The data structure can include a record of each transaction (e.g., energy transfer event) that has occurred amongst the components of the system 300. In some implementations, the event tracker can maintain only the record of transactions for a predetermined period of time (e.g., most recent day, most recent 3 days, most recent week, most recent month, most recent year, etc.), as energy in a grid based system is typically consumed shortly after it is generated.

The event tracker manager 330 can transmit, to at least one second controller 205B-N, a request to confirm the routing of the first unit of power or energy from the source device to the destination device. The second controller 205B-N can be configured to append an event to a second event tracker maintained by the at least one second controller 205B-N. The event appended to the second event tracker can indicate the routing of the unit of power or energy from the source device to the destination device, where the source device and destination device are identified by the identified path. To confirm the routing of the unit of power or energy from the source device to the destination device and include it in a distributed data structure ledger (e.g., blockchain) such that it may be impossible to modify, the event tracker manager 330 can generate and transmit a request to confirm the routing of the unit of power or energy by indicating a corresponding event object in the request. The request can include any of the information associated with the event, including the source device, the destination device, the account information associated with each of the source and destination devices, various device identifiers of each device in the system, and any other path information described herein. The event can include an identifier of the account associated with the source device, an identifier of the account associated with the destination device, a public key associated with the source device, a public key associated with the destination device, a timestamp associated with the routing of the power, an amount of power routed, the record object corresponding to the routed power, an indication of a transaction between the source device and the destination device, the type of generation device, the type of record object, controller 205 metadata, the voltage and current associated with the energy transfer, the type of destination device, the type of source device, and any other information associated with the energy transfer between the source device and the destination device of the identified path. Upon receiving the request, the one or more second controllers 205B-N can perform one or more mathematical computations to determine a next block in the distributed data structure ledger. Upon determining the next block, the one or more second controllers 205B-N can append, to the distributed data structure ledger, an event message indicating that the respective unit of power or energy has been generated by the generation device 220, and is indicated by the record object generated by the record object generator 315. The one or more second controllers 205B-N can transmit the appended distributed data structure ledger (e.g., blockchain) to every controller 205A-N in the system 200, the system 300, or any other system described herein, thereby indicating to each of the controllers that a unit of energy has been routed from the source device to the destination device.

The event tracker manager 330 can receive an indication from at least one of the second controllers 205B-N including a confirmation message. The confirmation message can include the next block in the distributed data structure ledger (e.g., the blockchain), which can include the confirmation that the unit of power or energy was routed from the source device to the destination device. The confirmation can include a time stamp indicating the time of confirmation, and may include additional confirmations of additional energy transactions conducted throughout the system 200, the system 300, or any other system described herein. The confirmation message can include an identifier value corresponding to the confirmation by the one or more second controllers 205B-N. Responsive to the receipt of the indication including the confirmation message, the event tracker manager 330 can update the event tracker to include the event indicating the routing of the first unit of power or energy from the source device to the destination device. The event tracker manager 330 can access and modify the event tracker to include the confirmation message or one or more values contained therein. In addition to the confirmation message, the event tracker manager 330 can insert, include, or otherwise indicate in the account corresponding to the destination device that the record object associated with the routed unit of power or energy has been confirmed by the one or more second controllers 205.

The record object generator 315 can generate a second record object corresponding to the generated unit of power or energy routed to the destination device. The second record object can identify or include an identifier of the destination device of the identified path. The second record object can include one or more indications of a power transfer event associated with the identified path, and can include an identifier of the corresponding generation device, the corresponding source device, and the corresponding destination device. The second record object can identify a value corresponding to a voltage associated with the routed unit of power or energy and a value corresponding to the current of the routed unit of power or energy. The second record object can include a record object identifier (e.g., a hash, a unique number value, or another type of identifying value or data structure, etc.). The second record object can be generated, for example, by performing one or more generation functions using the identifier of the source device, the identifier of the destination device, or an identifier associated with the identified path. The second record object can include one or more timestamps corresponding to the time the unit of power or energy was routed. The second record object can include one or more power values that indicate the amount of power corresponding to the record object. The second record object can include one or more tokens, tags, labels, or other identifiers that identify a status of the second record object. The record object can be any of the first, second, or third tokens as described herein below. The status of the record object can include, for example, generated, stored, transmitted, received, requested, consumed, to be transmitted, to be stored, or any other type of status identifier described herein. The record object can include information about the type of electrical power generated (e.g., DC, AC, signal type, etc.), the source device, and the destination device.

The record object generator 315 can determine that the destination device is the energy consumption device 225. Prior to generating the second record object, the record object generator can access one or more data structures (e.g., accounts) associated with the destination device of the identified path to determine the type of the destination device. The record object generator 315 can generate different types of second record objects based on the type of destination device. After accessing the accounts maintained in the memory of the controller 205, the record object generator 315 can use one or more lookup tables and the identifier associated with the destination device to determine whether the destination device is the energy consumption device 225. If the destination device is the energy consumption device 225, the record object generator 315 can assign a value to the record object indicating that the first unit of power or energy corresponding to the record object is consumed. For example, the value can indicate, corrupt, or otherwise render the record object unusable, unreadable, or non-transferrable. Because the energy associated with the record object has been converted into a form that cannot be recovered by the system, the record object need not be tracked or maintained by the system. Accordingly, in some implementations, the event tracker manager 330 can update the distributed data structure ledger (e.g., blockchain) indicating that the respective record object has been destroyed. The record object generator 315 can subsequently delete the record object and its associated data.

The account manager 310 can update a second account of the plurality of accounts to include the second record object. The account manager 310 can update the second account based on routing the generated unit of power or energy to the destination device. The second account can correspond to the destination device. The account manager 310 can access the account corresponding to the destination device by accessing one or more data structures in the memory of the controller 205. The account manager 310 can insert the second record object into the second account by copying the data associated with the second record object into the data structure corresponding to the second account. In some implementations, the account manager 310 can insert, write, or otherwise associate a pointer to the memory location of the second record object into the second account associated with the destination device. For example, the account manager 310 can insert the pointer to the second record object, a time stamp corresponding to the routing of the unit of power or energy, and other information about the second record object in the account. In some implementations, the account manager 310 may modify the second record object to include one or more account identifiers corresponding to the second account associated with the destination device, thereby indicating in the second record object itself that it is associated with the destination device.

Figure 4:
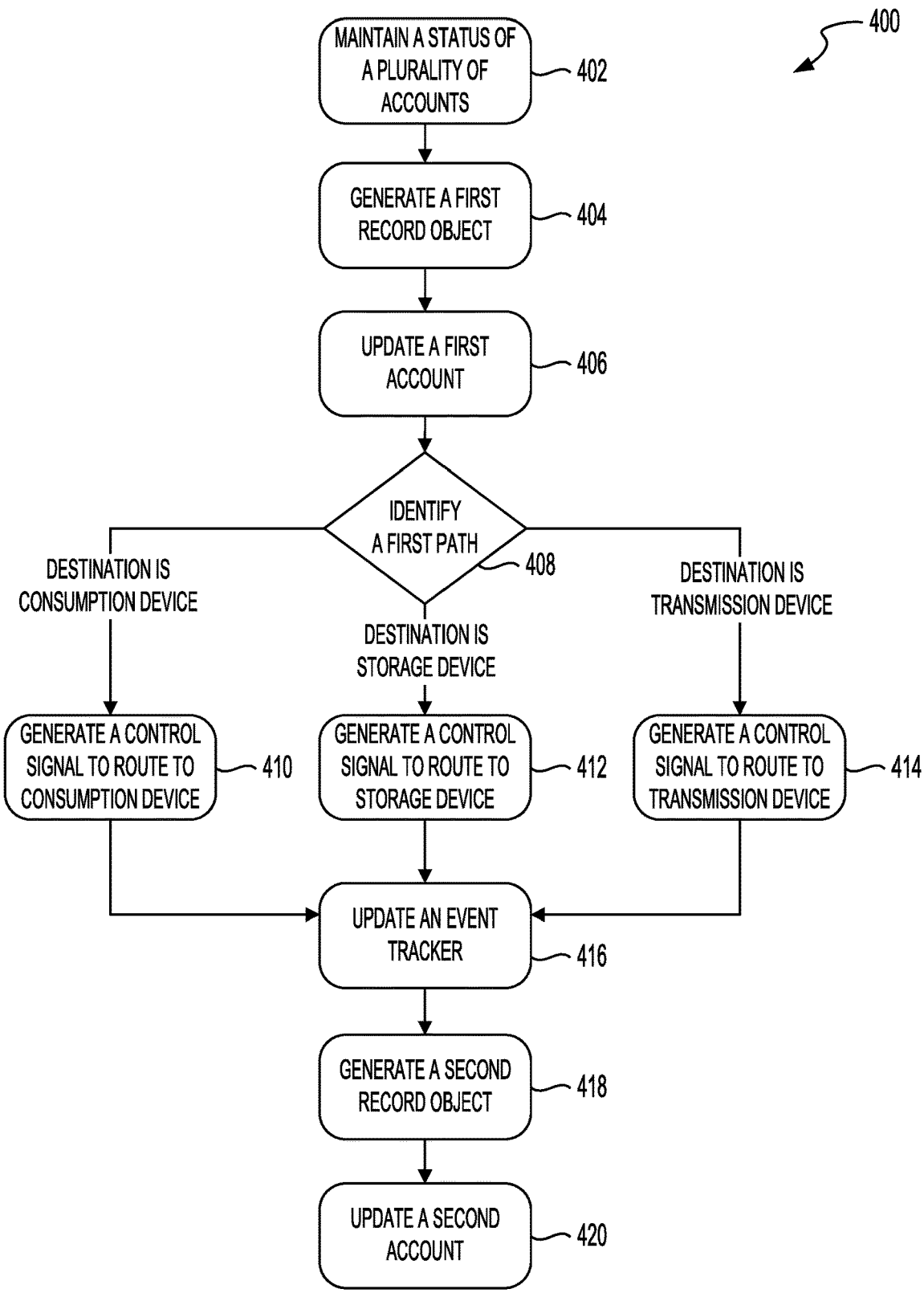
FIG. 4 illustrates a flowchart of an example implementation of a method for distributing power amongst components of a power system based on generated record objects.

Referring now to FIG. 4, depicted is a flow chart of an example method 400 for the distribution of power throughout a system (e.g., the architecture 100, the system 200, the system 300, any other system described herein, etc.) based on networking protocol analytics. The steps of the method 400 can be executed, carried out, or otherwise performed by a controller (e.g., the controller 205A described herein in conjunction with FIG. 3, etc.). The controller (e.g., the controller 205A) can maintain a status of a plurality of accounts (STEP 402). The controller can generate a first record object (STEP 404). The controller can update a first account (STEP 406). The controller can identify a first path (STEP 408). The controller can generate a control signal to route to a consumption device (e.g., the energy consumption device 225) (STEP 410). The controller can generate a control signal to route to a storage device (e.g., the energy storage device 230) (STEP 412). The controller can generate a control signal to route to a transmission device (e.g., the transmission device 240) (STEP 414). The controller can update an event tracker (STEP 416). The controller can generate a second record object (STEP 418). The controller can update a second account (STEP 420).

The controller (e.g., the controller 205A) can maintain a status of a plurality of accounts (STEP 402). Each of the plurality of accounts can correspond to one of a generation device (e.g., the generation device 220), a consumption device (e.g., the energy consumption device 225), a storage device (e.g., the energy storage device 230), and a transmission device (e.g., the transmission device 240). One or more of the accounts can include one or more record objects that correspond to a respective unit of power or energy. Each account can include one or more data structures maintained in the memory of the controller. For example, the account can include information related to the status of the corresponding device, such as the state of the device, the level of charge of the device, uptime of the device, and degradation of the device, among others. The accounts can be maintained to track one or more units of energy as they travel amongst the components coupled to the controller. The accounts can include one or more records of energy transmissions, token identifiers, device identifiers, or other identifying information about each device (e.g., the generation device, the consumption device, the storage device, the transmission device, the controller, etc.). Each account can include information related to the losses or electrical inefficiencies of each of the corresponding components coupled to the controller. Each account can maintain one or more record objects associated with generated or requested units of power that have entered or have been produced by the devices coupled to the controller.

The controller can generate a first record object (STEP 404). The record object can identify an identifier of the generation device and a value corresponding to a voltage associated with the generated unit of power or energy and a value corresponding to the current of a generated unit of power or energy. Each record object can include a record object identifier (e.g., a hash, a unique number value, or another type of identifying value or data structure, etc.). The record objects can be generated, for example, by performing one or more generation functions using the identifier of the generation device or the controller. The record object can include one or more timestamps corresponding to the time the unit of power or energy was generated. The record object can be any of the first, second, or third tokens as described herein below. The record object can include one or more power values that indicate the amount of power corresponding to the record object. The record object can include one or more tokens, tags, labels, or other identifiers that identify a status of the record object. The status of the record object can include, for example, generated, stored, transmitted, received, requested, consumed, to be transmitted, to be stored, or any other type of status identifier described herein. The record object can include information about the type of electrical power generated (e.g., DC, AC, signal type, etc.).

The controller can update a first account (STEP 406). The first account can correspond to the generation device. The controller can access the account corresponding to the generation device by accessing one or more data structures in the memory of the controller. The controller can insert the record object into the account by copying the data associated with the record object into the data structure corresponding to the account. In some implementations, the controller can insert, write, or otherwise associate a pointer to the location in memory of the record object into the account associated with the generation device. For example, the controller can insert the pointer to the record object, a time stamp corresponding to the generation of the unit of power or energy, and other information about the record object in the account. In some implementations, the controller may modify the record object to include one or more account identifiers corresponding to the account associated with the generation device, thereby indicating in the record object itself that it is associated with the generation device.

The controller can identify a first path (STEP 408). The first path can be a path of a plurality of paths that can be used to transmit the unit of power or energy generated by the generation device. The identified path can identify the generation device as a source device. In some implementations, the identified path can identify any of the generation device, the storage device, or the transmission device as the source device. The identified path can identify a respective one of the consumption device, the storage device, or the transmission device as a destination device. The path manager can identify the path based on the status of a respective account of the plurality of accounts corresponding to one of the consumption device, the storage device, or the transmission device. Each path can represent a path that electrical energy can follow to be transmitted from one or more source component coupled to the controller to one or more destination component coupled to the controller. The controller can identify the path based on a status of each of the devices (e.g., the generation device, the storage device, the consumption device, and the transmission device). In some implementations, the path can be identified by assessing the amount of electrical need at each of the devices. For example, if the controller determines that one of the devices has an increased load and requires more power, the controller can identify the path associated with the device as the identified path. In some implementations, the controller can identify the path in response to a condition of the storage device (e.g., needs to be charged, should not be overcharged, etc.). In some implementations, the controller can identify the path in response to a signal received from the transmission device indicating a request for electrical power. In some implementations, the path identified by the controller can be dependent on the type of generation device. If the controller determines that the destination device is the consumption device, the controller can perform STEP 410. If the controller determines that the destination device is the storage device, the controller can perform STEP 412. If the controller determines that the destination device is the transmission device, the controller can perform STEP 414.

The controller can generate a control signal to route to a consumption device (e.g., the energy consumption device 225) (STEP 410). The controller can be electrically coupled, for example, with one or more switches used to route power throughout components coupled to the controller (e.g., the mode switches 137, etc.). Each switch can include one or more transistors, relays, electrical switches, or other type of device used to receive and transmit power to a particular destination. The controllers can access one or more lookup tables using the identifiers of the one or more source devices of the identified path to determine the one or more switches to actuate or control. The controller can access one or more lookup tables using the identifiers of the consumption device associated with the identified path to determine the one or more switches to actuate or control. In response to determining which switches to actuate or control, the controller can generate one or more control signals that correspond to each switch. In some implementations, the controller may generate signals to block one or more switches or paths. For example, in order to protect certain components from damage from high voltage or high current, the controller can generate one or more control signals to electrically isolate the protected component. After generating the control signal, the controller can perform STEP 416.

The controller can generate a control signal to route to a storage device (e.g., the energy storage device 230) (STEP 412). The controller can be electrically coupled, for example, with one or more switches used to route power throughout components coupled to the controller (e.g., the mode switches 137, etc.). Each switch can include one or more transistors, relays, electrical switches, or other type of device used to receive and transmit power to a particular destination. The controllers can access one or more lookup tables using the identifiers of the one or more source devices of the identified path to determine the one or more switches to actuate or control. The controller can access one or more lookup tables using the identifiers of the storage device associated with the identified path to determine the one or more switches to actuate or control. In response to determining which switches to actuate or control, the controller can generate one or more control signals that correspond to each switch. In some implementations, the controller may generate signals to block one or more switches or paths. For example, in order to protect certain components from damage from high voltage or high current, the controller can generate one or more control signals to electrically isolate the protected component. After generating the control signal, the controller can perform STEP 416.

The controller can generate a control signal to route to a transmission device (e.g., the transmission device 240) (STEP 414). The controller can be electrically coupled, for example, with one or more switches used to route power throughout components coupled to the controller (e.g., the mode switches 137, etc.). Each switch can include one or more transistors, relays, electrical switches, or other type of device used to receive and transmit power to a particular destination. The controllers can access one or more lookup tables using the identifiers of the one or more source devices of the identified path to determine the one or more switches to actuate or control. The controller can access one or more lookup tables using the identifiers of the transmission device associated with the identified path to determine the one or more switches to actuate or control. In response to determining which switches to actuate or control, the controller can generate one or more control signals that correspond to each switch. In some implementations, the controller may generate signals to block one or more switches or paths. For example, in order to protect certain components from damage from high voltage or high current, the controller can generate one or more control signals to electrically isolate the protected component. After generating the control signal, the controller can perform STEP 416.

The controller can update an event tracker (STEP 416). The controller can include in the event tracker an event indicating the routing of the generated unit of power or energy from the source device to the destination device. The controller can determine that a generation event has occurred based on the generated record object. The event can include an identifier of the account associated with the source device, an identifier of the account associated with the destination device, a public key associated with the source device, a public key associated with the destination device, a timestamp associated with the routing of the power, an amount of power routed, the record object corresponding to the routed power, an indication of a transaction between the source device and the destination device, the type of generation device, the type of record object, controller metadata, the voltage and current associated with the energy transfer, the type of destination device, the type of source device, and any other information associated with the energy transfer between the source device and the destination device of the identified path.

The event tracker can be a distributed data structure, a copy of which can be maintained in the memory of the controller. In some implementations, the event tracker may be local to the components coupled to the controller (e.g., a first event tracker), and maintain each of the events that correspond to energy transmission or generation amongst the components coupled to the controller. In some implementations, a copy of the event tracker is maintained by each of a set of second controllers (e.g., the second controllers 205B-N). Updating the event tracker can include appending, to the event tracker, the transmission event indicating the transmission of power. The event tracker can be one or more blockchain data structures, or other types of distributed data structures that are impossible to modify after it has been confirmed by those computing devices maintaining the data structure. The data structure can include a record of each transaction (e.g., energy transfer event) that has occurred amongst the components coupled to the controller. In some implementations, the event tracker can maintain only the record of transactions for a predetermined period of time (e.g., most recent day, most recent 3 days, most recent week, most recent month, most recent year, etc.), as energy in a grid based system is typically consumed shortly after it is generated.

The controller can generate a second record object (STEP 418). The second record object can identify or include an identifier of the destination device of the identified path. The second record object can include one or more indications of a power transfer event associated with the identified path, and can include an identifier of the corresponding generation device, the corresponding source device, and the corresponding destination device. The second record object can identify a value corresponding to a voltage associated with the routed unit of power or energy and a value corresponding to the current of the routed unit of power or energy. The second record object can include a record object identifier (e.g., a hash, a unique number value, or another type of identifying value or data structure, etc.). The second record object can be generated, for example, by performing one or more generation functions using the identifier of the source device, the identifier of the destination device, or an identifier associated with the identified path. The second record object can include one or more timestamps corresponding to the time the unit of power or energy was routed. The second record object can include one or more power values that indicate the amount of power corresponding to the record object. The second record object can include one or more tokens, tags, labels, or other identifiers that identify a status of the second record object. The record object can be any of the first, second, or third tokens as described herein below. The status of the record object can include, for example, generated, stored, transmitted, received, requested, consumed, to be transmitted, to be stored, or any other type of status identifier described herein. The record object can include information about the type of electrical power generated (e.g., DC, AC, signal type, etc.), the source device, and the destination device.

The controller can update a second account (STEP 420). The controller can update the second account based on routing the generated unit of power or energy to the destination device. The second account can correspond to the destination device. The controller can access the account corresponding to the destination device by accessing one or more data structures in the memory of the controller. The controller can insert the second record object into the second account by copying the data associated with the second record object into the data structure corresponding to the second account. In some implementations, the controller can insert, write, or otherwise associate a pointer to the memory location of the second record object into the second account associated with the destination device. For example, the controller can insert the pointer to the second record object, a time stamp corresponding to the routing of the unit of power or energy, and other information about the second record object in the account. In some implementations, the controller may modify the second record object to include one or more account identifiers corresponding to the second account associated with the destination device, thereby indicating in the second record object itself that it is associated with the destination device.

B. Energy Distribution System Using Power Conversion Technology

Yet another aspect of the present disclosure relates to a method for offsetting centralized energy generation using distributed generation and/or storage technologies that can implement load shifting and/or peak shaving. The method can include monitoring the aggregate amount of stored energy available at distributed locations connected to an electricity grid using a first blockchain application, with a corresponding number of first tokens, which can be interchangeably referred to hereafter as a Storage Token. Each first token can have a corresponding ascribed sale price, whether manually definable, estimated or modeled using artificial intelligence or machine learning, or the outcome of a settlement or transaction with another party, blockchain or other subcomponent of a system. In some implementations, the monitoring aggregate amount of energy and any of the other steps of the method can be performed by the path manager 320 described herein above in conjunction with FIG. 3. The method may include modeling or estimating the aggregate amount of energy that will be generated at distributed locations connected to an electricity grid using a second blockchain application over a future time period, with a corresponding number of second tokens, which may be interchangeably referred to hereafter as a Generation Token. Each second token may have a corresponding ascribed sale price in a second token marketplace, which differs from the sales price of a first token. The method may include monitoring energy or power consumption profile or electronic load of one or more energy consumption devices or loads using a third blockchain application, with a corresponding number of third tokens, which may be interchangeably referred to hereafter as a Consumption Token. Each energy consumption device or load asset and its corresponding Consumption Token is preferably but not limited to being located in close proximity to the geospatial positioning of those of the Storage Token and/or the Generation Token, where the one or more energy consumption devices or loads can optionally derive power from at least one of the assets that are ascribed to each Storage Token or Generation Token, or an interconnected electricity grid. Each of the aforementioned types of asset classes, for Storage, Generation or Consumption, can be in electrical communication with a main electricity grid, permanently or temporarily, and/or in an activated or deactivated state. Each of the first, second, or third tokens as described in this section can include, correspond to, or be, the record objects described herein above in conjunction with Section A.

Examples of parameters for facilitating a behind-the-meter (BTM) or front-of-the-meter (FTM) transactive energy environment for integrating renewable electricity, providing grid services, etc., which are common to the three types of tokens include the current and voltage signals from one or more sensors in a power electronics network, at minimum before, within and/or after the asset that generates, stores, consumes and/or governs the transmission of the energy and token; and the timestamp, account ID, asset ID and geospatial coordinates to define the four-dimensional positioning of each token itself. An example of attributes or parameters that are inherently unique to each type of token includes at least the frequency over which the data is collected and stored on each blockchain, and the manner in which they are created, stored and/or burned within the system, and the difference in the underlying analytics that are derived from the associations between the tokens or blockchains, and the unique and valuable decisions that can be made from these data structures and/or associations. Ultimately one of ordinary skill in the art may appreciate that the aforementioned unique attributes or parameters correspond to overall computing power requirements for transaction management and data storage. As the subject invention is well-suited to provide energy auditing services for an individual asset or multiple assets, it is critical to minimize the additional energy requirements of such a service itself.

In the broadest embodiment, the First Tokens can correspond to the total energy available (capacity) of any type of energy storage device, and the positive or negative exchange of First Tokens is commensurate with charging or discharging the energy storage device. Therefore the number of First Tokens ascribed to an asset is typically defined upon the initial installation or service use of the energy storage device, and the distributed ledger is configured to record all energy inflows and outflows, the geospatial positioning of each event, the settlement price and other transaction details of each event, and maintain the asset ID, account ID and the states or conditions of any other interconnected equipment that may utilize First, Second or Third Tokens, or no tokens at all. It is the object of this embodiment to provide a transparent, immutable record of all participating assets in an ecosystem and their corresponding energy or State of Charge (SOC), where the aggregate number of First Tokens is commensurate with the total available energy that can be transacted to one or more device or asset in electrical communication with the asset bearing the First Tokens. The appropriate sampling frequency depends on the number of First Tokens available, the ratio between the sizing of the energy storage system, the design for long duration energy or for short duration power requirements, and the total energy/power generation and load demand of the ecosystem, and other factors, however a typical range is 10 to 5,000 per hour, oftentimes 15 to 3,600 per hour, many times 30 to 1,800 per hour, 60 to 360 per hour, 60 to 240 per hour, or 90 to 180 per hour. It has been discovered that there is an inverse relationship between sampling frequency and the frequency in which First Token quantity calibration is required.

In the broadest embodiment, the Second Tokens, also being stable on energy, correspond to the power or energy being generated with time of any type of energy generation device, and as such the creation (event and rate) of these Generation Tokens is directly linked to the energy being delivered to the transactive energy ecosystem by each energy generation device. For example, a photovoltaic (PV) array and a wind turbine may individually generate these Second Tokens, where the asset and account IDs will inform the ecosystem as to the type of device that is generating and delivering the power/energy. It is the object of this embodiment to provide a historical, current and forecastable view of the amount of energy entering any system, the frequency over which the power is provided, and external phenomena that may influence these amounts or rates in the future such as weather information, degraded equipment, and the like. Therefore the maximum rate of generation of Second Tokens ascribed to an asset is typically defined upon the initial installation or service use of the energy generation device, and the distributed ledger is configured to record all energy generation events, current weather patterns and geospatial locations for an auditing of the energy generation profile across similar asset types in an ecosystem, and historical weather or other trend and Second Token generation rates to help triangulate an auditing of the energy generation profile (actual vs. expected) of the asset relative to its historical performance. Furthermore, the geospatial positioning of each event, the settlement price and other transaction details of each event (e.g. asset ID, account ID and the states or conditions of any other interconnected equipment that may utilize First, Second or Third Tokens, or no tokens at all) will enhance the overall observability to the ecosystem participants, including if applicable, the centralized grid operator.

Commensurate with this broadest embodiment, the optional use of Third Tokens can provide further valuable energy auditing capabilities around specific energy consumption devices or loads, based upon the data structures that are unique with respect to either of the First Tokens or Second Tokens. The object of the Third Token is to create an energy 'fingerprint' for each device or load. Such a fingerprint or profile can support the creation of a library of operating profiles for any piece of equipment or device, which when stored on an immutable, cybersecure distributed ledger, can provide valuable predictive maintenance benefits, normal versus abnormal operating phenomena (drifts or deviations from nominal fingerprints), and an ability to carry out analytics on these deviations or perturbations and define threats or potential attack vectors that are causing such a deviation. As one would expect in a tokenized energy environment when all tokens have a value stable on energy, from the top-down perspective the dual blockchain defined by the blockchains of each respective First and Second Token, and the interconnected electricity grid, completes the definition of the maximum number of Third Tokens available to an ecosystem. From a bottom-up perspective, the Third Tokens ascribed to an individual energy consuming device, load or asset correspond to that asset's energy fingerprint, or alternatively the current, voltage and time fingerprint when deconstructed. The key differentiated data structure for the Third Token is minimally the critical rate of data collection, the potential that both alternating current and voltage, direct current and voltage as well as power, power factor, phasor measurement units and other electrical signals and waveforms commonly known to one of ordinary skill in the art. As such, the total number of Third Tokens ascribed to each individual consumption asset, fully independent from the number of First and Second Tokens in the ecosystem, is finite and dictated by the nature of the consumption asset itself. Minimally, the Third Token generation rate should be equal to or greater than the alternating current frequency of the ecosystem, for example typically, but not limited to, 50 or 60 Hz. The Third Token generation rate is fully customizable, and may be reduced to lower than the alternating current frequency once a statistically significant fingerprint is established, and information about the fingerprint or the detectability of any perturbation or deviation from the fingerprint is not lost by such a reduction. Therefore the number of Third Tokens corresponds to the size of the statistically significant fingerprint. For example, in the case in which the consumption asset is a piece of manufacturing equipment, this asset's number of Third Tokens may be related to the product that the asset is manufacturing: e.g. the duration of the manufacturing process time and the alternating current frequency of the ecosystem and any multiplier tied thereto.

In addition to the uniqueness of how each of the First, Second and Third Tokens are generated, which prevents a single token from accomplishing all of the functions of each individual token, the further unique and critical attribute ascribed to each of these Tokens is the manner or algorithm for how they are burned. The simplest case is that of the Generation (Second) Token, which is fully burned when energy is transferred into any storage asset, consumption asset or to an interconnected electrical grid. However, additional consideration must be provided for the electrical pathway, including transmission losses, power electronics hardware or devices (voltage, current, DC vs. AC, splitters, combiners, rectifiers, power maximizing devices, etc.) and other commonly known ways in which efficiency losses detract from the First Tokens initially generated and the number of First Tokens that are purchased by a storage device, a consumption device, an interconnected grid, etc. In the case of the First Token ascribed to a battery energy storage system, which in addition to asset ID and account ID should include battery chemistry within its data structure, specific care must be taken to properly audit the available capacity of the asset over time. One of ordinary skill in the art would appreciate that the maximum capacity of a battery over time fades with the number of charge and discharge cycles, but furthermore the degree of fade is also accelerated by elevated temperature operation, elevated current transfer rates (i.e. charge/discharge rates), extended idling at high or low voltages, and other conditions that can be categorized as 'abusive'. Therefore, the First Token burning algorithm must provide a means of estimating the degree of fade, reserving the fraction of First Tokens commensurate with the estimated fade, periodically calibrating the actual capacity at 100% SOC (e.g. by temporarily removing the battery from service, completely discharging then fully charging the battery one or more times), and burning or replacing the reserved First Tokens. The algorithm for estimating the degree of fade is dependent on the battery chemistry ascribed to the asset in the data structure, as well as the charging and discharging events (i.e. First Token transfer events) logged within the distributed ledger, including initial voltage, the number of First Tokens transferred and/or final voltage which are inherently interrelated, the system temperature during the event, the time period over which the transfer event took place, and the cumulative number of prior events. The prior art data structures for blockchain-based transactive energy are insufficient for electrochemical energy storage management, and in particular the interplay between how a unit of energy transferred impacts both the physical assets to which they are ascribed, as well as the interconnected assets in the ecosystem, and current, voltages, times, waveforms, locations/distances and efficiencies thereof.

The manner in which the Third Token is burned is based upon entirely different criteria than those of the First or Second Token, as the Third Token is linked to the statistical responsiveness of the energy profile or fingerprint that is related to a consumption event or other independent, but traceable, process. Furthermore, where the First Token process and the First blockchain is always 'active', a Second Token process and its blockchain may be 'active' intermittently (e.g. a PV system at night or a wind turbine when no wind is present), the Third Token process and its blockchain may be user defined in a regular or random cadence (much like a traditional auditing mechanism). When the object of the Third blockchain is to identify a normal versus abnormal energy fingerprint, the Third Token burning algorithm can be based on the comparison between the ledger housing the current Third Tokens and the ledger housing the historical or rolled-up data, undergoing a threshold analysis to determine whether the profile was in or out of spec, recording the output in another data structure with a pass/fail indicator, and if a failure is present, a detailed analysis of the differentiation, to build another database of failure vector fingerprints for quality management and future predictive maintenance purposes.

The method can include comparing the real electricity load from any loads participating in the Third blockchain using Third Tokens and/or estimated peak electricity demand to the amount of First Tokens currently available and the amount of Second Tokens that may become available on an ongoing basis or in the future. The method may include evaluating whether the aggregate amount of energy associated with the aggregate amount of first tokens exceeds the current or planned: electrical grid load, power demand, required power factor, and/or any other aspect of grid operations described herein, whether the grid operation is classified as an FTM operation, or a BTM operation such as would be found in a 'microgrid' or 'nanogrid'. The method may include, if the aggregate amount of first tokens is sufficient, determining whether the aggregate cost of first tokens in a first token marketplace delivers economic value to delay or shift the onset of additional centralized generation systems. The method may include, if first tokens are purchased, providing a means to sell first tokens back to replenish some or all energy units of the distributed energy storage systems at a new price that represents a value proposition to one or more parties engaging in the transaction, including the opportunity to purchase and sell second tokens on the second token marketplace. A suitable value proposition may be defined as one in which the aggregate transactions reduce the levelized cost of electricity for BTM operations or FTM operations by at least $0.001/kWh. The method may include using first tokens and second tokens, collectively or individually, to purchase third tokens that are ascribed to the energy consumption of one or more specific assets or energy consuming devices or loads.

As energy markets have become increasingly deregulated over the past few decades, there have become wide variations in standards, rules and tariffs on a state-to-state basis, and these, in addition to variation in supply costs, usage rates, climate, etc., the retail costs of electricity vary widely based on state and segment. Transactive energy has the potential to reduce friction within the energy grid and enable new business models that can both improve the efficiency of the grid and improve resilience. Using blockchain technologies, smart contracts and instructions embedded therein allow users of the disclosed technology to write simple rules managing, say, electricity rate thresholds, how many kilowatt hours of energy (i.e. tokens) they want to buy, any particular ancillary service features such as the power factor of such energy, and at what price from distributed resources, while optimizing energy delivery. A fully automated embodiment of this system executes a transaction according to the smart contract, which prescribes the price for electricity the consumer is willing to pay and checks it against the amount of power currently available, the demand for it and the amount of money in the consumer's digital wallet, as well as numerous regulatory requirements. Any closed-source or open-source architecture or sub-architecture can be used as a framework or sub-framework for the technology described herein. For example, the Hyperledger Greenhouse hosted by Hyperledger (Sawtooth Lake); Ethereum; Open Chain; IBM Bluemix Blockchain; Chain; IOTA; Tangle; Hydrachain; Multichain; Amazon Managed Blockchain or Quantum Ledger Database (QLDB); Microsoft Azure Cloud; etc.

FIG. 5A illustrates a block schematic view of an electrical grid-tied energy generation, storage and load management system, or intelligent energy management system 10, which provides for an intelligent control of power from an energy generation source 12 to a load 14, depicted here utilizing a conventional net-metering unit and grid-tied DC-AC inverter 16 (tied to the electric utility grid), along with an add-on building energy storage system 18 (also referred to interchangeably as a home generator, building generator or uninterruptable power supply (UPS) system). The intelligent (and optionally renewable) energy management system 10, as the term is used in this specification, thus is a collection of computer hardware, computer software, machinery, and other components that controls and distributes power from one or more renewable energy generation sources to one or more energy storage systems, and/or to one or more loads. As defined herein, the "renewable" power source is configured as a source that utilizes renewable resources, such as wind, solar power or water, for example, to generate power. According to an exemplary embodiment, and as described in the systems set forth below, the renewable energy source 12 utilized in the intelligent energy management system 10 comprises a photovoltaic ("PV") system, although it is to be recognized that a micro-hydroelectric system or wind turbine system could instead be incorporated as part of the intelligent energy management system 10.

The example grid-tied intelligent energy management system 10 in FIG. 5A is depicted as a "local" system, so described because the system can be maintained and operated by and for the benefit of the owner of the intelligent energy management system 10 in contrast to systems located and operated by other entities. "Local" here may also mean that the intelligent energy management system 10 is physically located near the load 14 to which the intelligent energy management system 10 provides power, but it should be understood that any limitation on location or proximity to a load is not necessary. That is, a local intelligent energy management system 10 for which net-metering and power distribution is carried out in accordance with embodiments of the present invention can be physically located near the load 14 to which the intelligent energy management system 10 provides power, or can be at a location that is not proximate to any load. In many cases, ownership may be on an asset-by-asset basis, solely owned or commonly owned with others.

As shown in FIG. 5A, the renewable energy source 12 of the intelligent energy management system 10 is tied to the utility grid via an arrangement of a renewable power DC-AC inverter 16, an electrical mains distribution panel or sub-panel 20, and a bi-directional utility meter (or "net-meter") 22—which may be incorporated as part of the distribution panel or as a separate device. Though the term "net-meter" is used here, other variants of "smart" meters and conventional meters are also within the scope of the invention. The renewable power DC-AC inverter 16 is a grid-tied inverter—i.e., an inverter that monitors AC supply waveforms from the utility grid 24 along a power line, also referred to as "mains," and inverts DC power from the local renewable energy source 12 to AC power in-phase with the AC grid power for supply to the load and the utility grid. The distribution panel 20 may include a plurality of switches and protection components therein (not shown), including an electrical mains switch that (when open) disconnects the load from power provided by the utility grid, line conditioners, circuit breakers, and the like. Power may be routed through the distribution panel 20 to provide a flow of power to the load 14, with the load comprising a local electrical load (of one or more devices/loads) that is a consumer of AC power. In the embodiment of FIG. 5A, a mode/transfer switch 26 (hereafter sometimes referred to simply as a mode switch) is used to control the flow of power to the load 14, as will be described in further detail below. While the mode switch 26 is illustrated as a single switch, it is to be understood that the mode switch 26 may in fact be provided as numerous, separate switches each including one or more switching elements therein. The mode switch may consist of multiple switching elements controlled by a single electrical actuator or other type or powered actuator. Accordingly, the term "mode switch" is not meant to be limited or interpreted as referring to only a single switch.

As would be understood by one skilled in the art, the net-meter 22 is device that meters net-electricity distributed through the electrical mains distribution panel 20 to the load. The term "net" here refers to the difference in power or energy provided to the load 14 from the utility and locally generated power provided to the load and provided to the utility along power line. The net meter may further include a means to account for power or energy delivered to or from the utility at during discrete time periods substantially smaller than on a daily basis, oftentimes down to 15, 10, 5, 1, 0.1 or 0.01 minute intervals, and a means for transmitting such data externally by any common communication system. Locally generated power as the term is used in this specification refers, as context requires, to any power generated by a local renewable energy source 12 in the intelligent energy management system 10, whether that power is currently generated and not stored or the power was previously generated and stored in home power supply system 18. Again, the term "home" as used herein is interchangeable with the term 'building' to represent the physical entity that can generate, store and/or consume power 'behind-the-meter'. With the current state of the art of net-metering, an intelligent energy management system owner may receive, from a utility, one or more credits for at least a portion of electricity generated by the intelligent energy management system 10 and provided to the utility. That is, a utility pays an intelligent energy management system owner for electricity received by the utility and generated by the owner's system. An object of this invention is to overcome the shortcoming of this approach that is primarily useful for retrospective transaction settlements, transitioning the ecosystem to using blockchain to 'tokenize' this energy, retaining the historical transaction management aspect, but also allowing for real-time energy auditing, and future predictive energy management capabilities.

As indicated above, an add-on home power supply system 18 is included in the intelligent energy management system 10, with the home power supply system 18 providing for a selective storage of power generated by the renewable energy source 12 and providing for a selective output of power to the load 14. The home power supply system 18 may be configured to have a power rating that is larger than the maximum power of the renewable energy source 12, so as to allow for a larger number of loads and higher power transient loads to be operated from the intelligent energy management system 10 than if the home power supply system 18 were not present. Alternatively, home power supply system 18 may be configured to have a power rating that is equal to or less than the maximum power of the renewable energy source 12, with a mechanism to define a subset of loads to receive power during a grid outage, so called "critical loads". Such a mechanism may be definable using, for example, the smart contracting features of blockchain, which allows the owner/operator to dynamically control specific loads, and redefine which loads are "critical" based upon certain criteria including anticipated grid outage duration, the total availability (current and projected) of locally-stored energy, which is inherently transient in nature, weather patterns that may affect local power generation, and so on. This dynamic feature requires enhanced data structures that the prior art does not provide, and algorithms that are also dynamic, flexible, and ideally leverage machine learning and/or artificial intelligence protocols to maintain power to an optimal number of loads, accounting for any higher power transient loads, and to be operated from the intelligent energy management system 10 than if the home power supply system 18 were not present.

In an exemplary embodiment, the home power supply system 18 is provided as a retrofit kit that may be added to an existing grid-tied intelligent energy management system 10 that performs net-metering. The home power supply system 18 may generally be characterized as including a voltage modification circuit 28, an energy storage system 30, and a power supply DC-AC inverter 32, and optionally an AC-coupled home charging station 37 (with appropriate AC interconnects) and/or a DC-coupled home charging station 39 (with appropriate DC interconnects). The voltage modification circuit 28 provides an interface between the renewable energy source 12 and the home power supply system 18 and is configured to condition power (DC-DC conversion or AC-DC conversion) received thereby to generate a DC power output that is provided to the energy storage system 30. The energy storage system may be configured as one or more stationary or "home" energy storage devices (e.g., lithium ion batteries or other suitable battery technology, including lead-acid, nickel-metal hydride, sodium nickel chloride, sodium metal halide, or sodium sulfur batteries of appropriate size) with associated DC disconnects, with the stationary energy storage devices storing the DC power provided thereto from the voltage modification circuit 28 and providing DC power to the power supply DC-AC inverter 32 as desired. Alternatively, or in addition to, the voltage modification circuit 28 and/or energy storage system 30 may be configured to provide power to DC-coupled home charging station 39 (with the appropriate DC interconnects), which can be particularly useful for DC fast charging. The power supply DC-AC inverter 32 then converts the DC power to an AC power output that may be provided to i) the distribution panel 20 for supplying power to utility grid 24; ii) the mode switch 26 for directly supplying to the load 14; or iii) AC-coupled home charging station 39 for charging an electric vehicle, or a combination thereof, as desired. In an exemplary embodiment, the power supply DC-AC inverter 32 is sized appropriately for the home power supply system 18 (i.e., for the power rating of the home power supply system 18) so as to minimize (power electronic switching and conduction) losses associated during inversion of DC power from the stationary energy storage devices 30, thereby increasing the efficiency of the home power supply system 18.

According to the embodiment of FIG. 5A, a construction of the intelligent energy management system 10 is such that parallel first and second connection paths 34, 36 are provided between the renewable energy source 12 and the load 14. The first connection path 34 is routed such that the renewable power DC-AC inverter 16 is positioned thereon between the renewable energy source 12 and the distribution panel 20, with the first connection path 34 providing for a transfer of AC power from the renewable power DC-AC inverter 16 to the distribution panel 20. The second connection path 36 is routed such that the home power supply system 18 is positioned thereon between the renewable energy source 12 and the distribution panel 20, with the second connection path 36 providing for a transfer of AC power from the home power supply system 18 to the distribution panel 20. The arrangement of the parallel first and second connection paths 34, 36 allows for power generated by the renewable energy source 12 to be selectively routed to the load 14 (or utility grid) along the first connection path 34 and the second connection path 36 in a controllable manner. In addition to second connection path 36 is an optional third connection path 31, which connects the energy storage devices 30 of the home power supply system 18 to the DC Link of the renewable power bi-directional or hybrid DC-AC inverter 16 through DC switches (not shown) that decouples the renewable power source 12 output voltage from inverter 16 DC link. This configuration can intelligently route power from distribution panel 20 to stationary energy storage devices 30, to provide power from the AC grid to supply recharge power to the energy storage devices 30. When such a bidirectional inverter is used, depending on the dynamic power requirements selected by the owner/operator, the power supply DC-AC inverter 32 may not be required and need not be present. Nonetheless, even if renewable power DC-AC inverter 16 is a bidirectional or hybrid inverter, having power supply DC-AC inverter 32 may still be valuable to the owner/operator to be able to continue to provide power to load 14 greater than the power rating of DC-AC inverter 16 alone when renewable power is available or when DC-AC inverter 16 is deactivated, for example during an electric grid outage when power is provided by inverter 32 through the mode/transfer switch 26.

In one embodiment, and as illustrated in FIG. 5A, a mobile energy storage device 38 may also be incorporated as part of the intelligent energy management system 10, to provide further storage of power generated by the renewable energy source 12. The mobile energy storage device 38 may be incorporated into one of a hybrid electric vehicle (HEV), a plug-in hybrid electric vehicle (PHEV), an electric vehicle (EV) or an internal combustion engine (ICE) vehicle, for example, or alternatively a portable/mobile stationary source (e.g. skid-mounted) such as a fuel cell (FC) system, and is bi-directionally electrically coupled to the voltage modification circuit 28 of home power supply system 18. Accordingly, the mobile energy storage device 38 may receive power from the voltage modification circuit 28 in order to provide for charging thereof, and may provide power to the voltage modification circuit 28 in order to provide power to the home power supply system 18.

Also included in home power supply system 18 and/or operably coupled to the home power supply system 18, is a control system 40 comprised of a controller 42 and a sensor array 44 that collectively operate to monitor and control operation of the intelligent energy management system 10. The sensor array provides feedback inputs to the controller 42 on a number of parameters associated with operation of the intelligent energy management system 10, including a condition of the utility grid 24, a power requirement of the load 14 (via either measurement or based on net-meter reading/feedback), a power output from the renewable energy source 12, a number, temperature, and/or state-of-charge (SOC) of the stationary energy storage device(s) 30, a SOC of the mobile energy storage device 38, historical trends of renewable power generation and load requirements, and other parameters. Accordingly, current, voltage and temperature sensors may be provided as part of the control system 40—with current/voltage sensors 46, 48 being specifically identified in FIG. 1. The controller 42 analyzes the feedback input in order to selectively control a flow of power from the renewable energy source 12, a flow of power to/from the home power supply system 18, and a flow of power to/from the utility grid 24, amongst others, with such power flows being controlled intelligently so as to reduce utility transient loads and carbon emissions during certain times of the day, lower or eliminate excessive demand charges to the customer, and provide power to the load 14 even during occurrences of a utility grid failure.

In controlling operation of the intelligent energy management system 10, the control system 40 first functions to sense and analyze i) the instantaneous power being generated and delivered to the system from renewable energy source 12; ii) the instantaneous and load requirements of load 14; iii) the geospatial positioning and pathway of every interconnected subcomponent within the system architecture to estimate the transmission losses between any power source and the loads (e.g. DC-DC converters or DC-AC inverters); iv) the SOC of each energy storage device(s) 30 and each mobile energy storage device(s) 38 as applicable; iv) the voltage and frequency readings of the utility grid power to determine an operating condition of the utility grid 24; and v) the current time of day and any associated tariff rate structures associated with deriving power from the electricity grid.

FIG. 5B depicts an embodiment that encompasses the embodiment of FIG. 5A, where multiple intelligent energy management systems 10a-10b are connected within an electrical grid on a common grid transformer. In this embodiment, intelligent energy management systems 10a and 10b are depicted as having the same behind-the-meter power electronics architecture for simplicity, but one of ordinary skill in the art would recognize that each individual power electronics architecture will vary from installation to installation, and thus is intended to be non-limiting and a preferred implementation would comprise different installation considerations. Nevertheless, intelligent energy management system 10a depicts a bidirectional inverter 16a that can receive power from a renewable electricity source (here PV Array plus combiners/electronics 12a, a voltage modification circuit 28a, that for example in the photovoltaic system, performs the 'Maximum Power Point Tracking (MPPT) function plus in general provides DC link voltage to inverters 16a, 16b for efficient DC-AC power conversion, and an energy storage device 30a coupled to the main DC power flow stream via a bidirectional DC-DC converter. This bidirectional DC-DC converter can, for example, comprise a high power-rated single channel converter for the entire energy storage devices 30a, 30b, or can comprise multiple lower power-rated DC-DC converters each coupled to a single string of serially coupled energy storage device modules or cells, providing an additional system benefit of allowing improved battery management, increased fault tolerance, improved energy throughput, and increased battery cycle and calendar life. Either single or multiple DC-DC converter embodiments, result in a system efficiency decrease, since there is an efficiency loss during both charging and discharging of the energy storage device system. In an alternative embodiment not shown, one or more intelligent energy management systems may omit one or more DC-DC converter(s) in series with the energy storage devices entirely, requiring proper selection of power and energy rated energy storage devices 30a, 30b, wherein the voltage modification converter 28a, 28b, provides the proper DC link voltage to inverters 16a, 16b.

The enhanced data structures and correlation algorithms in this technical solution enable the use of two or more "used" batteries having different prior use profiles, or so-called "second-life" batteries to be combined in any configuration. The intelligent energy management system will account for the varying stages of life of each individual battery to maintain safe operation and balancing, intelligently drawing power differently from each different prior use profile battery system. This positioning in the battery lifecycle is referred to hereafter as "State of Health" (SOH); similar to SOC, SOH can be reflected as a percentage, with 100% being new/unused, and 0% (which can be defined at any selectable threshold capacity) reflects the end of life of that specific battery. The architecture to carry out such an analysis is depicted in FIG. 6, which highlights an expanded view of an exemplary energy storage device 30.

Figure 6:
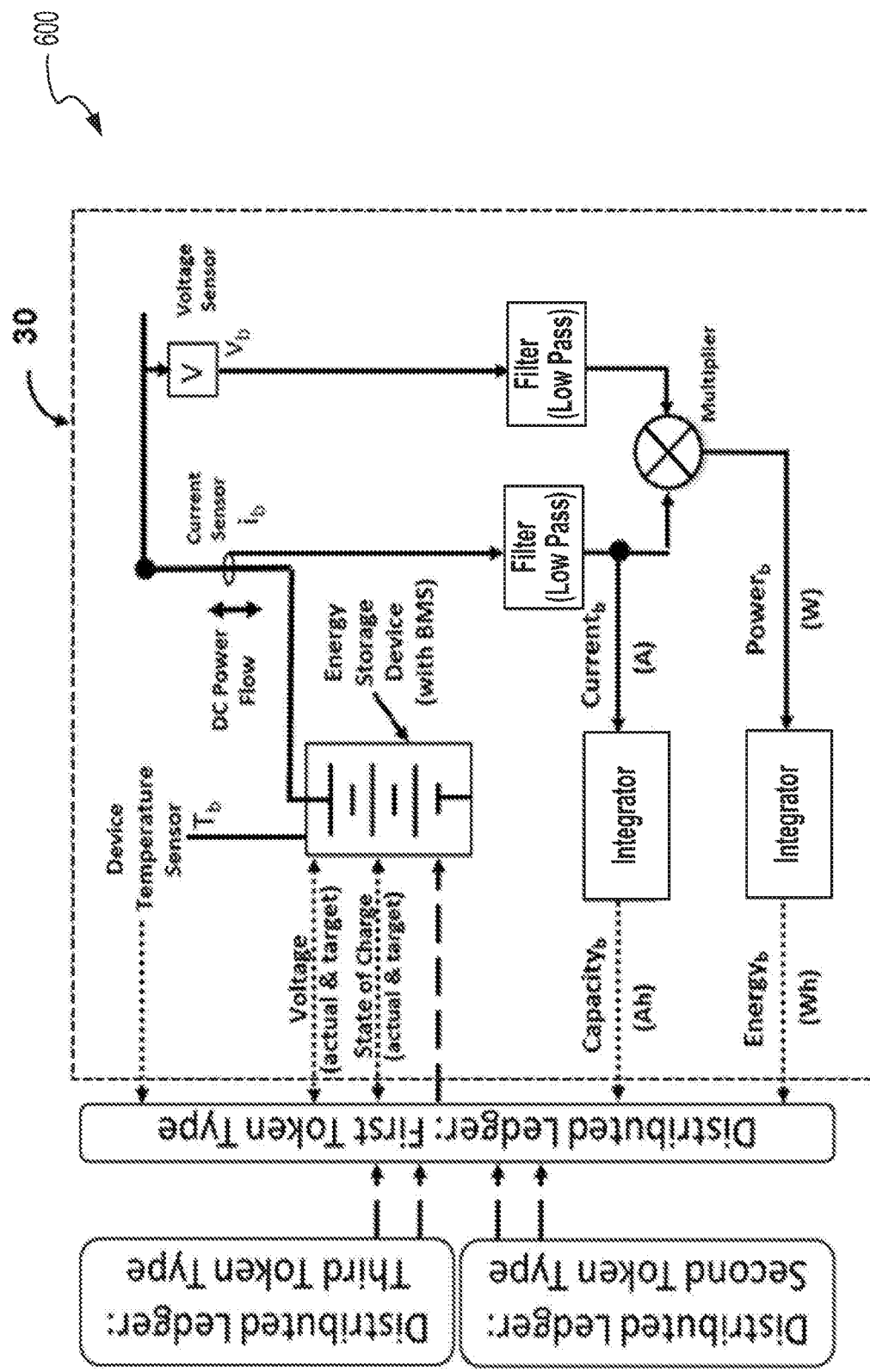
FIG. 6 illustrates an example schematic diagram of a system for estimating state of charge and state of health of energy storage elements, and storing the estimated values in one or more record objects.

As shown in FIG. 6, current and voltage sensors are affixed to the DC power flow path, the signals from which are first routed through a filter (preferably low pass) to obtain high resolution current and voltage values for the battery. Integration over time can allow for actual values of capacity and energy inflows or outflows from the battery to be calculated and provided to a distributed ledger, which houses the SOC values before and after such charging or discharging event occurs. In addition to the filtered values that are used to capture changes in SOC, actual values for device temperature and nominal operating voltage are also provided directly from energy storage device 30 to the distributed ledger, as well as changes thereto that occur during the aforementioned integration time period over which SOC changes are recorded. The enhanced data structured within the various token types are equipped to estimate the SOH of each individual energy storage device 30 through an algorithm that combines the aforementioned static and dynamic values and how they vary over time. External monitoring devices may also be used to assist in further refining the SOH of any one or more energy storage device 30. It has been discovered that the estimated value of SOH for an energy storage device 30 can be improved substantially when taking into account the data from one or more token types that are used to audit and account for generation and consumption profiles. In the broadest sense, a decrement in SOH may correlate to the estimated reduction in remaining life (or advancement of age) caused by a full reduction of SOC from 100% to 0%, followed by an increase from 0% to 100%. One of ordinary skill in the art may correlate this to a combination of the Coulombic Efficiency of a battery and the rate capability of a battery, which further correlates to the reduction in usable battery capacity over time.

Referring now to FIG. 7, illustrated is an example system 700 depicting multiple energy storage sub-device(s) 30a-30d that may be installed into a single energy storage device 30 system, typically in parallel, where the lettered subscript may represent an individual string, module, pack, or similar. In such an embodiment, it is critical that each individual sub-device be monitored and calibrated for SOC and SOH using an independently run algorithm. Of particular interest is the case in which multiple strings of batteries having different historical use profiles, and in turn different SOH values at the time of installation into intelligent energy management system 10, are aggregated and operated as efficiently as if each sub-device had the same historical use profile at the time of installation. The further benefit of such a configuration is that a subset of energy storage sub-device(s) 30a-30d can be taken off-line to undergo the recalibration process depicted in FIG. 11, while the remaining sub-devices may still function in their standard capacity as part of an energy storage device 30.

Figure 8:
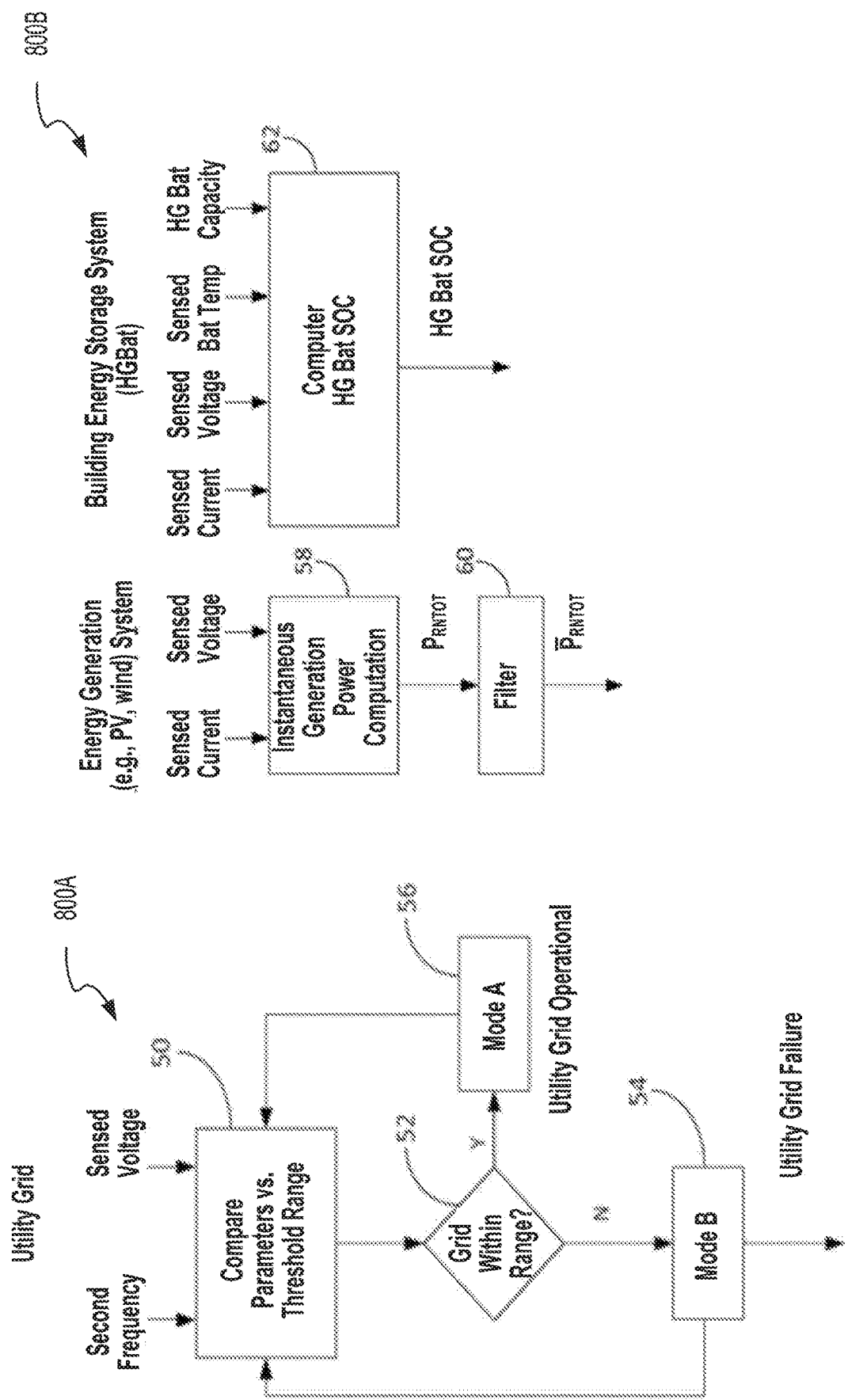
FIG. 8A illustrates a flowchart of an example method of determining an operating condition of a device
FIG. 8B illustrates a flowchart of an example method of sensing and determining a number of operating conditions for a distributed energy system.

In one or more embodiment, interoperability with an electrical grid, in electrical communication with utility meter 22 of FIG. 5A is beneficial, and an analysis of an activated or deactivated state is required. Such an analysis may follow the steps illustrated in FIG. 8A.

As shown in FIG. 8A, a comparison of the voltage and frequency readings of the utility grid power to pre-determined thresholds (or threshold ranges) is first performed at STEP 50. A determination is then made at STEP 52 as to whether the utility grid 24 is operating as normal or there is instead a utility grid failure (i.e., are the measured voltage/current within the acceptable threshold range). In the event that a utility grid failure is identified, as indicated at STEP 54 and as might be present due to/during a phase voltage mismatch and/or low voltage brown-out, the controller 42 controls operation of the mode switch 26 such that it operates in an "emergency power" mode ("Mode B"). In the emergency mode of operation, the mode switch 26 prevents any power from the intelligent energy management system 10 and home power supply system 18 from being supplied to the utility grid 24 (in order to protect utility personnel).

In the event that the utility grid is identified as operating normally, as indicated at STEP 56, the controller 42 controls operation of the mode switch 26 such that it operates in a "normal power" mode ("Mode A"). In normal mode, the controller 42 also controls the intelligent energy management system 10 and home power supply system 18 to operate according to one of a number of different control schemes, dependent upon the sensed operating parameters of the intelligent energy management system 10, as described in detail here below.

Referring now to FIGS. 8B-11, provided are a number of flowcharts to illustrate exemplary techniques for obtaining sensed operating parameters of the intelligent energy management system 10 and determining an appropriate control scheme for operating the intelligent energy management system 10.

Referring first to FIG. 8B, inputs to controller 42 are illustrated with regard to a sensed voltage and current of the renewable energy source 12, as well as a sensed current, voltage, and battery temperature of the stationary energy storage device 30, and a capacity of the stationary energy storage device 30. The inputs of the sensed voltage and current of the renewable energy source 12 enable the controller 42 to determine an instantaneous power of the renewable energy source 12, as indicated at STEP 58, which can be filtered at STEP 60 to output a magnitude of the power. The inputs of the sensed current, voltage, and battery temperature of the stationary energy storage device 30, and the capacity of the stationary energy storage device 30 enable the controller 42 to determine the SOC of the stationary energy storage device 30, as indicated at STEP 62.

Figure 9:
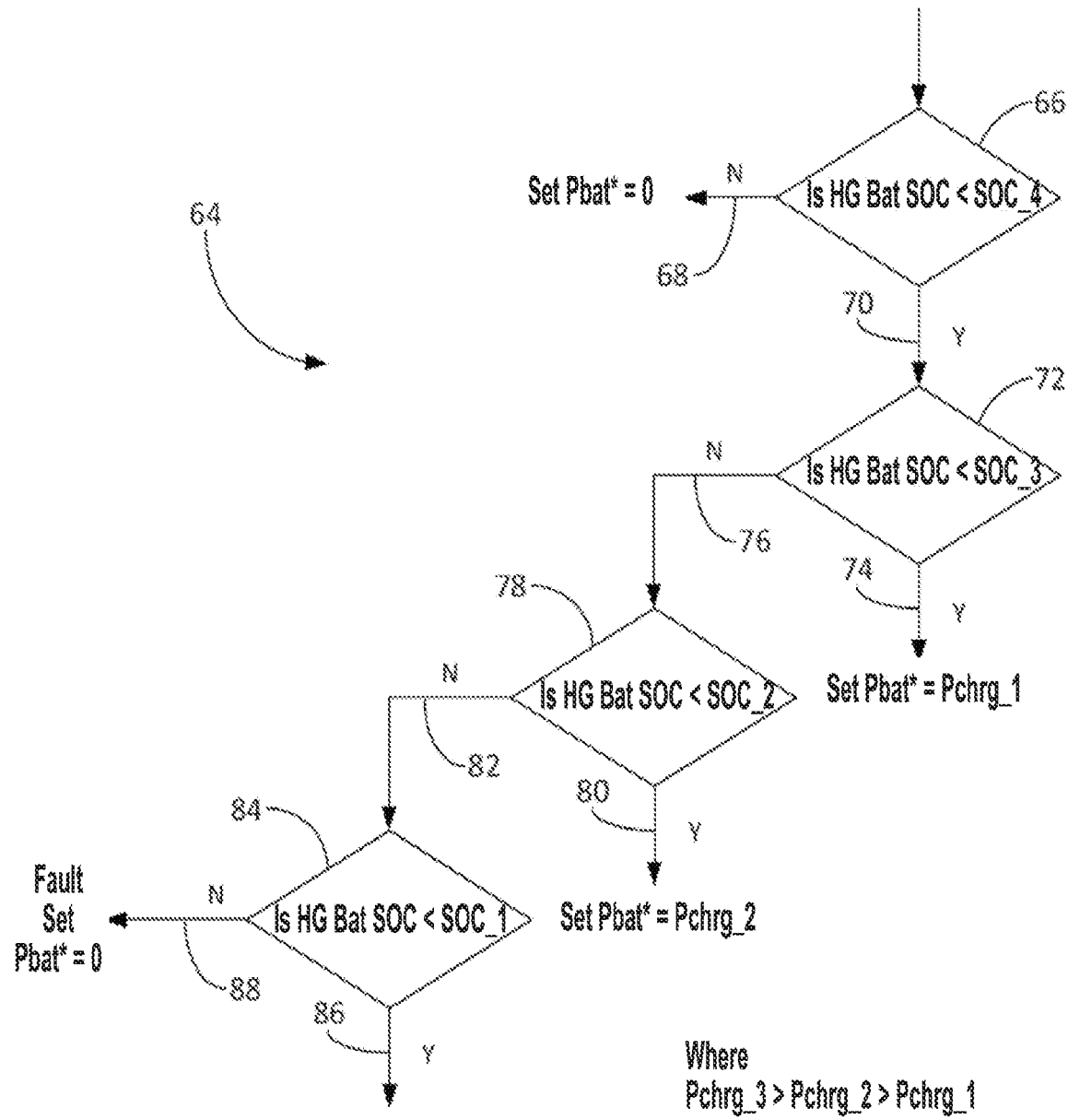
FIG. 9 illustrates a flowchart of an example method of determining a distribution strategy for supplying power from an energy source to a destination device.

Referring now to FIG. 9, an exemplary technique 64 is illustrated for determining a charging strategy for supply power from the renewable energy source 12 to the home power supply system 18—i.e., to the stationary energy storage device 30 of the home power supply system 18. As indicated at STEP 66, an input is provided regarding a SOC of the stationary energy storage device 30, such that a determination can be made regarding whether the SOC of the stationary energy storage device 30 is below a first pre-determined threshold—with the first pre-determined threshold comprising a SOC above which no additional charging of the stationary energy storage device 30 is required. If it is determined that the SOC of the stationary energy storage device 30 is above the first pre-determined threshold, as indicated at 68, then no additional charging of the stationary energy storage device 30 is required (i.e., $P_{bat}^*=0$). If it is determined that the SOC of the stationary energy storage device 30 is below the first pre-determined threshold, as indicated at 70, then a subsequent determination is made at STEP 72 regarding whether the SOC of the stationary energy storage device 30 is greater than a second pre-determined threshold (i.e., is the SOC between the first and second thresholds). If it is determined that the SOC of the stationary energy storage device 30 is above the second pre-determined threshold, as indicated at 74, then charging of the stationary energy storage device 30 is performed according to a first charging setting (i.e., $P_{bat}^*=P_{chrg\_1}$). If it is determined that the SOC of the stationary energy storage device 30 is below the second pre-determined threshold, as indicated at 76, then a subsequent determination is made at STEP 78 regarding whether the SOC of the stationary energy storage device 30 is greater than a third pre-determined threshold (i.e., is the SOC between the second and third thresholds). If it is determined that the SOC of the stationary energy storage device 30 is above the third pre-determined threshold, as indicated at 80, then charging of the stationary energy storage device 30 is performed according to a second charging setting (i.e., $P_{bat}^*=P_{chrg\_2}$). If it is determined that the SOC of the stationary energy storage device 30 is below the third pre-determined threshold, as indicated at 82, then a subsequent determination is made at STEP 84 regarding whether the SOC of the stationary energy storage device 30 is greater than a fourth (minimum) pre-determined threshold (i.e., is the SOC between the third and fourth thresholds). If it is determined that the SOC of the stationary energy storage device 30 is above the fourth pre-determined threshold, as indicated at 86, then charging of the stationary energy storage device 30 is performed according to a third charging setting (i.e., $P_{bat}^* = P_{chrg\_3}$). If it is determined that the SOC of the stationary energy storage device 30 is below the fourth pre-determined threshold, as indicated at 88, then a determination is made that there is a fault in/with the stationary energy storage device 30.

Figure 10:
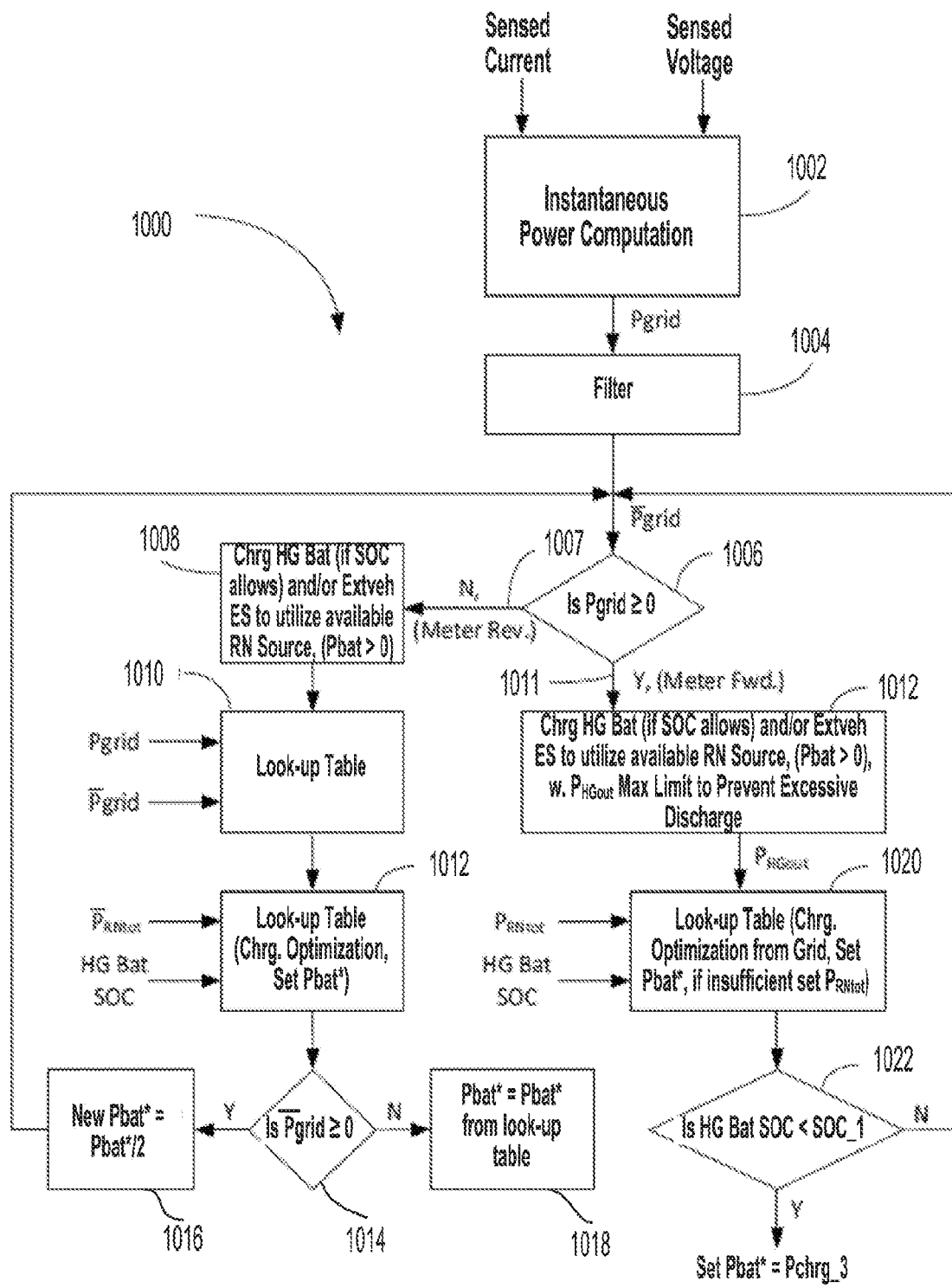
FIG. 10 illustrates a flowchart of an example method of determining a control scheme for operating an energy distribution system, when the energy distribution system is operating in a normal condition.

Referring now to FIG. 10, an exemplary technique 1000 for determining an appropriate control scheme for operating the intelligent energy management system 10—e.g., when the utility grid 24 is operating in a normal condition—is illustrated. At an initial STEP 1002 of the technique, an instantaneous power of the net-meter 22 is calculated based on sensed current and voltage readings. The instantaneous power is then filtered at STEP 1004 and a determination is made at STEP 1006 regarding whether the instantaneous power is greater than or less than a zero value—e.g., is a net flow of power through the net-meter 22 positive or negative, indicating whether additional power beyond that generated by the renewable energy source 12 is required to meet a load power requirement (either from the utility grid 24 or the home power supply system 18) or whether the power generated by the renewable energy source 12 is greater than that required to meet a load power requirement.

If it is determined at STEP 1006 that the net flow of power through the net-meter 22 is positive, as indicated at 1011, then it is determined that additional power beyond that generated by the renewable energy source 12 is required to meet a load power requirement. The technique thus continues at STEP 1012, where the stationary energy storage device 30 of the home power supply system 18 (and/or the mobile energy storage device 38, if available) is discharged to provide additional power to the load 14, to supplement the power provided from the renewable energy source 12. This discharge from the home power supply system 18 assumes that the SOC of the stationary energy storage device 30 (and/or the mobile energy storage device 38) is above a pre-determined threshold, with limits being set on the discharge from the home power supply system 18 to ensure that the SOC of the stationary energy storage device 30 does not fall below a minimum threshold. The SOC of the stationary energy storage device 30 may be monitored at STEPS 1020 and 1022 to identify discharge limits and set a charge optimization strategy (as described in FIG. 8B) for later recharging of the stationary energy storage device 30.

If it is determined at STEP 1006 that the net flow of power through the net-meter 22 is negative, as indicated at 1007, then it is determined that the power generated by the renewable energy source 12 is greater than that required to meet a load power requirement, such that excess power is available for recharging the home power supply system 18, supplying to additional loads, or supplying to the utility grid 24. The technique thus continues at STEP 1008, where the stationary energy storage device 30 of the home power supply system 18 (and/or the mobile energy storage device 38, if available) is recharged by (a portion of) the renewable power generated by the renewable energy source 12. This providing of recharging power to the home power supply system 18 assumes that the SOC of the stationary energy storage device 30 (and/or the mobile energy storage device 38) is below a pre-determined threshold, such that it is determined that recharging is desired. The amount of the excess power available from the renewable energy source 12 and the charge optimization strategy (as described in FIG. 8B) for recharging of the stationary energy storage device 30 may be determined at STEPS 1010 and 1012, such as via appropriate look-up tables. At STEP 1014, it can be determined whether the net flow of power through the net-meter 22 is negative or positive. If the net flow of power is determined to be positive, a new value of Pbat can be assigned to as indicated in the figure at STEP 1016. If the net flow of power is determined to be negative, the value of Pbat can be assigned as indicated in the figure at STEP 1018.

Figure 11:
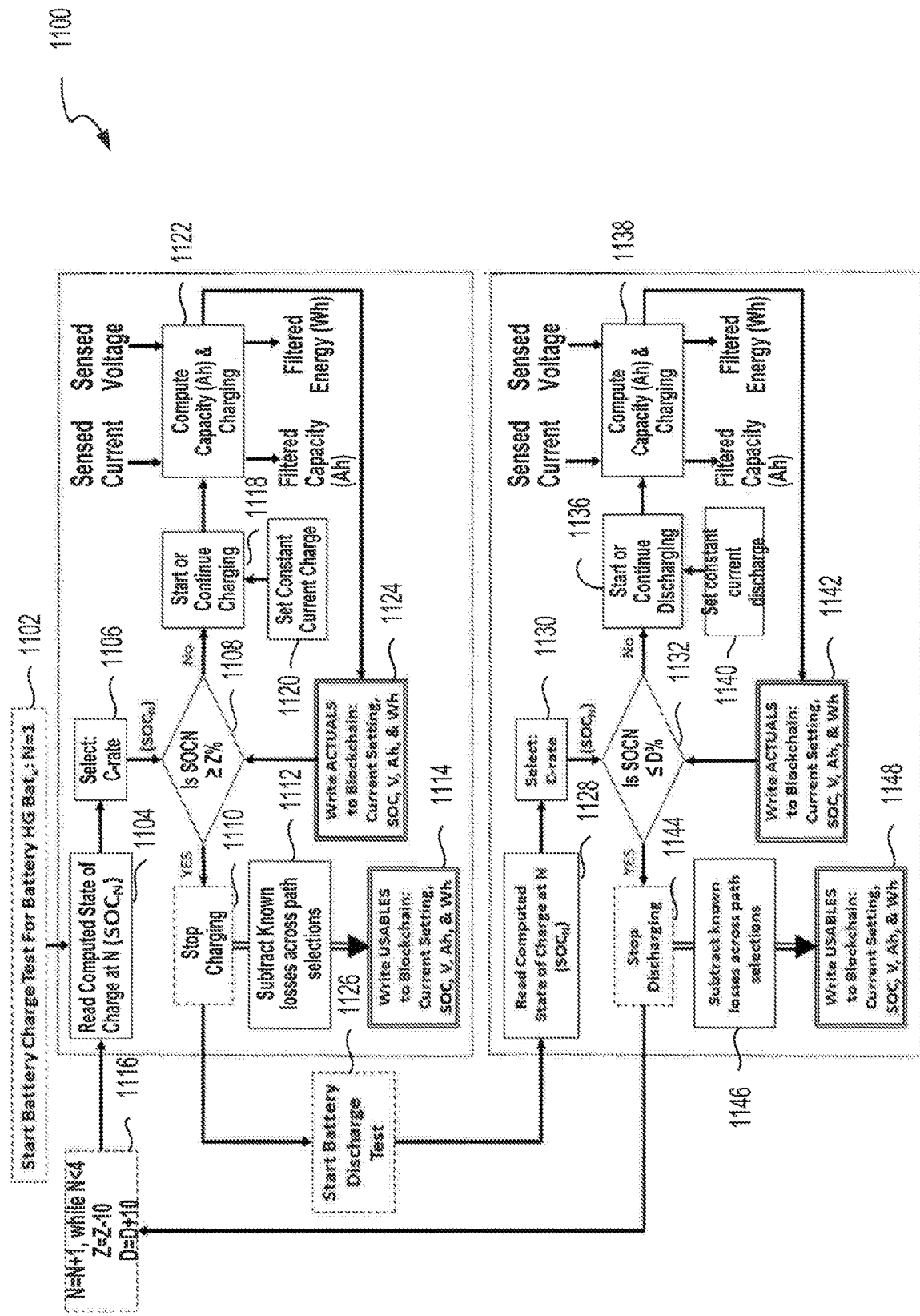
FIG. 11 illustrates a flowchart of an example method of determining a round-trip energy recharge factor of a power distribution system.

Referring now to FIG. 11, an exemplary technique 1100 is illustrated for determining and reconciling the SOC of an energy storage device 30, and associating the round-trip energy efficiency characterization of the battery with other efficiency losses across any electrical flow pathway, in order to inform the electricity routing decision-making process under any circumstance.

At STEP 1102, the controller (e.g., the controller 42, or the controller 205, or any other controller described herein) can start the battery charge test for the battery (e.g., HG BatX), with the value of N set to 1. At STEP 1104, the controller can read the computed state of charge at N, sometimes referred to as SOCn. At STEP 1106, the controller can select a charge rate. At STEP 1108, the controller can determine whether the SOCn is greater than or equal to the value of Z %, where Z % is a predetermined charge percentage. If the value of SOCn is less than Z %, the controller can perform STEP 1118. If the value of SOCn is greater than or equal to Z %, the controller can perform STEP 1110. At STEP 1118, the controller can start or continue charging the battery. At STEP 1122, the controller can compute the capacity (e.g., in ampere-hours, or a similar unit, etc.) and energy (e.g., in watt-hours, or a similar unit, etc.) based on inputs providing a sensed current value and a sensed voltage value. The controller can then determine, from this information, a filtered capacity value (e.g., in ampere-hours, or a similar unit, etc.) and a filtered energy value (e.g., in watt-hours, or a similar unit, etc.). At STEP 1120, the controller can set a constant current charge. At STEP 1124, the controller can write ACTUALS to blockchain, or a similar type of distributed data structure or ledger. The ACTUALS can include, for example, a current setting, the state-of-charge (SOC), the current capacity of the battery (e.g., in ampere-hours, or a similar unit, etc.), and the energy of the batter (e.g., in watt-hours, or a similar unit, etc.).

At STEP 1110, the controller can stop charging the battery. At STEP 1112, the controller can subtract known losses across path selections. At STEP 1114, the controller can write USABLES to the blockchain, or a similar distributed data structure or ledger. The USABLES can include, for example, a current setting, the state-of-charge (SOC), the current capacity of the battery (e.g., in ampere-hours, or a similar unit, etc.), and the energy of the batter (e.g., in watt-hours, or a similar unit, etc.). If the controller will conduct a battery discharge test (in accordance with some implementations), the controller can perform STEP 1126 and start a battery discharge test. At STEP 1128, the controller can read the computed state of charge N at SOCn. At STEP 1130, the controller can select a charge rate. At STEP 1132, the controller can determine whether the SOCn is less than D %, where D % is a predetermined value or a value received from the controller from another module of one or more implementations. If the controller determines that the value of SOCn is less than or equal to D %, the controller can perform STEP 1144. If the controller determines that the value of SOCn is greater than D %, the controller can perform STEP 1136/

At STEP 1136, the controller can start or continue discharging the battery. At step 1138, the controller can compute the capacity (e.g., in ampere-hours, or a similar unit, etc.) and the energy (e.g., in watt-hours, or a similar unit, etc.) of the battery. The controller can determine a filtered capacity value (e.g., in ampere-hours, or a similar unit, etc.) and a filtered energy value (e.g., in watt-hours, or a similar unit, etc.) based on the information received from the battery. At STEP 1140, the controller can set a constant rate of current discharge. At STEP 1142, the controller can write ACTUALS to the blockchain, or a similar distributed data structure or ledger. The ACTUALS can include, for example, a current setting, the state-of-charge (SOC), the current capacity of the battery (e.g., in ampere-hours, or a similar unit, etc.), and the energy of the batter (e.g., in watt-hours, or a similar unit, etc.).

At STEP 1144, the controller can stop discharging the battery. At STEP 1146, the controller can subtract known losses across the path selections. At STEP 1148, the controller can write the USABLES to the blockchain, or a similar distributed data structure or ledger. The USABLES can include, for example, a current setting, the state-of-charge (SOC), the current capacity of the battery (e.g., in ampere-hours, or a similar unit, etc.), and the energy of the battery (e.g., in watt-hours, or a similar unit, etc.). In some implementations, after performing STEP 1144, the controller can perform STEP 1116. At STEP 1116, the controller can increment N (e.g., add one, five, ten, or any other value, etc.), decrement Z (e.g., subtract one, five, ten, or any other value, etc.), and increment D (e.g., add one, five, ten, or any other value, etc.).

In some implementations, the technique 1100 can be performed in one or more other ways, as described herein with respect to sub-sections (A), (B), and (C) described herein below.

(A). Initially start characterization by fully charging battery at a X*C constant current rate, (initially X=1) until 100% SOC. Discharge battery at a constant current "X*C" rate until minimum rated voltage or 0% SOC is reached, store the computed value of Amp Hour $(Ah)_{dischg.}$ and Watt Hour $(Wh)_{dischg.}$ and SOC % for the X*C rate discharge. Recharge battery at X*C rate for the same number of Ah measured and computed in the prior X*C discharge. Store the value of Amp Hour $(Ah)_{chrg.}$ and Watt Hour $(Wh)_{chrg.}$ and SOC % during the discharge at the X*C rate. Compute $(Wh_{chrg.})/(Wh_{dischg.})$ factor for the VC characterization test and store in a lookup table. This initial characterization test provides the round-trip recharge factor, $(Wh_{chrg.})/(Wh_{dischg.})$, for an extreme case for operation over a 100% SOC range. Repeat the above discharge, recharge characterization test for values of X=½, and ¼ and store results in a lookup table.

(B). Operation over 100% of the SOC range of the battery has been shown to negatively effect the battery cycle life, thus additional characterizations tests to determine the round-trip energy factor for operation over SOC range<100% are required. Additional characterization tests, as described in (A.) above, need to be performed for various battery SOC utilization, for example 80% utilization: SOC from 10%-90%; 60% utilization: SOC from 20%-80%; and 40% utilization: SOC from 30%-70% and resulting round-trip energy factors to be stored in lookup tables for use in accurately assigning value to the blockchain energy tokens.

(C). Characterizations tests as described in (A), and (B). periodically need to be performed to determine the "battery fade" as a function of battery life (cycle life as well as calendar life) and effect on round-trip energy factors. Results from these tests will allow improved accuracy while assigning value to the blockchain energy tokens over the life of the energy storage battery.

According to the techniques illustrated in FIGS. 8B-11, an appropriate control scheme for operating the intelligent energy management system 10 can be determined, with examples of such control schemes now being set forth in detail here below. In a first operational control scheme for the intelligent energy management system 10, readings acquired by the sensors of control system 40 indicate that renewable energy is available from the renewable energy source 12, that the power requirement of the load 14 is at a "moderate" level, and that the voltage or SOC of the energy storage device(s) 30, 38 (stationary energy storage device 30 and optionally the mobile energy storage device 38) is above a predetermined threshold. Under such conditions, the controller 42—via controlling of the renewable power DC-AC inverter 16 and the voltage modification circuit 28—causes a portion or all of the available renewable energy to be supplied to the load 14 via the first connection path 34, with power being provided to the load 14 via the net-meter 22 and through the properly sized renewable power DC-AC inverter 16. The controller 42 causes relatively small or zero amount of the available renewable energy to be supplied by the utility grid 24, as indicated as a small positive or zero reading on the net-meter 22, and no energy to be supplied from the energy storage device(s) 30 of the home power supply system 18.

In a second operational control scheme for the intelligent energy management system 10, readings acquired by the sensors of control system 40 indicate that renewable energy is available from the renewable energy source 12 and that the power requirement of the load 14 is at a "moderate" level but highly transient, such as might occur for a short time duration motor starting, for example. Under such conditions, the controller 42—via controlling of the renewable power DC-AC inverter 16 and the voltage modification circuit 28—causes a portion of the available renewable energy sufficient to meet approximately the average power of the load to be supplied to the load 14 via the first connection path 34, with power being provided to the load 14 via the net-meter 22 and through the properly sized renewable power DC-AC inverter 16. The controller 42 also causes the transient portions of the load that exceed the available renewable power to be supplied using stored energy from the stationary energy storage device 30, and optionally the mobile energy storage device 38. The controller 42 further causes relatively small or zero amount of the available renewable energy to be supplied by the utility grid 24, as indicated as a small positive or zero reading on the net-meter 22.

When operating under the second operational control scheme, the controller 42 also causes a recharging of the stationary (and/or mobile) energy storage device 30, 38 to be performed. That is, a recharge of the energy supplied by the energy storage device(s) 30, 38 will be provided by the renewable energy source 12 at a later time period (i.e., after the transient load conditions have passed), with the controller 42 causing the voltage modification circuit 28 of the home power supply system 18 to provide recharging to the energy storage device(s) 30, 38. After the voltage or SOC of the energy storage device(s) 30, 38 is above a given threshold, the controller 42 will terminate the recharging operation, such that little or no power from the renewable energy source 12 is used to charge the energy storage device(s) 30, 38. Thus, power transfer through the home power supply system 18 is accomplished with high efficiency, with little or no energy storage unit charge loss.

In a third operational control scheme for the intelligent energy management system 10, readings acquired by the sensors of control system 40 indicate that the power requirement of the load 14 is at a "high" level that exceeds the power available from the renewable energy source 12. Under such conditions, the controller 42 causes the power supply DC-AC inverter 32 of the home power supply system 18 (which has a higher power rating than the renewable power DC-AC inverter 16) to use a prescribed amount of power from the available energy storage device(s) to augment the power supplied from the renewable power DC-AC inverter 16 to the electrical distribution panel 20. The controller 42 further causes relatively small or zero amount of energy to be supplied by the utility grid 24.

In providing power to the load 14 from the available energy storage device(s) 30 of the home power supply system 18, the controller 42 operates the power supply DC-AC inverter 32 to generate an AC power output that is synchronized to the same voltage, frequency, and phase of the utility grid AC waveform. That is, as AC power from the renewable power DC-AC inverter 16 and AC power from the home power supply system 18 are combined in the distribution panel 20, it is necessary that power waveform from each inverter be synchronized to the same voltage, frequency, and phase of the utility grid AC waveform. The controller 42 may thus control the power supply DC-AC inverter 32 according to known pulse width modulation (PWM) or space vector modulation (SVM) control schemes to output a desired AC waveform.

In a fourth operational control scheme for the intelligent energy management system 10, readings acquired by the sensors of control system 40 indicate that the power requirement of the load 14 is even higher (i.e., higher than measured when operating in the third operational control scheme), with the power requirement exceeding the power available from the renewable energy source 12 and also exceeding the maximum level of controlled power and energy supplied from the energy storage device(s) 30 of the home power supply system 18. Under such conditions, the controller 42 causes all of the available renewable energy to be supplied from the renewable energy source 12 to the load 14 via the first connection path 34, with power being provided to the load 14 via the net-meter 22 and through the properly sized renewable power DC-AC inverter 16. The controller 42 also causes power to be supplied by the utility grid 24 as necessary, in order to meet the additional load demand not provided by the renewable energy source 12. The net-meter 22 thus records a positive value during operation of the intelligent energy management system 10 according to the fourth operational control scheme.

In a fifth operational control scheme for the intelligent energy management system 10, readings acquired by the sensors of control system 40 indicate that the power requirement of the load 14 is at a "moderate" or "low" level that is less than the available renewable power from the renewable energy source 12. Under such conditions, the controller 42—via controlling of the renewable power DC-AC inverter 16 and the voltage modification circuit 28—causes a portion of the available renewable energy to be supplied to the home power supply system 18 to provide limited charge of the available energy storage device(s) (stationary and mobile energy storage devices 30, 38, if coupled), such that the energy storage device(s) 30, 38 will be charged and available to supply power when the load power again is increased. The remaining portion of intelligent energy management system 10's power is supplied to the load 14 through the renewable power DC-AC inverter 16 with high efficiency.

When the available energy storage devices are fully charged and cannot accept additional charge, the controller 42 causes the recharge power provided to the home power supply system 18 to be reduced to a low power "float charge" level or zero power. When additional renewable power is still available, this power may be used to operate selected home loads (e.g., pre-heating domestic hot water) or may be supplied to coupled vehicle auxiliary loads (e.g., pre-heat or pre-cool vehicle cabin), thus reducing the energy required in a future time period. After the additional loads are supplied and there is still additional renewable power available, then the excess renewable energy is supplied to the customer's distribution panel 20 and the net-meter 22 records a negative reading indicating that energy is being supplied or sold to back to the utility.

In a sixth operational control scheme for the intelligent energy management system 10, readings acquired by the sensors of control system 40 indicate that no power from the renewable energy source 12 is available. Under such conditions, the controller 42 determines whether to supply power to meet load power requirement using stored energy from the home power supply system 18 or to purchase power from the utility grid 24, with such a determination being based on customer supplied conditions, including historical trends, number or energy storage devices available, state-of-charge (SOC) of the available energy storage device(s), temperature, and other parameters.

Accordingly, it is seen that the home power supply system 18 and associated control system 40 intelligently control power flow from the renewable energy source 12 to the load 14 through two parallel paths, with a first connection path 34 providing a conventional renewable power DC-AC inverter 16 that is typically sized and optimized to match the maximum expected renewable power and a conventional net-metering unit 22 and a second connection path 36 providing the home power supply system 18 that incorporates a voltage modification circuit 28, at least one energy storage device 30, and an optimized power supply DC-AC inverter 32. The electrical power levels for both paths are controlled and synchronized to the same voltage, frequency, and phase of the utility grid AC electrical waveforms, with power stored in the home power supply system 18 being selectively used to provide for the optimization of electrical system efficiency of the renewable energy source 12 to the load(s) 14.

While the general configuration of the intelligent energy management system 10 has been described above, along with operation of the intelligent energy management system 10 in various modes and operating schemes, it is recognized that numerous specific configurations of the intelligent energy management system 10 are envisioned and considered to be within the scope of the invention. FIGS. 5A-12 illustrate a number of exemplary embodiments of the intelligent energy management system 10 that are operable according to the basic control scheme of intelligently controlling a power flow from a renewable energy source 12 to a load 14 through two parallel paths via use of an existing grid-tied renewable power AC-DC inverter 16 and an add-on home power supply system 18 that may be retrofit thereto.

Figure 12:
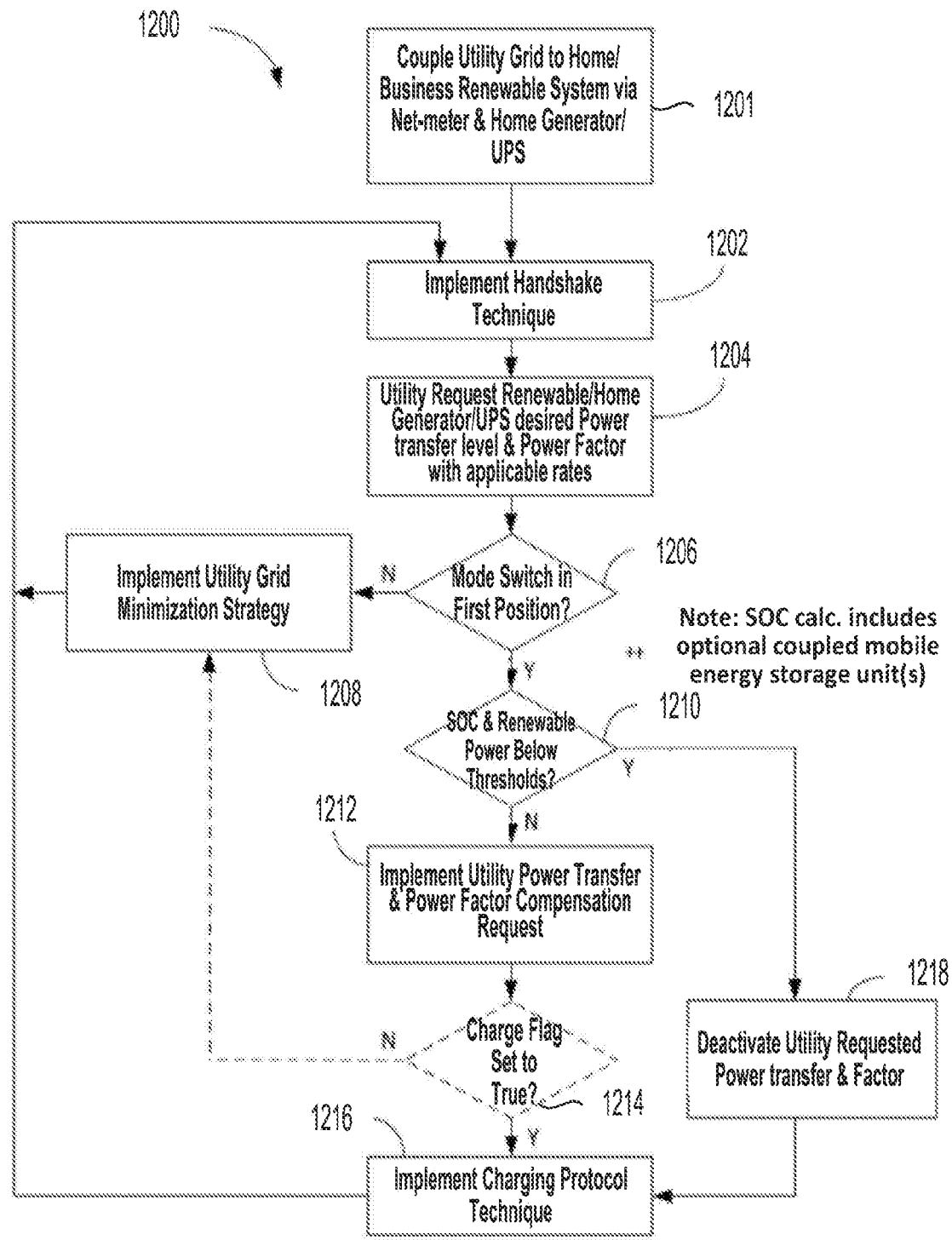
FIG. 12 illustrates a flowchart of an example method of communicating a request for electrical power and energy transfer based on networking protocol analytics.

Referring now to FIG. 12, depicted is an example method 1200 of communicating a utility request for electrical power and energy transfer from a renewable energy system to the grid according this technical solution. At STEP 1201, a controller (e.g., the controller 205, the controller 42, etc.) can couple the utility grid to home/business renewable system via a net-meter and home generator uninterruptable power supply (UPS). At STEP 1202, the controller can implement a handshake technique. At STEP 1204, the controller can receive a utility request for a renewable/home generator/UPS desired power transfer including a power level and power factor with applicable rates. At STEP 1206, the controller can determine whether to perform a mode switch in a first position. If the controller determines to perform a mode switch in a first position, the controller can perform STEP 1210. If the controller determines not to perform a mode switch in a first position, the controller can perform STEP 1208.

At STEP 1208, the controller can implement a utility grid minimization strategy. At STEP 1210, the controller can determine whether the state-of-charge and the renewable power are below one or more thresholds. If the state-of-charge and the renewable power are below (e.g., less than or equal to) one or more thresholds, the controller can perform STEP 1218. If the state-of-charge and the renewable power are above (e.g., greater than) the one or more thresholds, the controller can perform STEP 1212. At STEP 1212, the controller can implement the utility power transfer and power factor compensation request based on the request received by the controller. At STEP 1214, the controller can determine whether the charge flag is set to true. If the charge flag is set to true, the controller can perform STEP 1216. If the charge flag is not set to true, the controller can perform STEP 1208. At STEP 1216, the controller can implement a charging protocol technique in accordance with one or more implementations described herein. At STEP 1218 the controller can deactivate the utility request for a power transfer based on the power transfer request including the power factor.

C. Energy Distribution Based on Layered Grid Topology

Implementations described in this present disclosure can support and enable the modernization of the electrical grid toward a decentralized, layered architecture using blockchain technologies. Today, electricity typically flows outward from a centralized source, through distribution stations (and other sub-stations and the like), and out to individual energy consumers through localized distribution networks. Alternatively, a layered decentralized optimization model would modernize the grid by defining and forming layers, across which transactive energy flows, and each 'layer' is free to define and manage its own critical and ancillary loads, while embedding trust between layers using said transactive energy. One such technology that provides trust and situational awareness in a functional and flexible manner is an asset-centric blockchain system that is designed upon utility tokens having a 'value' of energy, versus a traditional cryptocurrency tokenization instrument. A blockchain is a sequence of data blocks, linked together overtime with a cryptographic hash technology (e.g. a hash function modeled as a random oracle) that effectively makes it impossible to rewrite or modify the past. It allows for a unified and consistent view of system state through the use of distributed consensus methodology, and conventionally may use digital signatures. At any point in time, a blockchain provides a single view of the transactional state of the system, without ambiguity. As a healthy electric grid is essentially comprised of the generation, transmission and consumption of power flows (with considerations for energy demand, power demand, power factor waveforms, etc.), a blockchain-based layer communication system comprised of tokenized energy flows from the Grid Edge can allow for complete, accountable and scalable situational awareness (inter-layer and intra-layer in the layered decentralized optimization grid architecture), supporting critical infrastructure resiliency under any circumstance. This architecture, which may be permissioned or permissionless, trusted or trustless, honest or malicious, etc., provides for the secure accounting and exchange of energy generated from DERs such as photovoltaic modules and wind turbines, and/or stored using one or more storage technologies known to one of ordinary skill in the art.

The present disclosure will support the mission to reduce the levelized cost of electricity (LCOE) for commercial renewable energy system installations. The technology described herein can directly enable load-shifting and other stackable value streams by allowing a utility to efficiently draw stored energy from the solar+storage (S+S) systems of "prosumers" and more generally, DERs. In a solar environment (solar thermal, concentrated solar, etc.)+storage embodiment, such a DER system with tokenized energy could be described as a solar+storage+blockchain (S+S+B) system. In a wind turbine+storage embodiment, such a DER system with tokenized energy could be described as a wind+storage+blockchain (W+S+B) system. In a combined heat and power+storage embodiment, such a DER system with tokenized energy could be described as a combined heat and power+storage+blockchain (CHP+S+B) system. Generally, any Tokenized energy embodiment herein involving a generation asset, a storage asset and at least one blockchain ascribed to each asset can be described as a generation+storage+blockchain (G+S+B). Any examples of one or more embodiments of the technology described herein as being a specific example or representation of any particular generation and storage system is exemplary in nature only and should be construed as being relevant to and interchangeable with any G+S+B system, as if fully described herein in detail. Additionally, this technology will support the development of a real-time smart marketplace for such transactions using an approach that comprises at least two blockchains without requiring the services of a third-party Demand-Response company, or a reduction in the reliance thereon.

One aspect of the present disclosure relates to a system configured to offset centralized energy generation using distributed generation and/or storage technologies that can implement one or more of: load shifting, peak shaving, capacity firming, clipping recapture, ramp rate control, frequency regulation, curtailment recapture, power factor optimization, amongst others. Peak shaving, for example, is a technique that is used to reduce electrical power consumption during periods of maximum demand on the power utility. Thus, saving substantial amounts of money due to peaking charges. The system may include one or more hardware processors configured by machine-readable instructions. The processor(s) may be configured to monitor the aggregate amount of stored energy available at distributed locations connected to an electricity grid using a first blockchain application, with a corresponding number of first tokens. The processor(s) may be included within the energy storage module and/or the energy storage module management interface, or external to said energy storage module. Alternatively, or in addition to, the processor(s) may be located at a device immediately upstream, downstream or both, with respect to an electrical path having communication with the energy storage module, its interface, or both. Each first token may have a corresponding ascribed value (for instance, a value corresponding to a sale price) which may be fixed or able to float based on one or more market factors or external influences. The processor(s) may be configured to model or estimate the aggregate amount of energy that will be generated at distributed locations connected to an electricity grid using a second blockchain application over a future time period, with a corresponding number of second tokens. Each second token may have a corresponding ascribed value (for instance, a value corresponding to a sale price in a second token marketplace), which may be fixed or able to float based on one or more market factors or external influences. The processor(s) may be configured to compare the real electricity load and/or estimated peak electricity demand to the amount of first tokens currently available and the amount of second tokens that may become available in the future. The processor(s) may be configured to evaluate whether the aggregate amount of energy associated with the aggregate amount of first tokens exceeds the current or planned electrical grid load, power demand, and/or required power factor. The processor(s) may be configured to, if the aggregate amount of first tokens is sufficient, determine whether the aggregate cost of first tokens in a first token marketplace delivers economic value to, for example, delay or shift the onset of additional centralized generation systems, or effectuate any other value stream opportunities deemed important to the parties taking part in such a transaction. The processor(s) may be configured to, if first tokens are purchased, provide a means to sell first tokens back to replenish some or all energy units of the distributed energy storage systems at a new price that represents a value proposition to one or more parties engaging in the transaction, including the opportunity to purchase and sell second tokens on the second token marketplace. The aggregate transactions reduce the levelized cost of electricity by at least $0.001/kWh. The levelized cost of electricity (LCOE), also known as Levelized Energy Cost (LEC), is the net present value of the unit-cost of electricity over the lifetime of a generating asset. It is often taken as a proxy for the average price that the generating asset must receive in a market to break even over its lifetime.

Another aspect of the present disclosure relates to a distributed energy management system including one or more processors configured to receive energy data relating to a plurality of rechargeable energy storage devices, each having a predefined storage capacity. The storage capacity of each rechargeable energy storage device can be configured to change over time and in some embodiments, be reduced as the energy storage device charges and discharges over time. The processors can be configured to receive, using a first blockchain application, one or more requests to purchase energy. The processors can be configured to execute the requests and manage transactions relating to the purchase or sale of energy from the plurality of rechargeable energy storage devices. In some embodiments, the processors can be in communication with a power grid. In some embodiments, the processors can be configured to determine a value of an energy unit based in part on the amount of energy stored in the plurality of rechargeable energy storage devices. In some embodiments, the processors can be configured to determine a value of an energy unit based in part on a demand for energy. In some embodiments, the processors can be configured to predict demand based on external factors that may be determined using one or more blockchain applications.

Another aspect of the present disclosure relates to a method for offsetting centralized energy generation using distributed generation and/or storage technologies that can implement load shifting, peak shaving, capacity firming, clipping recapture, ramp rate control, frequency regulation, curtailment recapture, power factor optimization, amongst others. The aforementioned list comprises non-exhaustive examples of general value stream opportunities, some of which may be stackable, and which terminology, mechanisms or techniques may change from time to time over the course of adoption of DERs into a centralized or decentralized electricity grid and its infrastructure. The energy tokenization approach described herein is further designed to be backwards-compatible with centralized grid infrastructure, non-renewable systems and other conventional backup power systems that currently support critical infrastructure. This technology will allow critical infrastructure owners to request power from proximate DERs and create need-based dynamic microgrid sizing that can aggregate both front-of-the-meter and behind-the-meter participating systems, to strengthen security (physical and cyber) and resilience in the face of isolated or coordinated threats. The method may include monitoring the aggregate amount of stored energy available at distributed locations connected to an electricity grid using a first blockchain application, with a corresponding number of first tokens. Each first token may have a corresponding ascribed sale price. The method may include modeling or estimating the aggregate amount of energy that will be generated at distributed locations connected to an electricity grid using a second blockchain application over a future time period, with a corresponding number of second tokens. Each second token may have a corresponding ascribed sale price in a second token marketplace. The method may include comparing the real electricity load and/or estimated peak electricity demand to the amount of first tokens currently available and the amount of second tokens that may become available in the future. The method may include evaluating whether the aggregate amount of energy associated with the aggregate amount of first tokens exceeds the current or planned electrical grid load, power demand, and/or required power factor. The method may include, if the aggregate amount of first tokens is sufficient, determining whether the aggregate cost of first tokens in a first token marketplace delivers economic value to delay or shift the onset of additional centralized generation systems. In some embodiments, the method may include, if the aggregate amount of first tokens exceeds the current or planned electrical grid load, power demand, and/or required power factor, determining whether the aggregate price of first tokens in a first token marketplace is greater than or less than the cost plus target operating margin to meet the electricity demand using a centralized generation system. The method may include, if first tokens are purchased (responsive to determining whether the aggregate price of first tokens in a first token marketplace is less than the cost plus target operating margin to meet the electricity demand using a centralized generation system), providing a means to sell first tokens back to replenish some or all energy units of the distributed energy storage systems at a new price that represents a value proposition to one or more parties engaging in the transaction, including the opportunity to purchase and sell second tokens on the second token marketplace.

Yet another aspect of the present disclosure relates to a non-transitory computer-readable storage medium having instructions embodied thereon, the instructions being executable by one or more processors to perform a method for offsetting centralized energy generation using distributed generation and/or storage technologies that can implement load shifting and/or peak shaving. The method may include monitoring the aggregate amount of stored energy available at distributed locations connected to an electricity grid using a first blockchain application, with a corresponding number of first tokens. Each first token may have a corresponding ascribed sale price. The method may include modeling or estimating the aggregate amount of energy that will be generated at distributed locations connected to an electricity grid using a second blockchain application over a future time period, with a corresponding number of second tokens.

Each second token may have a corresponding ascribed sale price in a second token marketplace. The method may include comparing the real electricity load and/or estimated peak electricity demand to the amount of first tokens currently available and the amount of second tokens that may become available in the future. The method may include evaluating whether the aggregate amount of energy associated with the aggregate amount of first tokens exceeds the current or planned: electrical grid load, power demand, required power factor, and/or any other aspect of grid operations described herein. The method may include, if the aggregate amount of first tokens is sufficient, determining whether the aggregate cost of first tokens in a first token marketplace delivers economic value to delay or shift the onset of additional centralized generation systems. The method may include, if first tokens are purchased, providing a means to sell first tokens back to replenish some or all energy units of the distributed energy storage systems at a new price that represents a value proposition to one or more parties engaging in the transaction, including the opportunity to purchase and sell second tokens on the second token marketplace. The aggregate transactions reduce the levelized cost of electricity by at least $0.001/kWh.

As energy markets have become increasingly deregulated over the past few decades, there have become wide variations in standards, rules and tariffs on a state-to-state basis, and these, in addition to variation in supply costs, usage rates, climate, etc., the retail costs of electricity vary widely based on state and segment. Transactive energy has the potential to reduce friction within the energy grid and enable new business models that can both improve the efficiency of the grid and improve resilience. Using blockchain technologies, smart contracts and instructions embedded therein allow users of the disclosed technology to write simple rules managing, say, electricity rate thresholds, how many kilowatt hours of energy (i.e. tokens) they want to buy, any particular ancillary service features such as the power factor of such energy, and at what price from distributed resources, while optimizing energy delivery. A fully automated embodiment of this system executes a transaction according to the smart contract, which prescribes the price for electricity the consumer is willing to pay and checks it against the amount of power currently available, the demand for it and the amount of money in the consumer's digital wallet, as well as numerous regulatory requirements. Any closed-source or open-source architecture or sub-architecture can be used as a framework or sub-framework for the technology described herein. For example, the Hyperledger Greenhouse hosted by Hyperledger (Sawtooth Lake); Ethereum; Open Chain; IBM Bluemix Blockchain; Chain; IOTA; Tangle; Hydrachain; Multichain; Amazon Managed Blockchain or Quantum Ledger Database (QLDB); Microsoft Azure Cloud; etc.

Figure 13:
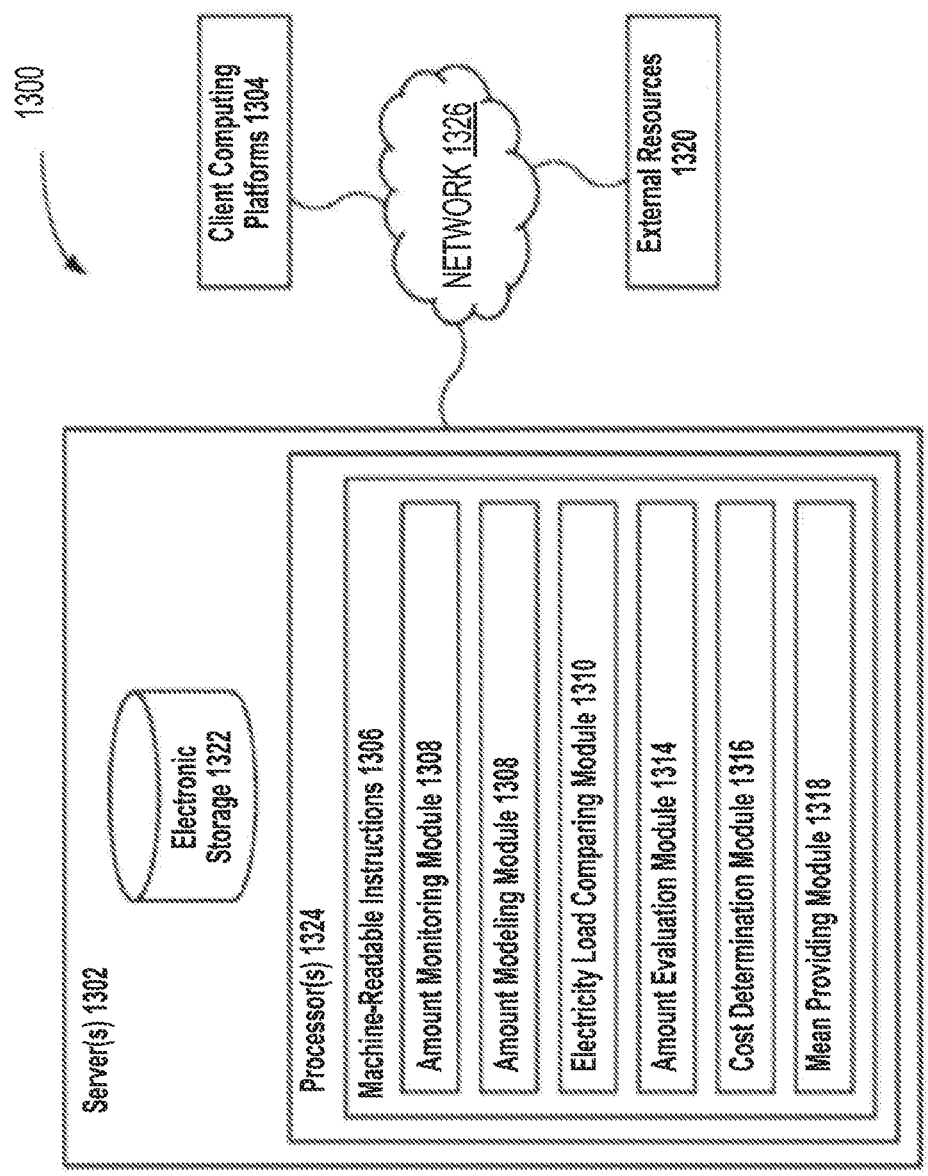
FIG. 13 illustrates an example system for distribution of power based on network analytics and external resources.

FIG. 13 illustrates a system 1300 configured to offset centralized energy generation using distributed generation and/or storage technologies that can implement load shifting and/or peak shaving, in accordance with one or more implementations. Peak shaving is a technique that is used to reduce electrical power consumption during periods of maximum demand on the power utility. Thus, saving substantial amounts of money due to the elimination of peaking charges. Additionally, capital deferment for not installing new wires or cables may also provide a substantial value proposition to a utility. In some implementations, system 1300 may include one or more servers 1302. Server(s) 1302 may be configured to communicate with one or more client computing platforms 1304 according to a client/server architecture and/or other architectures. Client computing platform(s) 1304 may be configured to communicate with other client computing platforms via server(s) 1302 and/or according to a peer-to-peer architecture and/or other architectures. Users may access system 1300 via client computing platform(s) 1304. The system 1300 can include at least one network 1326.

Server(s) 1302 may be configured by machine-readable instructions 1306. Machine-readable instructions 1306 may include one or more instruction modules. The instruction modules may include computer program modules. The instruction modules may include one or more of an amount monitoring module 1308, an amount modeling module 1310, an electricity load comparing module 1312, an amount evaluation module 1314, a cost determination module 1316, a mean providing module 1318, and/or other instruction modules.

The system 1300 can include one or more rechargeable energy storage technologies or devices, each having a definable storage capacity. In some embodiments, the energy storage technologies can be mobile or stationary. In some embodiments, the energy storage technologies can be new upon installation, or used upon installation, and wherein the application of a used energy storage technology corresponds to a second life, third life, or so on. In some such embodiments, the used device previously may have been used as an energy storage technology for a mobile application. In some embodiments, the installation into the distributed energy storage system represents a second life usage of an energy storage system originally designed and/or configured for use in an electrified vehicle.

A server of the system 1300 can execute, manage or provide a first blockchain application configured to individually manage energy input and output transaction from each energy storage technology or device. The system 1300 can be in electrical communication with a centralized power grid.

One object of this technical solution is to enable an Energy as a Service (EaaS) business model and economy, where individual consumers (residential, commercial, industrial, municipal, etc.) are provided with a choice as to the source of energy of which they are consuming, and to facilitate ownership over the effects of such choices. Currently, most electricity grids are monopolistic in nature, with minimal trust between generators, deliverers and consumers. Costly Smart Meters and/or Net Meters are being installed to account for self-generated consumption, however the meter still represents a large established barrier (by design) between the transacting parties. Historically, the relationship between a centralized utility and a consumer lacks trust, which is one reason why the third-party demand response provider industry has thrived as a conduit that bridges that divide. Blockchain technologies are uniquely suited for trustless environments, as they can deliver the benefits of transactional engagements while maintaining anonymity and cyber security. Furthermore, the philosophy underpinning the Tokenization of energy allows for multi-lateral transactions that transact the value of such energy, even if the electrical flows themselves proceed along conventional wired pathways.

Additionally, it is believed that a singular blockchain is insufficient to capture the detail and data associated with the diverse types of generation, storage and consumption systems that will proliferate within a modernized or digital grid of the future. A further object of this invention is to ascribe a unique blockchain system to at least one device within categories of generation, storage and consumption, such that the unique needs of each can be built into the Token or Coin that manages the energy for each, albeit with a desire to minimize transaction energy and time consumption required to exchange and interchange said Tokens or Coins. The modernized grid requires Edge connectivity, Smart device integration, real-time energy use and economic forecasting, localized transactions, and efficient transactional energy bidding/auction processes responsive to market fluctuations. The benefits of multiple blockchains include not just direct, localized transactions between entities (which can be managed using a single blockchain), but an interchangeability and interoperability amongst generation, storage and consumption assets based upon human-provided rules yet operating in a human-free execution environment. Machine learning and Artificial Intelligence can be incorporated into Token logic, such that, for example, a "smart battery" resting at a partial SOC of 10%, 20%, 30%, 40%, 50%, 60%, 70%, 80% or 90%, may be able to maximize the value proposition to the owner, selecting whether to i) sell electricity back to the grid for load shifting; ii) select to buy electricity from the grid versus a DER; iii) buy electricity from a co-located or off-site DER for curtailment; iv) bundle its electricity with a co-located DER to sell real and reactive power to the grid for frequency regulation, power factor control; or v) opt to not participate in any charging/discharging event (and prolong shelf-life) due to lack of economic incentive. The use of multiple blockchains in an S+S+B environment allows for maximized choice in the EaaS environment. Furthermore, the utility or grid operator will be able to trust with certainty: a) how many First Tokens are available for purchase from each specific distributed storage asset having a fixed or variable position (to quantify anticipated T&D losses) and at what rates; b) how many Second Tokens are being generated from a specific distributed generation asset having a fixed or variable position (to quantify anticipated Transmission and Distribution, "T&D", losses); and c) whether the purchase of one or more First Tokens and/or Second Tokens will deliver an economic benefit to the utility or grid operator, while the distributed ledger technology allows the transaction or transactions to maintain anonymity while remaining secure. This technology also allows for multi-lateral energy transactions between two distinct parties that are electrically connected only indirectly via an electric grid. For example, a hospital with an on-site energy storage asset and an on-site natural gas generator to provide emergency power may ascribe rules to have said on-site energy storage asset purchase Second Tokens from a nearby wind farm or PV array, exchanging these for First Tokens into said on-site energy storage asset, effectuating a charging protocol. Rules may further be applied to begin generating Second Tokens from the on-site natural gas generator when the number of First Tokens of the on-site energy storage asset falls below a threshold level (i.e. corresponding to the SOC) and/or when the rate of Second Tokens deliverable from external sources falls below a threshold level (e.g. the wind turbine or PV array generation falls) and/or when the cost associated with the external Tokenized energy increases above a threshold amount. Neither a single Blockchain application nor a non-distributed ledger technology can accommodate, synchronize or reconcile this smart logic required for the intelligent electricity grid of the future.

In some embodiments, each rechargeable energy storage technology is a device selected from: i) a battery; ii) a flow battery; iii) an electrolyzer; iv) a fuel cell; v) a capacitor; vi) an electromagnetic storage device; vii) a thermoelectric device; viii) a heat or power device or combinations thereof; ix) a pumped hydro or gravitational device; or x) a flywheel or other mechanical or kinetic device.

In some embodiments, each rechargeable energy storage technology has been fully discharged and fully charged, to determine the storage capacity at full state of charge. In other embodiments, the system can perform periodic State of Health checks that evaluate the available capacity at a given point in an energy storage technology's lifecycle. The capacity at 100% state of charge can correspond to the number of first tokens available for energy transactions. The price and number of first tokens can also correspond to the bare module cost, total installed cost, or similar design cost, as a manner of supporting the financing and installation of the renewable energy system with blockchain monitoring capabilities. If such a financing strategy is utilized, upon installation and taking title or ownership of the first tokens, the costs associated with subsequent discharging and charging of the energy storage module can correspond to a rental or lease price for consuming from, and subsequently replacing to, the tokenized energy with respect to the storage module. In some embodiments, a fractional number of first tokens may be removed from the blockchain as a mechanism to account for the fade in maximum capacity of the energy storage module or renewable energy system over time.

In some embodiments, the sale of one first token corresponds to a discharging event of a common energy unit, for example, 1 kWh, 10 kWh, 100 kWh, 1 MWh, etc. In some embodiments, the purchase of one first token corresponds to a charging event of a common energy unit, which may be the same or different from the aforementioned energy units, but able to be aggregated/de-aggregated into same or similar energy units. In some embodiments, the sale of all first tokens ascribed to a discrete energy storage technology corresponds to 1300% depth of discharge; and the subsequent recharge to full state of charge corresponds to the purchase of all first tokens available for subsequent sale. The difference between the first tokens sold upon full discharge and the first tokens purchased upon full recharge define a transfer cost corresponding to the roundtrip efficiency of the energy storage technology. In some embodiments, the transfer cost is made available to a management entity as an energy management fee, thereby forming an energy management business model. In some embodiments, the value of the first tokens can fluctuate based upon one or more of: i) the temporal proximity to typical or otherwise planned demand increases or decreases in energy as monitored by the Centralized Power Grid; ii) the ability for a utility or manager of a centralized power grid to execute meaningful peak shaving or load shifting through the aggregate purchase of first tokens; iii) the localized amount of first tokens available for sale at any given time; iv) the rate of change or the acceleration or deceleration in availability of first tokens available for sale at any given time; v) the percentage of first tokens being purchased from an individual Energy Storage System; vi) a prescribed value limit or pricing preference set by the owner of said first tokens; vii) the aggregate amount of power, the quality of the power factor, or duration over which the first tokens are purchased; viii) any other exchangeable contracting mechanism having a fixed of floatable value such as options, access rights, leased rights or similar rights.

In some embodiments, the energy storage system 1300 can include one or more energy generation devices in electrical communication with one or more energy storage technologies. In some embodiments, the energy generation devices can be configured to generate energy from one or more of: solar photovoltaic, solar thermal, concentrated solar power, wind, hydroelectric, tidal, combined heat and power, oil, coal, nuclear, natural gas and geothermal sources, in distributed or centralized configurations, working individually, cooperatively, synchronously, asynchronously, or other arrangement, producing rectified or non-rectified alternating current, direct current, at any voltage or range of voltages customary to the type of source and application.

In some embodiments, the distributed energy storage system 1300 can include or be electrically and/or communicatively coupled with a second distributed energy storage system. The second distributed energy storage system can be in electrical communication with the centralized power grid.

In some embodiments, the server 1302 of the system can execute, manage or provide a second blockchain application configured to individually manage energy units (or power units) generated and transferred to any energy storage technology using a second token, which can be exchanged for a first token to effectuate a charging protocol. In some embodiments, the second token corresponds to the same energy unit as the first token. In other embodiments, the second token corresponds to units of power and time, and can be convertible into the same energy unit as the first token. In some embodiments, the relative value of the first and second tokens are allowed to float based on market forces. In some embodiments, the second tokens can be traded on a peer-to-peer or similar marketplace for energy transactions. In some embodiments, the value of the second token fluctuates based upon one or more of: i) the localized current and future availability of energy that can be harvested by same or similar generation devices; ii) the localized current and future availability of energy that can be harvested by dissimilar generation devices; iii) the localized amount of first tokens available for sale at any given time; iv) the rate of change or the acceleration or deceleration in availability of first tokens available for sale at any given time.

As mentioned above, a second blockchain or distributed ledger application is useful to encompass tokenized energy generation assets, as different data and information will be critical to the transactive economy than a first blockchain application to manage stored energy. The second blockchain may focus more on the rate of generation of energy (e.g. the power that can be delivered at any given time), whereas the first blockchain may benefit from a ledger comprising tokens carrying information about the energy that exists on a network and is available for use. For example, weather pattern information (short-term and long-term forecasting) will be important to anticipate power flows from each grid-tied asset, to model how many Second Tokens will be entering the grid and from what locations; such information may represent a waste of data that could increase computing costs and transaction times if it were carried within First Tokens. The combination of the first and second blockchain applications can facilitate microgrid auctions, electricity exchange between microgrids, nanogrids or centralized grids, rotatable energy reserves, dynamic forecasting, energy escrow and even a "Federal Reserve" of energy. Additionally, operational analytics regarding token generation and flows can be monitored, collected and/or sold without divulging personally identifiable information about the networked participants. Ultimately, if the initial price of a First Token or Second Token is established commensurate with the Total Installed Cost with such a system (e.g. an initial coin offering mechanism is used to finance the distributed asset infrastructure), it is important that the value reflects the type of asset being installed.

In some embodiments, the server 1302 of the system can execute, manage or provide a third blockchain application configured to individually manage energy units that are consumed by a distributed energy consumption asset that are transferred from any energy storage technology using a third token, which can be exchanged from a second token or a first token to effectuate a discharging protocol of the first asset, while effectuating the operation or consumption of the distributed energy consumption asset. Examples of such distributed energy consumption assets include smart appliances and similar devices, which may or may not further comprise their own energy storage assets (e.g. electric vehicles, drones and UAVs, etc.). In some embodiments, the third token corresponds to the same energy unit as the first token and/or second token. In some embodiments, the relative value of the first, second and third tokens are allowed to float based on market forces. In some embodiments, the third tokens can be traded on a peer-to-peer or similar marketplace for energy transactions. In some embodiments, the distributed energy consumption asset is mobile, and can transact between first or second tokens on a first microgrid or a first nanogrid by being physically relocated (with or without human intervention) to a second microgrid or second nanogrid, exchanging such tokens without requiring an indirect connection between first and second microgrids/nanogrids. In some embodiments, the value of the third token fluctuates based upon one or more of: i) consumption patterns of the device; ii) the degree of mobility of the device, and distances to be traveled to interact with first or second tokens derived from external networks; iii) whether the device has internal storage (or regenerative) capabilities itself; iv) the relative rate of change or the acceleration or deceleration in availability of first or second tokens available for sale at any given time relative to the defined criticality of the device that consumes third tokens.

Amount monitoring module 1308 may be configured to monitor the aggregate amount of stored energy available at distributed locations connected to an electricity grid using a first blockchain application, with a corresponding number of first tokens. Information held on a blockchain via a blockchain application exists as a shared—and continually reconciled—database. This is a way of using the network that has benefits. The blockchain database isn't stored in any single location, meaning the records it keeps are truly public and easily verifiable. No centralized version of this information exists for a hacker to corrupt. The value of such a distributed ledger technology extends beyond cyber security and in fact relates more to energy security in the modernized electricity grid. For example, 90% of power outages occur at the local distribution network level, where centralized electricity generation is unable to reach the individual consumers. Distributed energy and distributed ledger technologies would allow for the local distribution network to receive and distribute power from the Grid Edge independent of whether the centralized grid is able to deliver sufficient power. This further allows for a dynamic restructuring of power to deliver energy security to the most critical infrastructure and assets in geographic proximity to one or more microgrids or nanogrids. The centralized utility may not be able to distinguish the degree of criticality between a hospital, water treatment facility and emergency response station; even if it could, the electrical communications are inherently severed during a power outage, eliminating the opportunity for a reactive microgrid to be redefined to black start or continue to provide backup power to said critical infrastructure. Hosted by millions of computers simultaneously, or subnetworks of hundreds or thousands of computers proximate to definable geographic boundaries, the distributed ledger data is accessible to anyone on the internet, whether free or on a subscription basis. Each first token, second token and third token (or more) may have a corresponding ascribed sale price, which benefits from transparency to establish a free, fair and open transactive energy market.

Amount modeling module 1310 may be configured to model or estimate the aggregate amount of energy that will be generated at distributed locations connected to an electricity grid using a second blockchain application over a future time period, with a corresponding number of second tokens. Each second token may have a corresponding ascribed sale price in a second token marketplace.

Electricity load comparing module 1312 may be configured to compare the real electricity load and/or estimated peak electricity demand to the amount of first tokens currently available and the amount of second tokens that may become available in the future.

Amount evaluation module 1314 may be configured to evaluate whether the aggregate amount of energy associated with the aggregate amount of first tokens exceeds the current or planned electrical grid load, power demand, and/or required power factor.

Cost determination module 1316 may be configured to, if the aggregate amount of first tokens is sufficient, determine whether the aggregate cost of first tokens in a first token marketplace delivers economic value to delay or shift the onset of additional centralized generation systems.

Mean providing module 1318 may be configured to, if first tokens are purchased, provide a means to sell first tokens back to replenish some or all energy units of the distributed energy storage systems at a new price that represents a value proposition to one or more parties engaging in the transaction, including the opportunity to purchase and sell second tokens on the second token marketplace. The means may be an implementation. The mean may include how a result is obtained or an end is achieved, according to some implementations. A given energy unit may be a unit of measurement.

In some implementations, the aggregate transactions reduce the levelized cost of electricity by at least $0.001/kWh.

In some implementations, server(s) 1302, client computing platform(s) 1304, and/or external resources 1320 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 1302, client computing platform(s) 1304, and/or external resources 1320 may be operatively linked via some other communication media.

A given client computing platform 1304 may include one or more processors configured to execute computer program modules. The computer program modules may be configured to enable an expert or user associated with the given client computing platform 1304 to interface with system 1300 and/or external resources 1320, and/or provide other functionality attributed herein to client computing platform(s) 1304. By way of non-limiting example, the given client computing platform 1304 may include one or more of a desktop computer, a laptop computer, a handheld computer, a tablet computing platform, a NetBook, a Smartphone, a gaming console, and/or other computing platforms.

External resources 1320 may include sources of information outside of system 1300, external entities participating with system 1300, and/or other resources. In some implementations, some or all of the functionality attributed herein to external resources 1320 may be provided by resources included in system 1300. In some implementations, the external resources can include one or more of the second distributed energy storage systems, the centralized power grid and one or more utility companies and prosumers. In some embodiments, the system 1300 can include the first distributed energy storage system. In some embodiments, the first distributed energy storage system can include one or more components of the system 1300.

Server(s) 1302 may include electronic storage 1322, one or more processors 1324, and/or other components. Server(s) 1302 may include communication lines, or ports to enable the exchange of information with a network and/or other computing platforms. Illustration of server(s) 1302 in FIG. 13 is not intended to be limiting. Server(s) 1302 may include a plurality of hardware, software, and/or firmware components operating together to provide the functionality attributed herein to server(s) 1302. For example, server(s) 1302 may be implemented by a cloud of computing platforms operating together as server(s) 1302.

Electronic storage 1322 may comprise non-transitory storage media that electronically stores information. The electronic storage media of electronic storage 1322 may include one or both of system storage that is provided integrally (i.e., substantially non-removable) with server(s) 1302 and/or removable storage that is removably connectable to server(s) 1302 via, for example, a port (e.g., a USB port, a firewire port, etc.) or a drive (e.g., a disk drive, etc.). Electronic storage 1322 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1322 may include one or more virtual storage resources (e.g., cloud storage, a virtual private network, and/or other virtual storage resources). Electronic storage 1322 may store software algorithms, information determined by processor(s) 1324, information received from server(s) 1302, information received from client computing platform(s) 1304, and/or other information that enables server(s) 1302 to function as described herein.

Processor(s) 1324 may be configured to provide information processing capabilities in server(s) 1302. As such, processor(s) 1324 may include one or more of a digital processor, an analog processor, a digital circuit designed to process information, an analog circuit designed to process information, a state machine, and/or other mechanisms for electronically processing information. Although processor(s) 1324 is shown in FIG. 13 as a single entity, this is for illustrative purposes only. In some implementations, processor(s) 1324 may include a plurality of processing units. These processing units may be physically located within the same device, or processor(s) 1324 may represent processing functionality of a plurality of devices operating in coordination. Processor(s) 1324 may be configured to execute modules 1308, 1310, 1312, 1314, 1316, 1318, and/or other modules. Processor(s) 1324 may be configured to execute modules 1308, 1310, 1312, 1314, 1316, 1318, and/or other modules by software; hardware; firmware; some combination of software, hardware, and/or firmware; and/or other mechanisms for configuring processing capabilities on processor(s) 1324. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1308, 1310, 1312, 1314, 1316, and 1318 are illustrated in FIG. 13 as being implemented within a single processing unit, in implementations in which processor(s) 1324 includes multiple processing units, one or more of modules 1308, 1310, 1312, 1314, 1316, and/or 1318 may be implemented remotely from the other modules. The description of the functionality provided by the different modules 1308, 1310, 1312, 1314, 1316, and/or 1318 described below is for illustrative purposes, and is not intended to be limiting, as any of modules 1308, 1310, 1312, 1314, 1316, and/or 1318 may provide more or less functionality than is described. For example, one or more of modules 1308, 1310, 1312, 1314, 1316, and/or 1318 may be eliminated, and some or all of its functionality may be provided by other ones of modules 1308, 1310, 1312, 1314, 1316, and/or 1318. As another example, processor(s) 1324 may be configured to execute one or more additional modules that may perform some or all of the functionality attributed below to one of modules 1308, 1310, 1312, 1314, 1316, and/or 1318.

Figure 14:
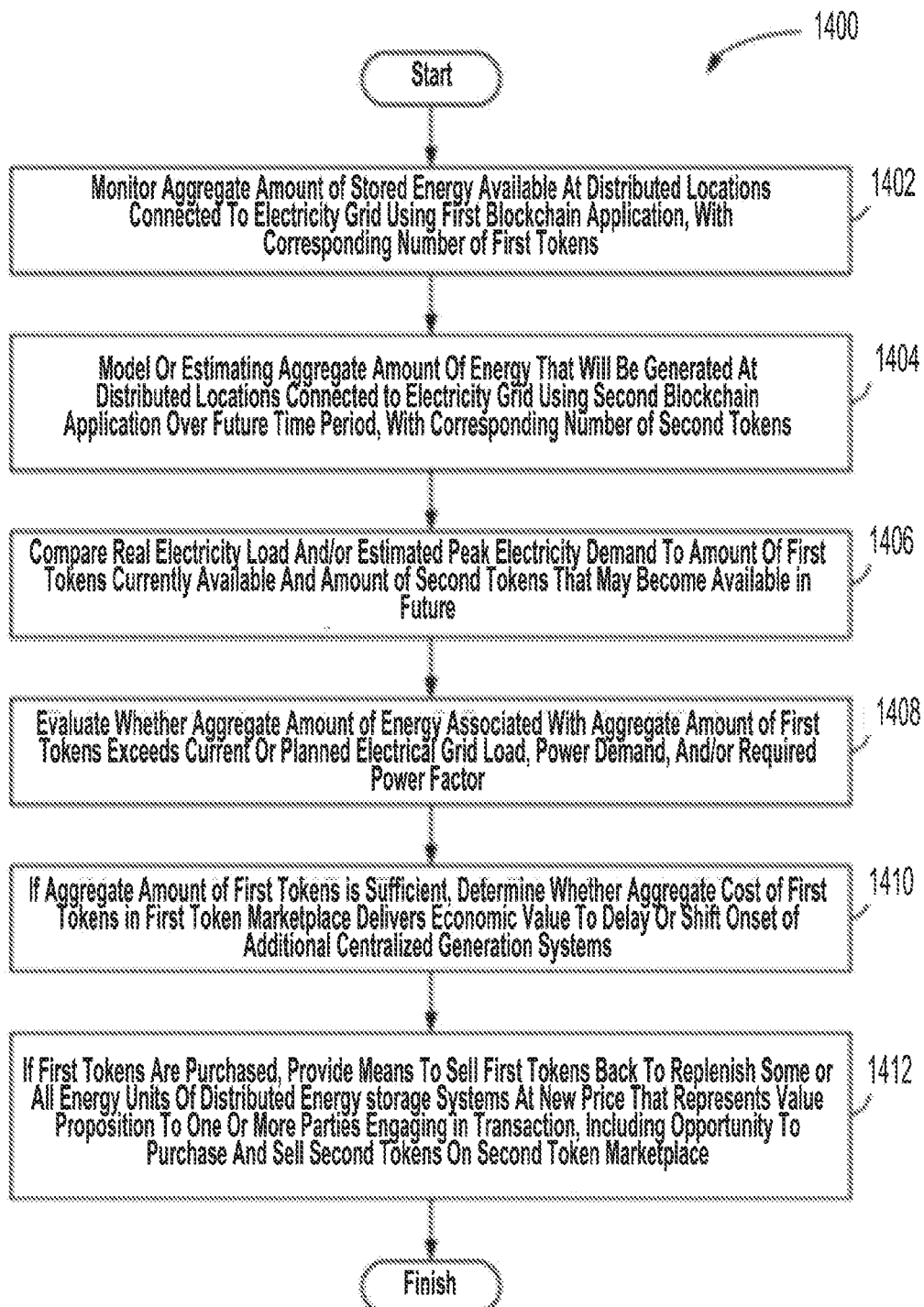
FIG. 14 illustrates a flowchart of an example method of offsetting centralized energy generation using distributed generation or storage technologies that can implement load shifting or peak shaving, in accordance with one or more implementations.

FIG. 14 illustrates a method 1400 for offsetting centralized energy generation using distributed generation and/or storage technologies that can implement load shifting and/or peak shaving, in accordance with one or more implementations. The operations of method 1400 presented below are intended to be illustrative. In some implementations, method 1400 may be accomplished with one or more additional operations not described, and/or without one or more of the operations discussed. Additionally, the order in which the operations of method 1400 are illustrated in FIG. 14 and described below is not intended to be limiting.

In some implementations, method 1400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1400 in response to instructions stored electronically on an electronic storage medium. The one or more processing devices may include one or more devices configured through hardware, firmware, and/or software to be specifically designed for execution of one or more of the operations of method 1400.

An operation 1402 may include monitoring the aggregate amount of stored energy available at distributed locations connected to an electricity grid using a first blockchain application, with a corresponding number of first tokens. Each first token may have a corresponding ascribed sale price. Operation 1402 may be performed by one or more hardware processors configured by machine-readable instructions including a module that is the same as or similar to amount monitoring module 1308, in accordance with one or more implementations.

An operation 1404 may include modeling or estimating the aggregate amount of energy that will be generated at distributed locations connected to an electricity grid using a second blockchain application over a future time period, with a corresponding number of second tokens. Each second token may have a corresponding ascribed sale price in a second token marketplace. Operation 1404 may be performed by one or more hardware processors configured by machine-readable instructions including a module that is the same as or similar to amount modeling module 1310, in accordance with one or more implementations.

An operation 1406 may include comparing the real electricity load and/or estimated peak electricity demand to the amount of first tokens currently available and the amount of second tokens that may become available in the future. Operation 1406 may be performed by one or more hardware processors configured by machine-readable instructions including a module that is the same as or similar to electricity load comparing module 1312, in accordance with one or more implementations.

An operation 1408 may include evaluating whether the aggregate amount of energy associated with the aggregate amount of first tokens exceeds the current or planned electrical grid load, power demand, and/or required power factor. Operation 1408 may be performed by one or more hardware processors configured by machine-readable instructions including a module that is the same as or similar to amount evaluation module 1314, in accordance with one or more implementations.

An operation 1410 may include, if the aggregate amount of first tokens is sufficient, determining whether the aggregate cost of first tokens in a first token marketplace delivers economic value to delay or shift the onset of additional centralized generation systems. Operation 1410 may be performed by one or more hardware processors configured by machine-readable instructions including a module that is the same as or similar to cost determination module 1316, in accordance with one or more implementations.

An operation 1412 may include, if first tokens are purchased, providing a means to sell first tokens back to replenish some or all energy units of the distributed energy storage systems at a new price that represents a value proposition to one or more parties engaging in the transaction, including the opportunity to purchase and sell second tokens on the second token marketplace. Operation 1412 may be performed by one or more hardware processors configured by machine-readable instructions including a module that is the same as or similar to mean providing module 1318, in accordance with one or more implementations.

Figure 15:
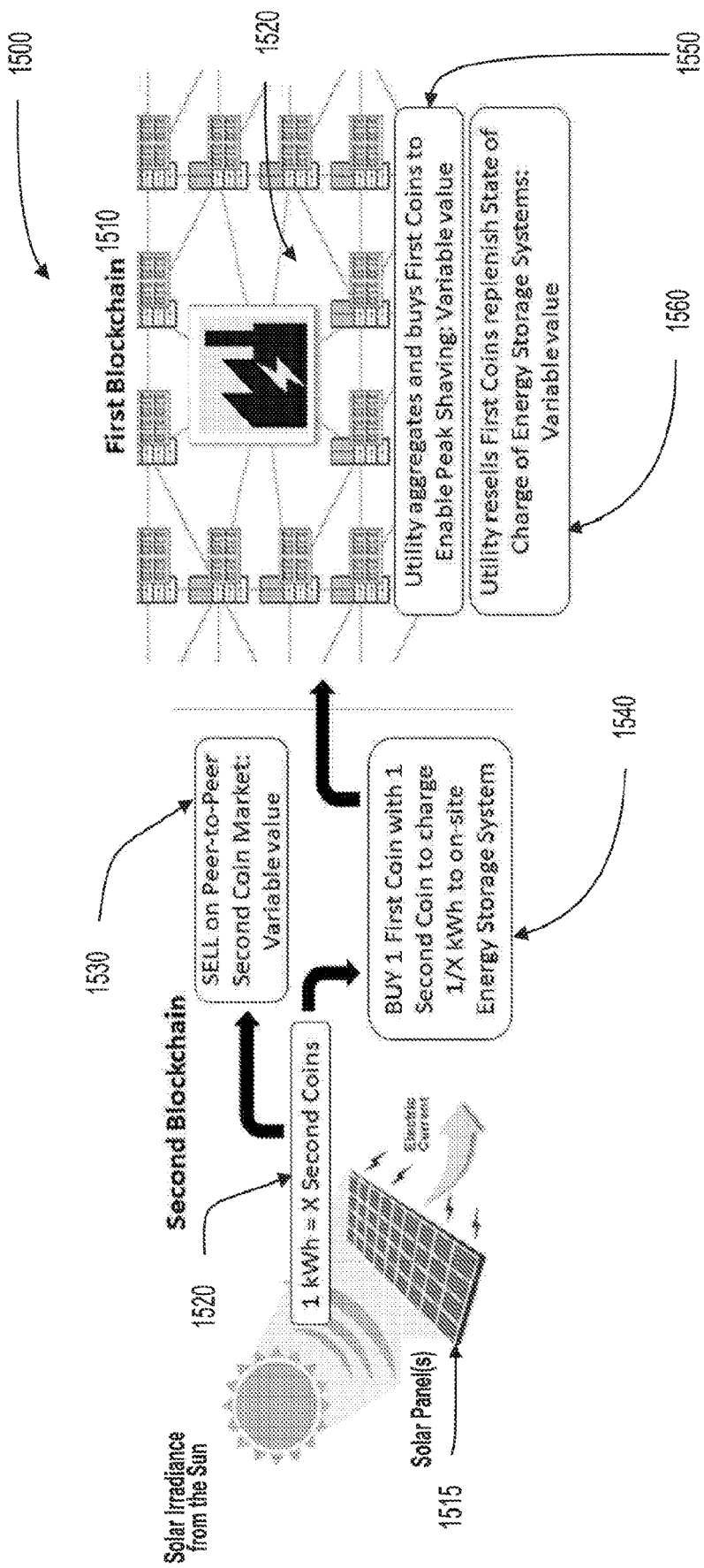
FIG. 15 illustrates an example system for managing distributed power using two distributed data structures.

FIG. 15 illustrates a dual blockchain system 1500 implementing approach to managing distributed generation and managing a means for monitoring, aggregating and purchasing available stored energy, enabling markets that provide a value proposition to the prosumer and utility alike. The approach outlined in FIG. 15 can be executed or otherwise performed by the system 100 described in FIG. 13. The system 1500 can include at least one solar panel 1515. The system 1500 can convert a first unit of energy to a first coin value (e.g., token value, record object, etc.) (ACT 1520). The system 1500 can sell a first coin value on a peer-to-peer second coin market with a variable value (ACT 1530). The system 1500 can buy 1 first coin with 1 second coin to charge 1/X kWh to on-site energy storage system (ACT 1540). The system 1500 can include at least one first blockchain 1510. The system 1500 can include at least one power grid utility system 1520. The system 1500 can aggregate and buy first coins to enable peak shaving, where the coins have a variable value (ACT 1550). The system 1500 can resell first coins to replenish the state of charge of energy storage systems, where the coins have a variable value (ACT 1560).

Figure 16:
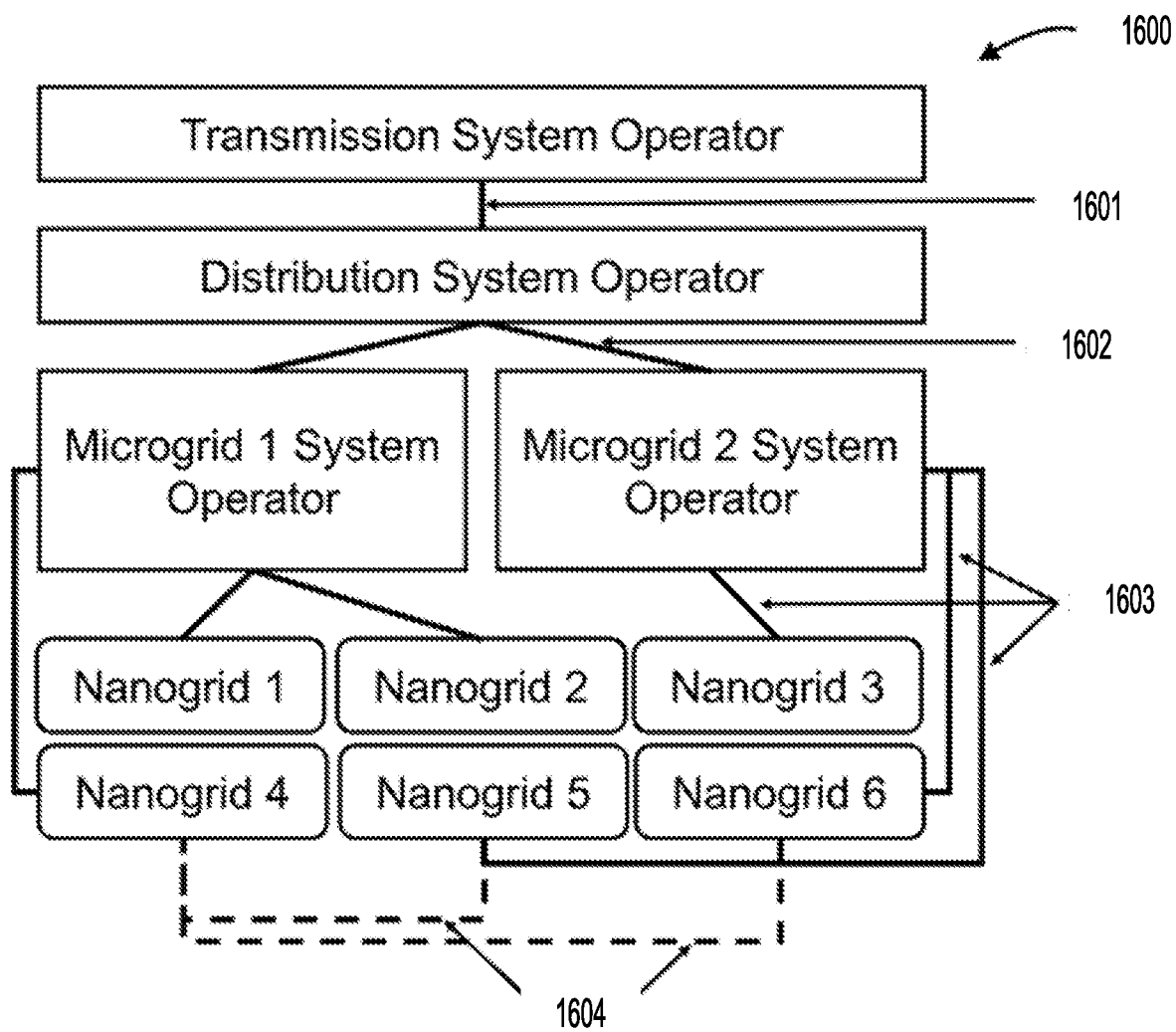
FIG. 16 illustrates an example system for layered distribution of a modernized energy distribution system, with horizontal layers delivering energy and bidirectional instructions.

FIG. 16 illustrates a layered distribution model 1600 for a modernized grid, with horizontal layers delivering transactive energy, smart contracts and instructions bi-directionally across communication paths in fluid electrical communication from layer to layer. For example, the Transmission System Operator (TSO) layer represents a Centralized Grid, which delivers electricity to a Distribution System Operator (DSO) across 1601 commensurate with a first Tokenized transactive energy exchange. In some cases, the DSO may deliver electricity to the TSO commensurate with a second Tokenized transactive energy exchange. In some embodiments, a first and second Tokenized energy exchange occurs simultaneously. The DSO may deliver electricity to one or more Microgrid System Operators (MSOs) across 1602 commensurate with a third Tokenized transactive energy exchange. In some cases, the DSO may receive electricity from one or more MSOs commensurate with a fourth Tokenized transactive energy exchange. In many cases, one or more MSOs can directly transfer electricity directly to one or more other MSOs commensurate with a fifth Tokenized transactive energy exchange. In layered distribution model 1600, each MSO may service one or more Nanogrids, which may represent a residential or commercial building, an industrial facility, a municipal facility, or similar. The MSO may receive electricity from one or more Nanogrids across a connection 1603 commensurate with a sixth Tokenized transactive energy exchange, and likewise an exchange between said Nanogrid and the MSO in the opposite direction may be executed by a seventh Tokenized transactive energy exchange. In a modernized electrical grid, any number of Nanogrids may become connected by communication paths 1604 in fluid electrical communication from one Nanogrid to another. In such a scenario, the consuming Nanogrid may receive electricity from one or more Nanogrids across a connection 1604 commensurate with an eighth Tokenized transactive energy exchange. A layered distribution optimization model would be able to manage transaction contracts, balance generation and consumption rates, and request power and other ancillary service information using a first, second, third, fourth, fifth, sixth, seventh and/or eighth Tokenized transactive energy exchange simultaneously without consuming substantial amounts of power and data for operations. Intra-layer data communications such as what would occur across connection 1604 can be richer and more complete than Inter-layer data communications across connections 1601, 1602 and 1603 that may be bundled or otherwise aggregated such that only critical information is conveyed, such as the minimum information required to guarantee trust and stability.

The approach outlined in FIG. 16 can be executed or otherwise performed by many systems 1300 described in FIG. 13.

FIG. 17 illustrates an embodiment of a multi-purpose, multi-scale network 1700 that utilizes Tokenized energy monitoring and control via a centralized coordination hub 1706, across platforms. One or more large front-of-the-meter energy generation assets may include photovoltaic modules 1702, wind turbines 1703, and energy storage assets may include large stationary storage 1704. In some embodiments, behind-the-meter storage assets may be stationary such as would be found in an individual residential or commercial building, or may comprise mobile storage assets 1709, non-limiting examples of which may include autonomous electric vehicles, conventional electrified vehicles, drones, and the like. Mobile and/or portable energy storage assets 1705 may include individualized battery or fuel cell powered devices such as phones or radios, as well as various 'wearable' technologies known to one of ordinary skill in the art. Additionally, the data within a Token of a blockchain may benefit from bi-directional communications with one or more sensors 1707 or networks of sensors 1707, which may be stationary or mobile/portable. In many embodiments, including all described herein, a First Token and a Second Token may include token information 1710 such as the type of device, the historical use of a device generally referred to as a deployment history and expected remaining useful life, the type of chemistry contained within such a device. Particularly useful when combining various scales of devices with those that may be stationary and mobile onto a single network is token information 1710 that includes GPS coordinates or other positioning/location technology known to one of ordinary skill in the art. It should be appreciated that though not explicitly shown in FIG. 17, any one or more block or sub-component of network 1700 is intended to be in wired or wireless electrical communication, and temporarily or permanently, with one or more other block or sub-component within said network.

Also illustrated in FIG. 17 is a perimeter 1701, which in some embodiments may be a type of dynamically definable perimeter that physically encompasses all Tokenized energy resources within a network, and for managing the position of all Tokenized energy assets and data and information pertaining thereto. Non-exhaustive examples of implementations of perimeter 1701 include military environments and operating bases that include stationary DERs, but further have mobile storage assets 1709 that include autonomous unmanned aerial vehicle or drone technologies that would benefit from First Tokens that monitor both state of charge and GPS coordinates, to support drone network monitoring. Similarly, examples of portable energy storage assets 1705 can include radio and other communication device batteries, or other person-mounted battery or fuel cell technologies known to one of ordinary skill in the art. In one or more embodiments of a dynamically-definable perimeter that utilizes positioning information of Tokenized energy assets, mathematical techniques such as swarming behaviors can be implemented, for enhanced control over networked assets in times of adverse network operating conditions. For example, upon an electrical grid failure in municipal setting, Tokenized energy may be automatically diverted to protect, and/or otherwise improve the resiliency of, critical assets such as emergency response facilities and assets, hospitals, water treatment facilities, and the like, where Tokenized energy may be routed using networked computers along fixed electrical pathways, and/or via a swarming of autonomous mobile Tokenized energy assets to particular locations requested by the consuming entities. Alternatively, or in addition to, perimeter 1701 may be comprise infrastructure in a fixed position that includes a network of fixed sensors, where one objective of the DERs may be for coordinated smart deployment to maximize the efficiency of self-consumption of energy while maintaining the integrity of perimeter 1701 itself. In some embodiments, perimeter 1701 may have a fixed position during a normal or safe operating state, and shares one or more interfaces with another perimeter, of similar or dissimilar size as measured by land area, total available generation and/or storage capacity, total remaining generated and/or stored energy, etc., generally referred to as perimeter 1701 coverage area. In these and other embodiments, a triggering event such as a failure, blackout, brownout, etc., may cause the redefinition of some or all of the connected or otherwise networked perimeter 1701 coverage area, which may cause the protrusion of perimeter 1701 coverage area into another perimeter, thereby increasing the size of perimeter 1701 coverage area. In other embodiments, an interfaced perimeter may be caused to produce into the perimeter 1701 coverage area, thereby decreasing the size of perimeter 1701 coverage area. In preferred embodiments, perimeter 1701 will be able to dynamically increase in some areas, decrease in some areas, and the blockchain management system(s) will be able to adjust accordingly with minimal response time. As such, energy can be diverted to dynamic participants for additional backup power, black start power, etc., to support the protection of critical infrastructure, wherein the definition of critical may vary from owner/user to owner/user, and the ability for owners/users to define the rates they may be willing to pay to protect their critical infrastructure may correspond to their relative definition of critical.

It should be appreciated that implementation of a single blockchain for energy transactions can provide a fully-scalable platform with cybersecurity features and can allow for a peer-to-peer market to be established using standardized smart contracts with minimal transaction times. However, the establishment of a second blockchain that effectively corresponds to the State of Charge (SOC) of every grid-tied energy storage system, establishes a means or way for the utility to quantify the aggregate amount of useable energy available for "purchase" in real-time (at market rates or prosumer-selected limit prices), thereby creating a viable and trustworthy value proposition based on a strong market analysis. For simplicity, the generation-side blockchain unit of measure is referred to as a "Second Token" and may be harvested from solar power (or wind, nuclear, or even conventional fossil fuel-based generation technologies). The storage-side blockchain unit of measure is referred to as a "First Token", and the relative value of each 'Token' will float based upon market forces (as well as fundamentals such as round-trip efficiency of the generation and storage systems). Non-limiting potential examples of how the market may coalesce for this technology and approach are:

The average cost for the utility to purchase a First Token may increase as: i) the SOC decreases (as deep-discharge has well-established adverse impacts on battery life), ii) additional requirements around power factor are also included; iii) as inclement weather approaches, when the near-term Second Token supply may diminish locally; iv) during an outage event such as a blackout, brownout or grid failure; or v) a purchasing entity increasingly values the ongoing operation of any critical infrastructure and would be willing to pay a higher premium at any given point in time, for any reason or for no reason.

The "purchase" of any Token may in actuality be a rental or lease of said Token, and is used in each instance herein interchangeably, governed by a smart rental or smart lease contract within the blockchain architecture. This may be beneficial if the Token purchase and/or establishment corresponds to the act of installing the generation and/or storage asset, and the Token is utilized as the system financing tool. In many cases, the value of a Token may include a principal component and an interest component, optionally with an insurance component, and/or perhaps a tax component, if such a situation applies. In an embodiment in which the Tokenization process incorporates an alternative mechanism for or a replacement to a jurisdiction distributing Renewable Energy Credits, Carbon Credits, Cap and Trade Credits, or similar, such purchase, lease and/or rental prices may include provisions for tracking the existence of and/or monetary contributions toward such credits.

When considering multiple sources of power like renewables (solar, wind, etc.) and conventional (coal, gas, thermal) then the cost of power generation per unit kWh of Tokenized energy may also be influenced by GPS coordinates, where Transmission and Distribution (T&D, a distance dependent variable) pathway distances and losses may to be considered. Additionally, input from the various overseeing regulatory agencies would be required to ensure the Token information meets the requirements for any particular jurisdiction, which may have an impact on market dynamics. Ultimately, the modular architecture of the present technology is expected to flatten the load curve for the TSO and DSO by fulfilling the demand locally and that will reduce the T&D losses for long range power transmission.

A preferred embodiment of the disclosed technology is to enable energy storage modules in PHEV and EV platforms to serve as mobile storage assets 1709, such that mobile asset owners may buy/sell First Tokens, thus substantially expanding the amount of stored energy available to the utility; however, a critical feature of such First Tokens is the GPS coordinates so as to allow the utility to prepare for the onboarding (or off-boarding) of Tokenized energy at specific locations.

Of particular interest would be the leveraging of used EV batteries (or used batteries from other sources having sufficient residual capacity at the end of life for the particular application). The definition for end of life for vehicular batteries is 80% of the starting capacity. As the size of the "wallet" and First Tokens associated with each storage system will initially correspond to the amount of energy that each system can accommodate, this allows for a second life usage for previously deployed energy storage systems.

In some embodiments, the disclosed Tokenized energy architecture will allow commercial and industrial participants to manage/offset demand-side tariffs during high consumption. In other embodiments, municipalities would be incentivized to subsidize solar+storage installations by distributing Second Tokens for new installations.

Opportunity to extend blockchain technologies (existing or new/parallel currencies) into Renewable Energy Credit market, carbon credits, cap and trade, etc. may also exist.

The present disclosure can be used to implement a blockchain approach. In particular, the present disclosure describes a controller configured or programmed to: receive a power transfer request from an electrical grid, the power transfer request including at least one of a desired power transfer level, power factor and energy or time duration of the power transfer. The power transfer level, power factor and energy or time duration of the power transfer are examples of the types of data that may be carried and/or programmed within a First Token, Second Token, or additional tokens from additional blockchain systems.

This solution can also be used to provide a direct means for market-based load shifting, peak shaving, or effectuating any of the stackable value streams described herein, overcoming the current challenge that the utility would not definitively know, in a tamper-proof and cyber secure manner, how much power may be available to draw from networked/participating distributed sources with any reasonable response time.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

D. Computer System

Figure 18:
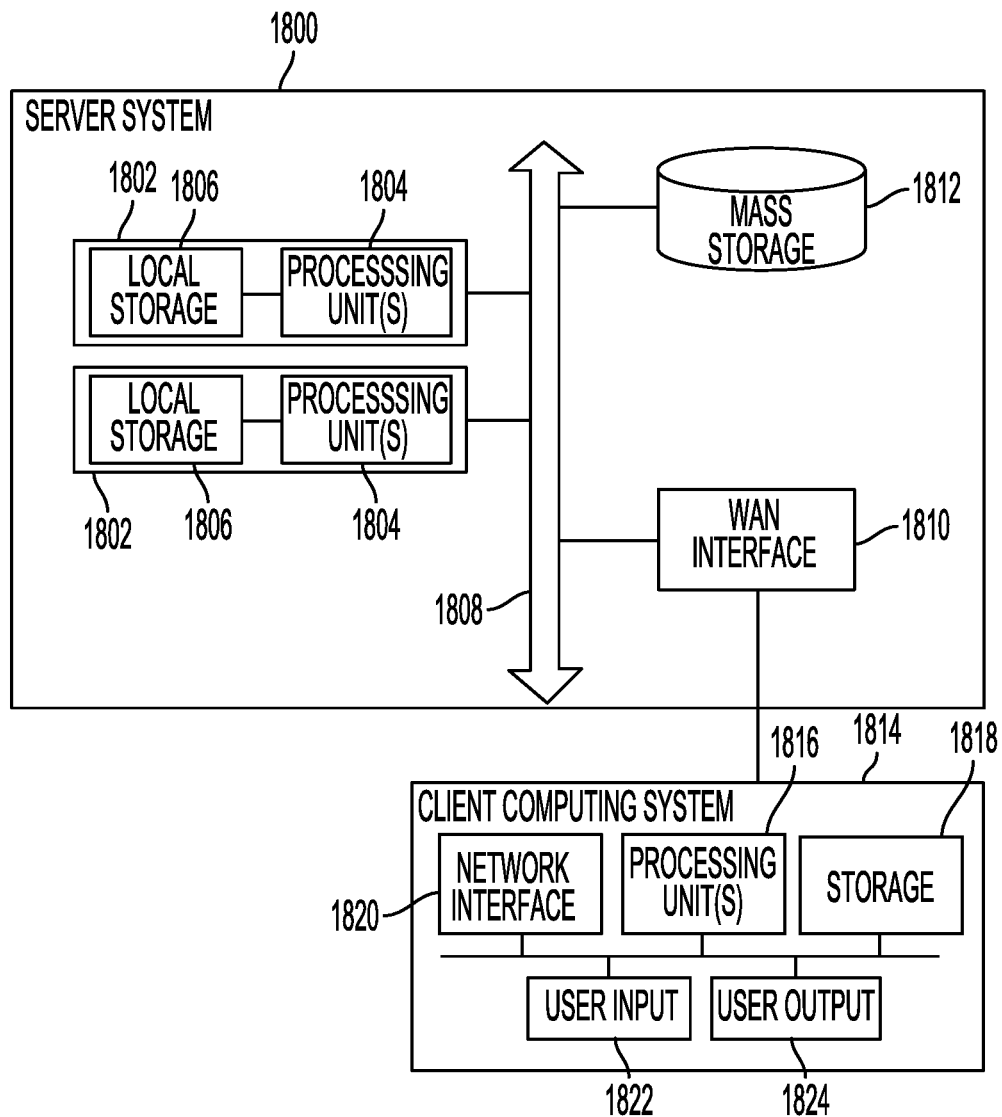
FIG. 18 illustrates a simplified block diagram of a representative server system and client computer system according to implementations of the present disclosure.

Various operations described herein can be implemented on computer systems, which can be of generally conventional design. FIG. 18 shows a simplified block diagram of a representative server system 1800 and client computer system 1814 usable to implement certain embodiments of the present disclosure. In various embodiments, server system 1800 or similar systems can implement services or servers described herein or portions thereof. Client computer system 1814 or similar systems can implement clients described herein. Each of the systems 200, 300, and others described herein with respect to FIGS. 1-17 can be similar to the server system 1800.

Server system 1800 can have a modular design that incorporates a number of modules 1802 (e.g., blades in a blade server embodiment); while two modules 1802 are shown, any number can be provided. Each module 1802 can include processing unit(s) 1804 and local storage 1806.

Processing unit(s) 1804 can include a single processor, which can have one or more cores, or multiple processors. In some embodiments, processing unit(s) 1804 can include a general-purpose primary processor as well as one or more special-purpose co-processors such as graphics processors, digital signal processors, or the like. In some embodiments, some or all processing units 1804 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1804 can execute instructions stored in local storage 1806. Any type of processors in any combination can be included in processing unit(s) 1804.

Local storage 1806 can include volatile storage media (e.g., conventional DRAM, SRAM, SDRAM, or the like) and/or non-volatile storage media (e.g., magnetic or optical disk, flash memory, or the like). Storage media incorporated in local storage 1806 can be fixed, removable or upgradeable as desired. Local storage 1806 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 1804 need at runtime. The ROM can store static data and instructions that are needed by processing unit(s) 1804. The permanent storage device can be a non-volatile read-and-write memory device that can store instructions and data even when module 1802 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 1806 can store one or more software programs to be executed by processing unit(s) 1804, such as an operating system and/or programs implementing various server functions such as functions of the system 200 of FIG. 2, the system 300, or any other system described herein, or any other server(s) associated with the system 200 of FIG. 2 or any other system described herein.

"Software" refers generally to sequences of instructions that, when executed by processing unit(s) 1804 cause server system 1800 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 1804. Software can be implemented as a single program or a collection of separate programs or program modules that interact as desired. From local storage 1806 (or non-local storage described below), processing unit(s) 1804 can retrieve program instructions to execute and data to process in order to execute various operations described above.

In some server systems 1800, multiple modules 1802 can be interconnected via a bus or other interconnect 1808, forming a local area network that supports communication between modules 1802 and other components of server system 1800. Interconnect 1808 can be implemented using various technologies including server racks, hubs, routers, etc.

A wide area network (WAN) interface 1810 can provide data communication capability between the local area network (interconnect 1808) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

In some embodiments, local storage 1806 is intended to provide working memory for processing unit(s) 1804, providing fast access to programs and/or data to be processed while reducing traffic on interconnect 1808. Storage for larger quantities of data can be provided on the local area network by one or more mass storage subsystems 1812 that can be connected to interconnect 1808. Mass storage subsystem 1812 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1812. In some embodiments, additional data storage resources may be accessible via WAN interface 1810 (potentially with increased latency).

Server system 1800 can operate in response to requests received via WAN interface 1810. For example, one of modules 1802 can implement a supervisory function and assign discrete tasks to other modules 1802 in response to received requests. Conventional work allocation techniques can be used. As requests are processed, results can be returned to the requester via WAN interface 1810. Such operation can generally be automated. Further, in some embodiments, WAN interface 1810 can connect multiple server systems 1800 to each other, providing scalable systems capable of managing high volumes of activity. Conventional or other techniques for managing server systems and server farms (collections of server systems that cooperate) can be used, including dynamic resource allocation and reallocation.

Server system 1800 can interact with various user-owned or user-operated devices via a wide-area network such as the Internet. An example of a user-operated device is shown in FIG. 18 as client computing system 1814. Client computing system 1814 can be implemented, for example, as a consumer device such as a smartphone, other mobile phone, tablet computer, wearable computing device (e.g., smart watch, eyeglasses), desktop computer, laptop computer, and so on.

For example, client computing system 1814 can communicate via WAN interface 1810. Client computing system 1814 can include conventional computer components such as processing unit(s) 1816, storage device 1818, network interface 1820, user input device 1822, and user output device 1824. Client computing system 1814 can be a computing device implemented in a variety of form factors, such as a desktop computer, laptop computer, tablet computer, smartphone, other mobile computing device, wearable computing device, or the like.

Processor 1816 and storage device 1818 can be similar to processing unit(s) 1804 and local storage 1806 described above. Suitable devices can be selected based on the demands to be placed on client computing system 1814; for example, client computing system 1814 can be implemented as a "thin" client with limited processing capability or as a high-powered computing device. Client computing system 1814 can be provisioned with program code executable by processing unit(s) 1816 to enable various interactions with server system 1800 of a message management service such as accessing messages, performing actions on messages, and other interactions described above. Some client computing systems 1814 can also interact with a messaging service independently of the message management service.

Network interface 1820 can provide a connection to a wide area network (e.g., the Internet) to which WAN interface 1810 of server system 1800 is also connected. In various embodiments, network interface 1820 can include a wired interface (e.g., Ethernet) and/or a wireless interface implementing various RF data communication standards such as Wi-Fi, Bluetooth, or cellular data network standards (e.g., 3G, 4G, LTE, 5G, 6G, etc.).

User input device 1822 can include any device (or devices) via which a user can provide signals to client computing system 1814; client computing system 1814 can interpret the signals as indicative of particular user requests or information. In various embodiments, user input device 1822 can include any or all of a keyboard, touch pad, touch screen, mouse or other pointing device, scroll wheel, click wheel, dial, button, switch, keypad, microphone, and so on.

User output device 1824 can include any device via which client computing system 1814 can provide information to a user. For example, user output device 1824 can include a display to display images generated by or delivered to client computing system 1814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1824 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1804 and 1816 can provide various functionality for server system 1800 and client computing system 1814, including any of the functionality described herein as being performed by a server or client, or other functionality associated with message management services.

It will be appreciated that server system 1800 and client computing system 1814 are illustrative and that variations and modifications are possible. Computer systems used in connection with embodiments of the present disclosure can have other capabilities not specifically described here. Further, while server system 1800 and client computing system 1814 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. For instance, although specific examples of rules (including triggering conditions and/or resulting actions) and processes for generating suggested rules are described, other rules and processes can be implemented. Embodiments of the disclosure can be realized using a variety of computer systems and communication technologies including but not limited to specific examples described herein.

Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A system for managing the distribution of generated electrical power, comprising:
one or more processors in communication with an electrical power generation device or an electrical grid, an electrical power consumption device, an electrical energy storage device, and an electrical transmission device, the one or more processors coupled to memory and configured to:
maintain, in one or more data structures, a status of each account of a plurality of accounts, each account of the plurality of accounts corresponding to a respective device of the electrical power generation device, the electrical power consumption device, the electrical energy storage device, and the electrical transmission device, the account including one or more record objects corresponding to a respective unit of power or energy;
generate a first record object responsive to the electrical power generation device generating a first unit of power, the first record object identifying an identifier of the electrical power generation device and a first value corresponding to a voltage associated with the first unit of power and a second value corresponding to a current associated with the first unit of power;
update a first account of the plurality of accounts corresponding to the electrical power generation device by associating the first record object to the first account;
identify, from a plurality of paths, a first path along which to transmit the first unit of power, each path of the plurality of paths identifying the electrical power generation device as a source device and a respective one of the electrical power consumption device, the electrical energy storage device, or the electrical transmission device as a destination device, the first path identified based on the status of a respective account of the plurality of accounts corresponding to the one of the electrical power consumption device, the electrical power storage device, or the electrical transmission device;
generate a control signal to route the first unit of power from the source device to the destination device of the first path;
update an event tracker maintained by the one or more processors responsive to routing the first unit of power by including an event indicating the routing of the first unit of power from the source device to the destination device;
generate a second record object corresponding to the first unit of power routed to the destination device, the second record object identifying a second identifier of the destination device; and
update a second account of the plurality of accounts to include the second record object based on routing the first unit of power to the destination device, the second account corresponding to the destination device.

2. The system of claim 1, wherein the one or more processors are further configured to:
determine that the destination device of the first path is the electrical power consumption device; and
assign a value to the first record object associated with the first account indicating that the first unit of power corresponding to the first record object is consumed.

3. The system of claim 1, wherein the event tracker is a first event tracker, the event is a first event, and the one or more processors are further configured to:
transmit to at least one second controller, a request to confirm the routing of the first unit of power from the source device to the destination device, the at least one second controller configured to append to a second event tracker maintained by the at least one second controller, a second event indicating the routing of the first unit of power from the source device to the destination device;
receive an indication of confirmation from the at least one second controller; and
responsive to the receipt of the indication of confirmation from the at least one second controller, update the first event tracker to include the first event indicating the routing of the first unit of power from the source device to the destination device.

4. The system of claim 1, wherein the one or more processors are further configured to:
determine a type of the electrical power generation device; and
identify the first path along which to transmit the first unit of power based on the type of the electrical power generation device.

5. The system of claim 1, wherein the one or more processors are further configured to:
determine an objective function for each path of the plurality of paths, each objective function representing an estimated loss of electrical energy associated with the corresponding path; and
identify the first path along which to transmit the first unit of power based on the objective functions corresponding to each of the plurality of paths.

6. The system of claim 1, wherein the one or more processors are further configured to:
measure the voltage and the current of an output of the electrical power generation device;
determine that the voltage and the current measured from the output of the electrical power generation device satisfies a threshold corresponding to a voltage-current function based at least on the voltage and the current; and
generate the first record object responsive to the determination that the voltage and the current satisfy the threshold.

7. The system of claim 1, wherein the event tracker is a first event tracker, the event is a first event, and the one or more processors are further configured to:
transmit to at least one second controller, a request to confirm the generation of the first unit of power by the electrical power generation device, the at least one second controller configured to append to a second event tracker maintained by the at least one second controller, a second event indicating the generation of the first unit of power by the electrical power generation device;
receive an indication of confirmation from the at least one second controller; and responsive to the receipt of the indication of confirmation from the at least one second controller, update the first account of the plurality of accounts corresponding to the electrical power generation device.

8. A method of managing the distribution of generated electrical power, comprising:

maintaining, by a controller comprising one or more processors and a memory, in one or more data structures, a status of each account of a plurality of accounts, each account of the plurality of accounts corresponding to a respective device of an electrical power generation device or an electrical grid, an electrical power consumption device, an electrical energy storage device, and an electrical transmission device, the account including one or more record objects corresponding to a respective unit of power or energy;

generating, by the controller, a first record object responsive to the electrical power generation device generating a first unit of power or an electrical grid providing a first unit of power, the first record object identifying an identifier of the electrical power generation device or the electrical grid and a first value corresponding to a voltage associated with the first unit of power and a second value corresponding to a current associated with the first unit of power updating, by the controller, a first account of the plurality of accounts corresponding to the electrical power generation device or the electrical grid by associating the first record object to the first account identifying, by the controller, from a plurality of paths, a first path along which to transmit the first unit of power, each path of the plurality of paths identifying the electrical power generation device as a source device and a respective one of the electrical power consumption device, the electrical energy storage device, or the electrical transmission device as a destination device, the first path identified based on the status of a respective account of the plurality of accounts corresponding to the one of the electrical power consumption device, the electrical energy storage device, or the electrical transmission device;

generating, by the controller, a control signal to route the first unit of power from the source device to the destination device of the first path;

updating, by the controller, an event tracker maintained by the one or more processors responsive to routing the first unit of power by including an event indicating the routing of the first unit of power, or a first unit of energy based upon the product of the first unit of power and a time constant, from the source device to the destination device;

generating, by the controller, a second record object corresponding to the first unit of power routed to the destination device, the second record object identifying a second identifier of the destination device;

updating, by the controller, a second account of the plurality of accounts to include the second record object based on routing the first unit of power and the first unit of energy to the destination device, the second account corresponding to the destination device.

9. The method of claim 8, further comprising:

determining, by the controller, that the destination device of the first path is the electrical power consumption device; and assigning, by the controller, a value to the first record object associated with the first account indicating that the first unit of power corresponding to the first record object is consumed.

10. The method of claim 8, wherein the event tracker is a first event tracker, and the event is a first event, further comprising:

transmitting, by the controller, to at least one second controller, a request to confirm the routing of the first unit of power from the source device to the destination device, the at least one second controller configured to append to a second event tracker maintained by the at least one second controller, a second event indicating the routing of the first unit of power from the source device to the destination device;

receiving, by the controller, an indication of confirmation from the at least one second controller; and responsive to receiving the indication of confirmation from the at least one second controller, updating, by the controller, the first event tracker to include the first event indicating the routing of the first unit of power from the source device to the destination device.

11. The method of claim 8, further comprising:

determining, by the controller, a type of the electrical power generation device; and identifying, by the controller, the first path along which to transmit the first unit of power based on the type of the electrical power generation device.

12. The method of claim 8, further comprising:

determining, by the controller, an objective function for each path of the plurality of paths, each objective function representing a loss of electrical power associated with the corresponding path; and identifying, by the controller, the first path along which to transmit the first unit of power based on the objective functions corresponding to each path of the plurality of paths.

13. The method of claim 8, further comprising:

measuring, by the controller, the voltage and the current of an output of the electrical power generation device;

determining, by the controller, that the voltage and the current measured from the output of the electrical power generation device satisfies a threshold corresponding to a function based at least on the voltage and the current; and generating, by the controller, the first record object responsive to the determination that the voltage and the current satisfy the threshold.

14. The method of claim 8, wherein the event tracker is a first event tracker, and the event is a first event, further comprising:

transmitting, by the controller, to at least one second controller, a request to confirm the generation of the first unit of power by the electrical power generation device, the at least one second controller configured to append to a second event tracker maintained by the at least one second controller, a second event indicating the generation of the first unit of power by the electrical power generation device;

receiving, by the controller, an indication of confirmation from the at least one second controller; and responsive to the receipt of the indication of confirmation from the at least one second controller, updating, by the controller, the first account of the plurality of accounts corresponding to the electrical power generation device.

15. A non-transitory computer-readable medium having instructions embodied thereon, the instructions being executable by one or more processors to:
- maintain, in one or more data structures, a status of each account of a plurality of accounts, each account of the plurality of accounts corresponding to a respective device of an electrical power generation device, an electrical power consumption device, an electrical power storage device, and an electrical transmission device, the account including one or more record objects corresponding to a respective unit of power;
- generate a first record object responsive to the electrical power generation device generating a first unit of power, the first record object identifying an identifier of the electrical power generation device and a first value corresponding to a voltage associated with the first unit of power and a second value corresponding to a current associated with the first unit of power;
- update a first account of the plurality of accounts corresponding to the electrical power generation device by associating the first record object to the first account;
- identify, from a plurality of paths, a first path along which to transmit the first unit of power, each path of the plurality of paths identifying the electrical power generation device as a source device and a respective one of the electrical power consumption device, the electrical power storage device, or the electrical transmission device as a destination device, the first path identified based on the status of a respective account of the plurality of accounts corresponding to the one of the electrical power consumption device, the electrical power storage device, or the electrical transmission device;
- generate a control signal to route the first unit of power from the source device to the destination device of the first path;
- update an event tracker maintained by the one or more processors responsive to routing the first unit of power by including an event indicating the routing of the first unit of power from the source device to the destination device;
- generate a second record object corresponding to the first unit of power routed to the destination device, the second record object identifying a second identifier of the destination device; and
- update a second account of the plurality of accounts to include the second record object based on routing the first unit of power to the destination device, the second account corresponding to the destination device.

16. The non-transitory computer-readable medium of claim 15, wherein the execution of the instructions further cause the one or more processors to:
- determine that the destination device of the first path is the electrical power consumption device; and
- assign a value to the first record object associated with the first account indicating that the first unit of power corresponding to the first record object is consumed.

17. The non-transitory computer-readable medium of claim 15, wherein the event tracker is a first event tracker, the event is a first event, and the execution of the instructions further cause the one or more processors to:
- transmit to at least one second controller, a request to confirm the routing of the first unit of power from the source device to the destination device, the at least one second controller configured to append to a second event tracker maintained by the at least one second controller, a second event indicating the routing of the first unit of power from the source device to the destination device;
- receive an indication of confirmation from the at least one second controller; and
- responsive to the receipt of the indication of confirmation from the at least one second controller, update the first event tracker to include the first event indicating the routing of the first unit of power from the source device to the destination device.

18. The non-transitory computer-readable medium of claim 15, wherein the execution of the instructions further cause the one or more processors to:
- determine a type of the electrical power generation device; and
- identify the first path along which to transmit the first unit of power based on the type of the electrical power generation device.

19. The non-transitory computer-readable medium of claim 15, wherein the execution of the instructions further cause the one or more processors to:
- determine an objective function for each path of the plurality of paths, each objective function representing a loss of electrical power associated with the corresponding path; and
- identify the first path along which to transmit the first unit of power based on the objective functions corresponding to each of the plurality of paths.

20. The non-transitory computer-readable medium of claim 15, wherein the execution of the instructions further cause the one or more processors to:
- measure the voltage and the current of an output of the electrical power generation device;
- determine that the voltage and the current measured from the output of the electrical power generation device satisfies a threshold corresponding to a function based at least on the voltage and the current; and
- generate the first record object responsive to the determination that the voltage and the current satisfy the threshold.

21. The non-transitory computer-readable medium of claim 15, wherein the event tracker is a first event tracker, the event is a first event, and the execution of the instructions further cause the one or more processors to:
- transmit to at least one second controller, a request to confirm the generation of the first unit of power by the electrical power generation device, the at least one second controller configured to append to a second event tracker maintained by the at least one second controller, a second event indicating the generation of the first unit of power by the electrical power generation device;
- receive an indication of confirmation from the at least one second controller; and
- responsive to the receipt of the indication of confirmation from the at least one second controller, update the first account of the plurality of accounts corresponding to the electrical power generation device.

22. A system for managing the distribution of generated electrical power, comprising:
- one or more processors in communication with an electrical power generation device, an electrical power consumption device, an electrical power storage device, and an electrical transmission device the one or more processors coupled to memory and configured to:
  - maintain, in one or more data structures, a status of each account of a plurality of accounts, each account of the plurality of accounts corresponding to a respective device of the electrical power generation device, the electrical power consumption device, the electrical power storage device, and the electrical transmission device, the account including one or more record objects corresponding to a respective unit of power;

identify, from a plurality of paths, a first path along which to transmit a first unit of power, each path of the plurality of paths identifying one of the electrical power generation device, the electrical power storage device, or the electrical transmission device as a source device and a respective one of the electrical power consumption device, the electrical power storage device, or the electrical transmission device as a destination device, the first path identified based on the status of a respective account of the plurality of accounts corresponding to the one of the electrical power consumption device, the electrical power storage device, or the electrical transmission device;

generate a control signal to route the first unit of power from the source device to the destination device of the first path;

update an event tracker maintained by the one or more processors responsive to routing the first unit of power by including an event indicating the routing of the first unit of power from the source device to the destination device;

generate a record object corresponding to the first unit of power routed to the destination device, the record object identifying an identifier of the destination device;

update a first account of the plurality of accounts corresponding to the source device based on routing the first unit of power from the source device; and update a second account of the plurality of accounts to include the record object based on routing the first unit of power to the destination device, the second account corresponding to the destination device.

23. The system of claim 22, wherein the one or more processors are further configured to:
determine that the destination device of the first path is the electrical power consumption device; and
assign a value to the record object indicating that the first unit of power corresponding to the record object is consumed.

24. The system of claim 22, wherein the one or more processors are further configured to:
transmit to at least one second controller, a request to confirm the routing of the first unit of power from the source device to the destination device, the at least one second controller configured to append to a second event tracker maintained by the at least one second controller, a second event indicating the routing of the first unit of power from the source device to the destination device;
receive an indication of confirmation from the at least one second controller; and
responsive to the receipt of the indication of confirmation from the at least one second controller, update the first event tracker to include the first event indicating the routing of the first unit of power from the source device to the destination device.

25. The system of claim 22, wherein the one or more processors are further configured to:
determine a type of the electrical power generation device; and
identify the first path along which to transmit the first unit of power based on the type of the electrical power generation device.

26. The system of claim 22, wherein the one or more processors are further configured to:
determine an objective function for each path of the plurality of paths, each objective function representing a loss of electrical power associated with the corresponding path; and
identify the first path along which to transmit the first unit of power based on the objective functions corresponding to each of the plurality of paths.

27. The system of claim 22, wherein the one or more processors are further configured to:
measure a voltage and a current of an output of the electrical power generation device;
determine that the voltage and the current measured from the output of the electrical power generation device satisfies a threshold corresponding to a function based at least on the voltage and the current; and
generate the record object responsive to the determination that the voltage and the current satisfy the threshold.

28. The system of claim 22, wherein the one or more processors are further configured to:
transmit to at least one second controller, a request to confirm the generation of the first unit of power, the at least one second controller configured to append to a second event tracker maintained by the at least one second controller, a second event indicating the generation of the first unit of power;
receive an indication of confirmation from the at least one second controller; and
responsive to the receipt of the indication of confirmation from the at least one second controller, update the first account of the plurality of accounts corresponding to the source device.

29. A system comprising:
one or more processors coupled to memory and configured to receive information pertaining to an electrical network comprising a first electrical energy source, a second electrical energy source and a plurality of electrical energy destinations, the one or more processors coupled to memory and configured to:
maintain, in one or more data structures, a first account for the first electrical energy source, the first account including one or more record objects corresponding to a respective unit of power or energy, each of the one or more record objects identifying one of an energy generation event, an energy transfer event, or an energy storage event and a corresponding timestamp;
maintain, in one or more data structures, a second account for the second electrical energy source, the second account maintaining, for each time period a plurality of time periods, a respective record of an estimated amount of available electrical energy for transmission to the plurality on electrical energy destinations;
determine, for a first time period after the plurality of time periods, a first routing configuration between the first electrical energy source and a first electrical energy destination of the plurality of electrical energy destinations based on the first account and the second account and the first time period;
establish, for the first time period, a first electrical connection to cause the first electrical energy source to transfer energy to the first electrical energy destination based on the first routing configuration;

determine, for a second time period after the plurality of time periods, a second routing configuration between the second electrical energy source and the first electrical energy destination of the plurality of electrical energy destinations based on the first account and the second account and the second time period; and establish, for the second time period, a second electrical connection to cause the second electrical energy source to transfer energy to the first electrical energy destination based on the second routing configuration.

30. The system of claim 29, wherein the first electrical energy source is associated with a first location and the one or more processors configured to determine a predicted amount of electrical energy generated at the first time period based on the first location.

31. The system of claim 29, wherein the one or more processors are configured to maintain, for each second time period of a plurality of second time periods after the first plurality of time periods, a predicted amount of transferable electrical energy for the first electrical energy source.

32. The system of claim 30, wherein the second time period is a respective second time period of the plurality of second time periods, and wherein to determine, for the second time period, the second routing configuration, the one or more processors are configured to determine the second routing configuration using the predicted amount of transferable electrical energy for the first electrical energy source for the second time period.

* * * * *